(12) United States Patent
Wu et al.

(10) Patent No.: US 12,621,096 B2
(45) Date of Patent: May 5, 2026

(54) METHOD AND DEVICE FOR SELECTING NODES USING REFERENCE SIGNALS IN WIRELESS COMMUNICATION

(71) Applicant: Apogee Networks, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 288 days.

(21) Appl. No.: 18/115,001

(22) Filed: Feb. 28, 2023

(65) Prior Publication Data

US 2023/0208582 A1 Jun. 29, 2023

Related U.S. Application Data

(63) Continuation of application No. PCT/CN2021/117355, filed on Sep. 9, 2021.

(30) Foreign Application Priority Data

Sep. 11, 2020 (CN) .......................... 202010951034.4
Sep. 16, 2020 (CN) .......................... 202010975478.1
(Continued)

(51) Int. Cl.
*H04W 72/04* (2023.01)
*H04L 5/00* (2006.01)
(Continued)

(52) U.S. Cl.
CPC ................................. *H04L 5/0048* (2013.01)

(58) Field of Classification Search
None
See application file for complete search history.

(56) References Cited

U.S. PATENT DOCUMENTS 9,055,497 B2    6/2015   Koo et al.
10,135,596 B2   11/2018  Wang et al.
(Continued)

FOREIGN PATENT DOCUMENTS

CN      105340324 A      2/2016
CN      110719156 A  *   1/2020   ........... H04L 5/0048
(Continued)

OTHER PUBLICATIONS

ISR received in application No. PCT/CN2021/117355 dated Dec. 8, 2021.
(Continued)

*Primary Examiner* — Maharishi V Khirodhar
(74) *Attorney, Agent, or Firm* — VOLPE KOENIG

(57) ABSTRACT

The present application provides a method and a device in a node for wireless communications. A first node transmits a first signal; receives a first signaling in a first resource block; and monitors a first-type signaling in a first resource block subset after a first time using a spatial parameter of a target reference signal. The first signal indicates a first reference signal out of M reference signals; a transmitter of at least one reference signal among the M reference signals is a first cell, the first cell not being added by the first node; time-domain resource occupied by the first signaling is used to determine the first time. The method above makes quick cross-cell beam handover possible and enhances the performance of cell-boundary users as well as avoids the ping-pong effect with service quality fully-guaranteed.

20 Claims, 9 Drawing Sheets

(30)     Foreign Application Priority Data

| Oct. 9, 2020 | (CN) | .......................... 202011071252.5 |
| May 21, 2021 | (CN) | .......................... 202110555395.1 |

(51) Int. Cl.
    *H04W 76/00*     (2018.01)
    *H04W 88/08*     (2009.01)

(56)     References Cited

U.S. PATENT DOCUMENTS

| 10,764,889 | B2 | 9/2020 | Mochizuki et al. |
| 11,082,095 | B2 | 8/2021 | Li et al. |
| 11,290,234 | B2 | 3/2022 | Jiang et al. |
| 11,621,816 | B2 | 4/2023 | Wu et al. |
| 2017/0078955 | A1* | 3/2017 | Cheng .................. H04W 48/16 |
| 2020/0083935 | A1 | 3/2020 | Wu et al. |
| 2020/0221485 | A1 | 7/2020 | Cirik et al. |

FOREIGN PATENT DOCUMENTS

| WO | 2018156696 | A1 | 8/2018 |
| WO | 2018176328 | A1 | 10/2018 |
| WO | 2019113766 | A1 | 6/2019 |
| WO | 2020020005 | A1 | 1/2020 |
| WO | 2020156246 | A1 | 8/2020 |
| WO | 2020167226 | A1 | 8/2020 |

OTHER PUBLICATIONS

Samsung Issues on RRM measurement bandwidth in NR 3GPP TSG-RAN WG2 NR #99 Meeting R2-1708090, Aug. 25, 2017.
Butovitsch et al., "Research and Field Trials of Uplink COMP Schemes in TD-LTE Networks," Telecommunication Science, Issue 05 (May 20, 2013).
Nokia et al., "BPL definition and Spatial QCL time indication," 3GPP TSG RAN WG1 Nr Ad-Hoc#2, R1-1711292, Qingdao, P.R. China (Jun. 27-30, 2017).
Samsung, "CSI-RS for beam management," 3GPP TSG RAN WG1#88, R1-17002955, Athens, Greece (Feb. 13-17, 2017).
Third Generation Partnership Project, "Technical Specification Group Radio Access Network; NR; Requirements for support of radio resource management (Release 16)," 3GPP TS 38.133 V16.4.0 (Jun. 2020).
Third Generation Partnership Project, "Technical Specification Group Radio Access Network; NR; Physical layer procedures for control (Release 16)," 3GPP TS 38.213 V16.2.0 (Jun. 2020).
Third Generation Partnership Project, "Technical Specification Group Radio Access Network; NR; Physical layer procedures for data (Release 16)," 3GPP TS 38.214 V16.2.0 (Jun. 2020).
Third Generation Partnership Project, "Technical Specification Group Radio Access Network; NR; Medium Access Control (MAC) protocol specification (Release 16)," 3GPP TS 38.321 V16.1.0 (Jul. 2020).
Third Generation Partnership Project, "Technical Specification Group Radio Access Network; NR; Radio Resource Control (RRC) protocol specification (Release 16)," 3GPP TS 38.331 V16.1.0 (Jul. 2020).

* cited by examiner

Frequency
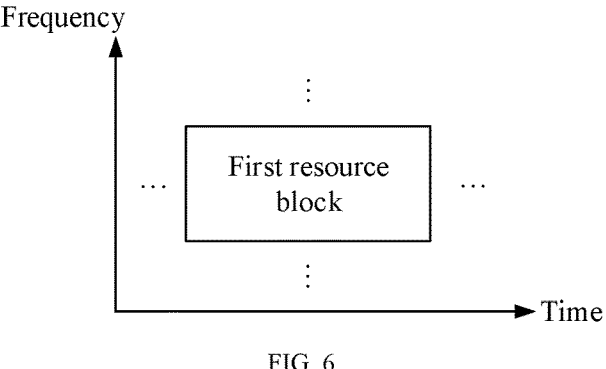
FIG. 6
Frequency
FIG. 7
Spatial parameter of given    used for    Monitoring given signaling in
reference signal          →         given resource
FIG. 8
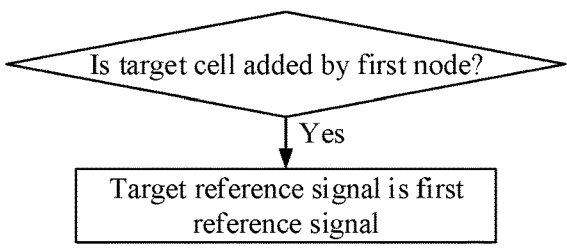
Is target cell added by first node?
Yes
Target reference signal is first
reference signal
FIG. 9
Frequency
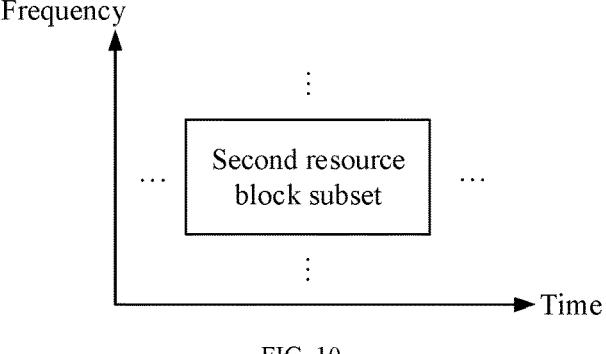
FIG. 10

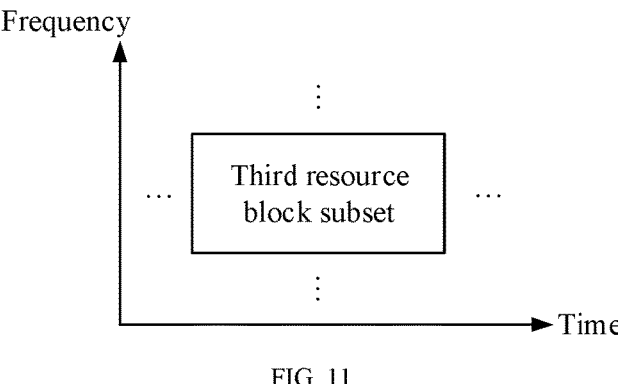
FIG. 11
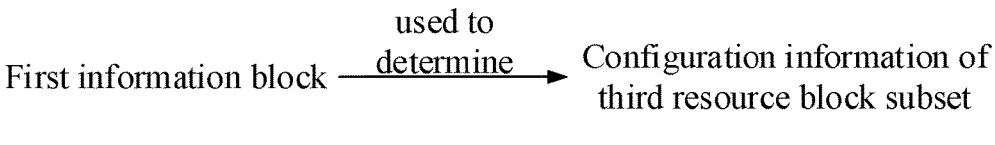
FIG. 12
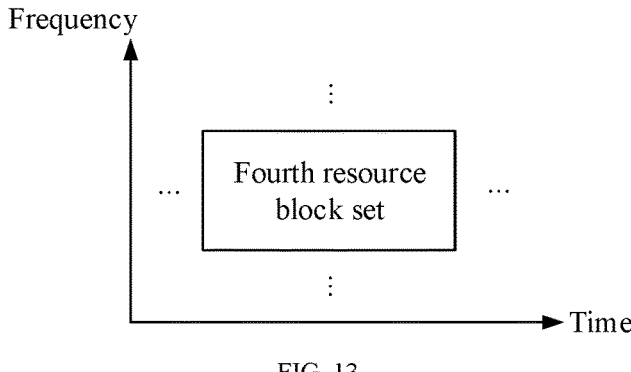
FIG. 13
Measuring first reference signal set —used for→ Triggering transmission of first signal
FIG. 14
Configuration information block#0 —indicating→ Reference signal#0
⋮
Configuration information block#(M-1) —indicating→ Reference signal#(M-1)
FIG. 15

1600
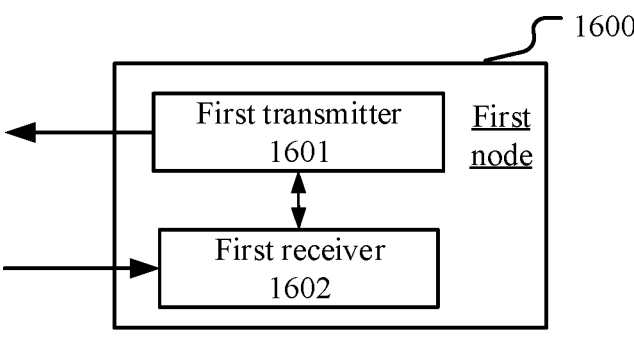
FIG. 16
1700
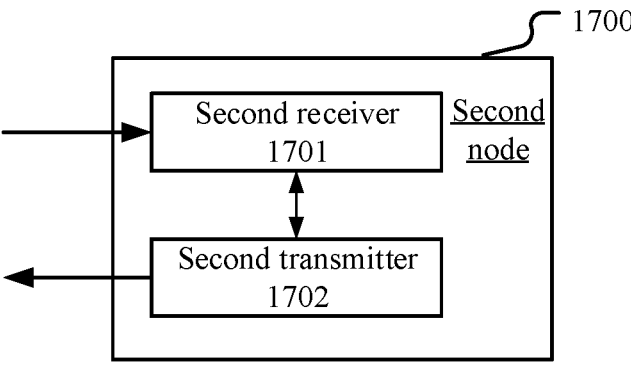
FIG. 17
1800
First processor
1801
Third
node
FIG. 18
1900
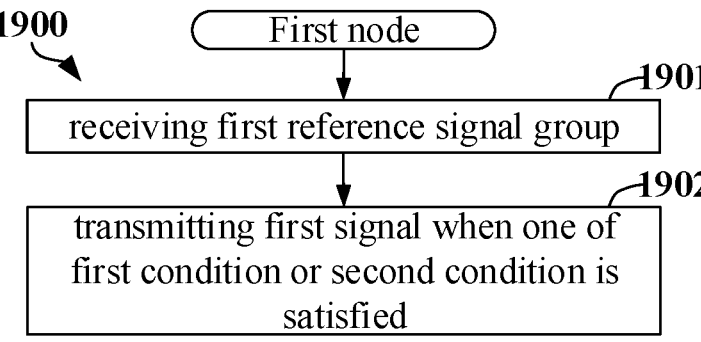
First node
receiving first reference signal group 1901
transmitting first signal when one of
first condition or second condition is
satisfied 1902
FIG. 19

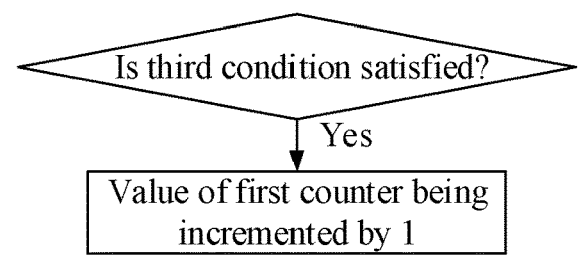
FIG. 23
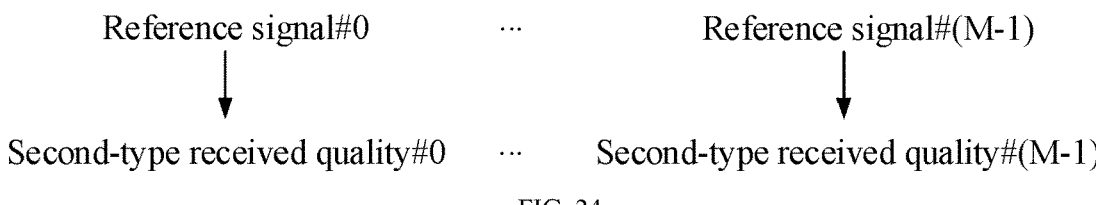
FIG. 24
Configuration information block#0 ——indicating——▸ Reference signal#0
⋮
Configuration information block#(M-1) ——indicating——▸ Reference signal#(M-1)
FIG. 25
First information block ——used to determine——▸ First reference signal group
FIG. 26
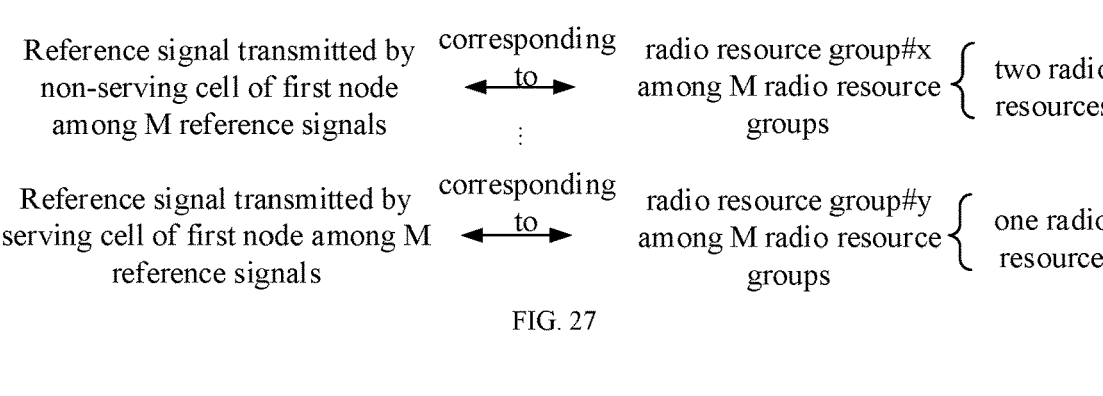
FIG. 27
First radio resource group $\left\{\begin{array}{l}\text{First radio resource}\\ \text{Second radio resource}\end{array}\right.$
FIG. 28

METHOD AND DEVICE FOR SELECTING NODES USING REFERENCE SIGNALS IN WIRELESS COMMUNICATION

CROSS REFERENCE TO RELATED APPLICATIONS

This application is the continuation of the international patent application No. PCT/CN2021/117355, filed on Sep. 9, 2021, which claims the priority benefit of Chinese Patent Application No. 202010951034.4, filed on September 11, and claims the priority benefit of Chinese Patent Application No. 202011071252.5, filed on Oct. 9, 2020, and claims the priority benefit of Chinese Patent Application No. 202010975478.1, filed on Sep. 16, 2020, and claims the priority benefit of Chinese Patent Application No. 202110555395.1, filed on May 21, 2021, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

In LTE systems, inter-cell handover is controlled by a base station based on measurements of a User Equipment (UE). And the inter-cell handover in the 3rd Generation Partner Project (3GPP) Release (R) 15 basically adopts the mechanism used in the LTE. As for a New Radio (NR) system, more application scenarios need to be supported. Some scenarios, such as Ultra-Reliable and Low Latency Communications (URLLC), has posed high demands on the delay, and new challenges are also presented against inter-cell handover.

In the NR system, Massive Multiple Input Multiple Output (MIMO) is a significant technical feature. In Massive MIMO, multiple antennas form through beamforming a narrow beam pointing in a specific direction to enhance communication quality. Since the beam formed by multiple antennas through beamforming is generally narrow, beams from both sides of communications are required to be aligned for performing effective communications.

SUMMARY

Inventors find through researches that beam-based communications will have negative influence on inter-cell handover, such as extra delay and pingpong effect. Then how to reduce the negative impact and go deeper in improving the performance of users at the cell boundary to meet various demands of application scenarios is an issue remaining to be solved.

To address the above problem, the present application provides a solution. It should be noted that though the present application only took the massive MIMO and beam-based communications as a typical or exemplary scenario in the statement above, it is also applicable to other scenarios such as LTE multi-antenna system, where similar technical effects can be achieved. Additionally, the adoption of a unified solution for various scenarios, including but not limited to massive MIMO, beam-based communications, and LTE multi-antenna system, contributes to the reduction of hardcore complexity and costs. In the case of no conflict, the embodiments of any node and the characteristics in embodiments may be applied to any other node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

transmitting a first signal, the first signal indicating a first reference signal out of M reference signals, M being a positive integer greater than 1; and receiving a first signaling in a first resource block; and monitoring a first-type signaling in a first resource block subset after a first time using a spatial parameter of a target reference signal;

herein, a transmitter of at least one reference signal among the M reference signals is a first cell, the first cell not being added by the first node; a time-domain resource occupied by the first signaling is used to determine the first time; a transmitter of the first reference signal is a target cell, and whether the target cell is added by the first node is used to determine whether the target reference signal is the first reference signal.

In one embodiment, a problem to be solved in the present application includes: how to reduce the delay brought about by inter-cell handover and avoid service interruption. The above method provided can solve this problem by making the UE measure reference signals from the cell and its neighbor cell, and determine according to feedback of the UE whether it should update a Transmission Configuration Indicator (TCI) state of a COntrol REsource SET (CORESET) of the cell.

In one embodiment, characteristics of the above method include: the M reference signals include a reference signal from a neighbor cell, and the first node determines to feedback a reference signal of the cell or of the neighbor cell based on the measurement result.

In one embodiment, characteristics of the above method include: the first resource block subset is associated with a CORESET configured for this cell, and the first node determines whether it should update a TCI state of the first resource block subset according to whether a reference signal sent for feedback is a reference signal of the cell or a neighboring cell.

In one embodiment, an advantage of the above method includes: achieving quick cross-cell beam handover and enhancing the performance of users at the cell boundary, and meanwhile avoiding the delay and potential service interruption incurred.

In one embodiment, an advantage of the above method includes: serving the UE with a beam from a neighbor cell selected by the UE while maintaining the UE's communication with the cell, thereby ensuring the quality of service and avoiding the pingpong effect.

According to one aspect of the present application, characterized in comprising:

monitoring the first-type signaling in a second resource block subset using a spatial parameter of a second reference signal before the first time;

herein, the first resource block subset and the second resource block subset are associated with a same control resource set.

According to one aspect of the present application, characterized in comprising:

when the target cell is not added by the first node, monitoring a second-type signaling in a third resource block subset after a second time using a spatial parameter of the first reference signal;

herein, the first reference signal is used to determine the third resource block subset, a transmitter of the second-type signaling including the target cell.

According to one aspect of the present application, characterized in comprising:

receiving a first information block;

herein, a transmitter of the first information block includes the target cell, the first information block being used to determine configuration information of the third resource block subset.

According to one aspect of the present application, characterized in comprising:

receiving a second information block;

monitoring a third-type signaling in a fourth resource block set using a spatial parameter of the first reference signal;

herein, the second information block comprises configuration information of the fourth resource block set, and a transmitter of the second information block includes a second cell, the second cell being added by the first node;

a transmitter of the third-type signaling includes the target cell.

According to one aspect of the present application, characterized in comprising:

receiving a first reference signal set, the first reference signal set comprising at least one reference signal;

herein, a measurement of the first reference signal set is used to trigger transmission of the first signal.

According to one aspect of the present application, characterized in comprising:

receiving M configuration information blocks;

herein, the M configuration information blocks respectively indicate the M reference signals; a transmitter of at least one reference signal among the M reference signals is a second cell, the second cell being added by the first node; among the M configuration information blocks each configuration information block corresponding to a reference signal transmitted by the first cell comprises a first index, the first index being used to indicate the first cell; among the M configuration information blocks each configuration information block corresponding to a reference signal transmitted by the second cell comprises a second index, the second index being used to indicate the second cell.

According to one aspect of the present application, the first node is a UE.

According to one aspect of the present application, the first node is a relay node.

The present application provides a method in a second node for wireless communications, comprising:

receiving a first signal, the first signal indicating a first reference signal out of M reference signals, M being a positive integer greater than 1; and transmitting a first signaling in a first resource block; and transmitting a first-type signaling in a first resource block subset after a first time using a spatial parameter of a target reference signal;

herein, a transmitter of at least one reference signal among the M reference signals is a first cell, the first cell not being added by a transmitter of the first signal; at least one cell maintained by the second node is added by the transmitter of the first signal; a time-domain resource occupied by the first signaling is used to determine the first time; a transmitter of the first reference signal is a target cell, and whether the target cell is added by the transmitter of the first signal is used to determine whether the target reference signal is the first reference signal.

According to one aspect of the present application, characterized in comprising:

transmitting the first-type signaling in a second resource block subset using a spatial parameter of a second reference signal before the first time;

herein, the first resource block subset and the second resource block subset are associated with a same control resource set.

According to one aspect of the present application, characterized in comprising:

transmitting a second information block;

herein, the second information block comprises configuration information of a fourth resource block set, the transmitter of the first signal monitoring a third-type signaling in the fourth resource block set using a spatial parameter of the first reference signal; a transmitter of the third-type signaling includes the target cell.

According to one aspect of the present application, characterized in comprising:

transmitting a first reference signal set, the first reference signal set comprising at least one reference signal;

herein, a measurement of the first reference signal set is used to trigger transmission of the first signal.

According to one aspect of the present application, characterized in comprising:

transmitting M configuration information blocks;

herein, the M configuration information blocks respectively indicate the M reference signals; a transmitter of at least one reference signal among the M reference signals is a second cell, the second cell being added by the transmitter of the first signal; among the M configuration information blocks each configuration information block corresponding to a reference signal transmitted by the first cell comprises a first index, the first index being used to indicate the first cell; among the M configuration information blocks each configuration information block corresponding to a reference signal transmitted by the second cell comprises a second index, the second index being used to indicate the second cell.

According to one aspect of the present application, the second node is a base station.

According to one aspect of the present application, the second node is a UE.

According to one aspect of the present application, the second node is a relay node.

The present application provides a method in a third node for wireless communications, comprising:

receiving a first signal, the first signal indicating a first reference signal out of M reference signals, M being a positive integer greater than 1; and herein, a transmitter of at least one reference signal among the M reference signals is a first cell, the third node being a maintenance base station for the first cell; any cell maintained by the third node is not added by the transmitter of the first signal; the transmitter of the first signal receives a first signaling in a first resource block, a time-domain resource occupied by the first signaling being used to determine a first time, and the transmitter of the first signal monitors a first-type signaling in a first resource block subset after the first time using a spatial parameter of a target reference signal; a transmitter of the first reference signal is a target cell, and whether the target cell is added by the transmitter of the first signal is used to determine whether the target reference signal is the first reference signal.

According to one aspect of the present application, characterized in comprising:

transmitting the first signaling in the first resource block.

According to one aspect of the present application, characterized in comprising:

transmitting a second-type signaling in a third resource block subset after a second time using a spatial parameter of the first reference signal;

herein, the target cell is a cell maintained by the third node, the first reference signal being used to determine the third resource block subset.

According to one aspect of the present application, characterized in comprising:

transmitting a first information block;

herein, the first information block is used to determine configuration information of the third resource block subset.

According to one aspect of the present application, characterized in comprising:

transmitting a third-type signaling in a fourth resource block set using a spatial parameter of the first reference signal;

herein, the target cell is a cell maintained by the third node; a transmitter of configuration information of the fourth resource block set is a cell added by the transmitter of the first signal.

According to one aspect of the present application, the third node is a base station.

According to one aspect of the present application, the third node is a UE.

According to one aspect of the present application, the third node is a relay node.

The present application provides a first node for wireless communications, comprising:

a first transmitter, transmitting a first signal, the first signal indicating a first reference signal out of M reference signals, M being a positive integer greater than 1; and a first receiver, receiving a first signaling in a first resource block, and monitoring a first-type signaling in a first resource block subset after a first time using a spatial parameter of a target reference signal;

herein, a transmitter of at least one reference signal among the M reference signals is a first cell, the first cell not being added by the first node; a time-domain resource occupied by the first signaling is used to determine the first time; a transmitter of the first reference signal is a target cell, and whether the target cell is added by the first node is used to determine whether the target reference signal is the first reference signal.

The present application provides a second node for wireless communications, comprising:

a second receiver, receiving a first signal, the first signal indicating a first reference signal out of M reference signals, M being a positive integer greater than 1; and a second transmitter, transmitting a first signaling in a first resource block, and transmitting a first-type signaling in a first resource block subset after a first time using a spatial parameter of a target reference signal;

herein, a transmitter of at least one reference signal among the M reference signals is a first cell, the first cell not being added by a transmitter of the first signal; at least one cell maintained by the second node is added by the transmitter of the first signal; a time-domain resource occupied by the first signaling is used to determine the first time; a transmitter of the first reference signal is a target cell, and whether the target cell is added by the transmitter of the first signal is used to determine whether the target reference signal is the first reference signal.

The present application provides a third node for wireless communications, comprising:

a first processor, receiving a first signal, the first signal indicating a first reference signal out of M reference signals, M being a positive integer greater than 1; and herein, a transmitter of at least one reference signal among the M reference signals is a first cell, the third node being a maintenance base station for the first cell; any cell maintained by the third node is not added by the transmitter of the first signal; the transmitter of the first signal receives a first signaling in a first resource block, a time-domain resource occupied by the first signaling being used to determine a first time, and the transmitter of the first signal monitors a first-type signaling in a first resource block subset after the first time using a spatial parameter of a target reference signal; a transmitter of the first reference signal is a target cell, and whether the target cell is added by the transmitter of the first signal is used to determine whether the target reference signal is the first reference signal.

The present application provides a method in a first node for wireless communications, comprising:

receiving a first reference signal group;

transmitting a first signal when one of a first condition or a second condition is satisfied;

herein, whether there is a condition being satisfied between the first condition and the second condition is used to determine whether to transmit the first signal; the first signal is used to determine a first reference signal, the first reference signal being one of M reference signal, M being a positive integer greater than 1; a measurement of the first reference signal group is used to determine whether the first condition is satisfied and whether the second condition is satisfied; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, a problem to be solved in the present application includes: how to switch between beams of different cells swiftly to improve the performance of cell-boundary users while avoiding the pingpong effect arising from frequent handovers. As given in the method above, the UE measures reference signals from various cells and takes preference to choose reference signal(s) of a specific cell, including but not limited to serving cells, PCell or cells in an MCG, and only when the reference signals of the specific cell all fail to meet the performance requirement will the UE choose reference signal(s) of other cell(s), including but not limited to neighboring cell or cells in an SCG, hence the solution to the above problem.

In one embodiment, characteristics of the above method include: each reference signal in the first reference signal subset is a reference signal of a specific cell, and the first node gives preference to choosing the reference signal(s) of the specific cell.

In one embodiment, characteristics of the above method include: the second reference signal subset comprises reference signals of other cell(s), when none of the reference signal(s) of the specific cell lives up to the performance requirement, the first node will choose the reference signals of the other cell(s) to ensure the quality of services.

In one embodiment, an advantage of the above method includes: Achieving quick cross-cell beam handover and enhancing the performance of users at the cell boundary, and meanwhile avoiding the delay and potential service interruption caused by cell handover.

In one embodiment, an advantage of the above method includes: the UE will choose reference signals of a specific cell in the first place, so that the service quality can be guaranteed and the pingpong effect can be prevented.

According to one aspect of the present application, characterized in that there are two reference signals among the M reference signals being respectively associated with a first cell and a second cell.

According to one aspect of the present application, characterized in that whether a third condition is satisfied is used to determine whether a value of the first counter is incremented by 1; the third condition comprises: each first-type received quality in a first-type received quality group is poorer than a third threshold; a measurement of the first reference signal group is used to determine the first-type received quality group.

According to one aspect of the present application, characterized in comprising:
receiving the M reference signals;
herein, measurements on the M reference signals are respectively used to determine M second-type received qualities; a second-type received quality corresponding to the first reference signal among the M second-type received qualities is no poorer than a fourth threshold.

According to one aspect of the present application, characterized in comprising:
receiving M configuration information blocks;
herein, the M configuration information blocks respectively indicate the M reference signals; among the M configuration information blocks each configuration information block corresponding to a reference signal transmitted by the first cell comprises a first index, the first index being used to indicate the first cell; among the M configuration information blocks each configuration information block corresponding to a reference signal transmitted by the second cell comprises a second index, the second index being used to indicate the second cell.

According to one aspect of the present application, characterized in comprising:
receiving a first information block;
herein, the first information block is used to determine the first reference signal group.

According to one aspect of the present application, characterized in that there are two reference signals among the M reference signals of which transmitters are respectively a non-serving cell of the first node and a serving cell of the first node; the M reference signals respectively correspond to M radio resource groups; each radio resource group corresponding to a reference signal transmitted by a serving cell of the first node among the M radio resource groups comprises one radio resource; each radio resource group corresponding to a reference signal transmitted by a non-serving cell of the first node among the M radio resource groups comprises two radio resources; a radio resource occupied by the first signal belongs to a radio resource group corresponding to the first reference signal among the M radio resource groups.

According to one aspect of the present application, the first node is a UE.

According to one aspect of the present application, the first node is a relay node.

The present application provides a method in a second node for wireless communications, comprising:
transmitting a first reference signal sub-group; and
monitoring a first signal;
herein, whether there is a condition being satisfied between a first condition and a second condition is used to determine whether the first signal is transmitted; the first signal is used to determine a first reference signal, the first reference signal being one of M reference signal, M being a positive integer greater than 1; a measurement of a first reference signal group is used to determine whether the first condition is satisfied and whether the second condition is satisfied, any reference signal in the first reference signal sub-group belonging to the first reference signal group; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

According to one aspect of the present application, characterized in that there are two reference signals among the M reference signals being respectively associated with a first cell and a second cell, where the second node is a maintenance base station for the second cell.

According to one aspect of the present application, characterized in that whether a third condition is satisfied is used to determine whether a value of the first counter is incremented by 1; the third condition comprises: each first-type received quality in a first-type received quality group is poorer than a third threshold; a measurement of the first reference signal group is used to determine the first-type received quality group.

According to one aspect of the present application, characterized in comprising:

transmitting M1 reference signal(s);

herein, any reference signal of the M1 reference signal(s) is one of the M reference signals, M1 being a positive integer less than M; measurements on the M reference signals are respectively used to determine M second-type received qualities; a second-type received quality corresponding to the first reference signal among the M second-type received qualities is no poorer than a fourth threshold.

According to one aspect of the present application, characterized in comprising:

transmitting M configuration information blocks;

herein, the M configuration information blocks respectively indicate the M reference signals; among the M configuration information blocks each configuration information block corresponding to a reference signal transmitted by the first cell comprises a first index, the first index being used to indicate the first cell; among the M configuration information blocks each configuration information block corresponding to a reference signal transmitted by the second cell comprises a second index, the second index being used to indicate the second cell.

According to one aspect of the present application, characterized in comprising:

transmitting a first information block;

herein, the first information block is used to determine the first reference signal group.

According to one aspect of the present application, characterized in that there are two reference signals among the M reference signals of which transmitters are respectively a non-serving cell of the transmitter of the first signal and a serving cell of the transmitter of the first signal; the M reference signals respectively correspond to M radio resource groups; each radio resource group corresponding to a reference signal transmitted by a serving cell of the transmitter of the first signal among the M radio resource groups comprises one radio resource; each radio resource group corresponding to a reference signal transmitted by a non-serving cell of the transmitter of the first signal among the M radio resource groups comprises two radio resources; a radio resource occupied by the first signal belongs to a radio resource group corresponding to the first reference signal among the M radio resource groups.

According to one aspect of the present application, the second node is a base station.

According to one aspect of the present application, the second node is a UE.

According to one aspect of the present application, the second node is a relay node.

The present application provides a method in a third node for wireless communications, comprising:

monitoring a first signal;

herein, whether there is a condition being satisfied between a first condition and a second condition is used to determine whether the first signal is transmitted; the first signal is used to determine a first reference signal, the first reference signal being one of M reference signal, M being a positive integer greater than 1; a measurement of a first reference signal group is used to determine whether the first condition is satisfied and whether the second condition is satisfied; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

According to one aspect of the present application, characterized in that there are two reference signals among the M reference signals being respectively associated with a first cell and a second cell; the third node is a maintenance base station for the first cell; any cell maintained by the third node is a non-serving cell of the transmitter of the first signal.

According to one aspect of the present application, characterized in comprising:

transmitting a second reference signal sub-group;

herein, any reference signal in the second reference signal sub-group belongs to the first reference signal group.

According to one aspect of the present application, characterized in that whether a third condition is satisfied is used to determine whether a value of the first counter is incremented by 1; the third condition comprises: each first-type received quality in a first-type received quality group is poorer than a third threshold; a measurement of the first reference signal group is used to determine the first-type received quality group.

According to one aspect of the present application, characterized in comprising:

transmitting M2 reference signal(s);

herein, any reference signal of the M2 reference signal(s) is one of the M reference signals, M2 being a positive integer less than M; measurements on the M reference signals are respectively used to determine M second-type received qualities; a second-type received quality corresponding to the first reference signal among the M second-type received qualities is no poorer than a fourth threshold.

According to one aspect of the present application, characterized in that there are two reference signals among the M reference signals of which transmitters are respectively a non-serving cell of the transmitter of the first signal and a serving cell of the transmitter of the first signal; the M reference signals respectively correspond to M radio resource groups; each radio resource group corresponding to a reference signal transmitted by a serving cell of the transmitter of the first signal among the M radio resource groups comprises one radio resource; each radio resource group corresponding to a reference signal transmitted by a non-serving cell of the transmitter of the first signal among the M radio resource groups comprises two radio resources; a radio resource occupied by the first signal belongs to a radio resource group corresponding to the first reference signal among the M radio resource groups.

According to one aspect of the present application, the third node is a base station.

According to one aspect of the present application, the third node is a UE.

According to one aspect of the present application, the third node is a relay node.

The present application provides a first node for wireless communications, comprising:

a first receiver, receiving a first reference signal group; and a first transmitter, transmitting a first signal when one of a first condition or a second condition is satisfied;

herein, whether there is a condition being satisfied between the first condition and the second condition is used to determine whether to transmit the first signal; the first signal is used to determine a first reference signal, the first reference signal being one of M reference signal, M being a positive integer greater than 1; a measurement of the first reference signal group is used to determine whether the first condition is satisfied and whether the second condition is satisfied; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

The present application provides a second node for wireless communications, comprising:

a second transmitter, transmitting a first reference signal sub-group; and a second receiver, monitoring a first signal;

herein, whether there is a condition being satisfied between a first condition and a second condition is used to determine whether the first signal is transmitted; the first signal is used to determine a first reference signal, the first reference signal being one of M reference signal, M being a positive integer greater than 1; a measurement of a first reference signal group is used to determine whether the first condition is satisfied and whether the second condition is satisfied, any reference signal in the first reference signal sub-group belonging to the first reference signal group; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

The present application provides a third node for wireless communications, comprising:

a first processor, monitoring a first signal;

herein, whether there is a condition being satisfied between a first condition and a second condition is used to determine whether the first signal is transmitted; the first signal is used to determine a first reference signal, the first reference signal being one of M reference signal, M being a positive integer greater than 1; a measurement of a first reference signal group is used to determine whether the first condition is satisfied and whether the second condition is satisfied; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, compared with the prior art, the present application is advantageous in the following aspects:

achieving a rapid cross-cell beam handover, which further enhances the performance of cell-boundary users.

obtaining improved performance thanks to cell handover, and avoiding the delay and potential service interruption that may follow.

serving the UE with a beam from a neighbor cell selected by the UE while maintaining the UE's communication with the cell, thereby ensuring the quality of service and avoiding the pingpong effect.

In one embodiment, compared with the prior art, the present application is advantageous in the following aspects:

achieving a rapid cross-cell beam handover, which further enhances the performance of cell-boundary users.

obtaining improved performance thanks to cell handover, and avoiding the delay and potential service interruption that may follow.

preferring to choose a reference signal of a specific cell, thus avoiding the pingpong effect with the quality of service guaranteed.

BRIEF DESCRIPTION OF THE DRAWINGS

Other features, objects and advantages of the present application will become more apparent from the detailed description of non-restrictive embodiments taken in conjunction with the following drawings:

FIG. 6 illustrates a schematic diagram of a first resource block according to one embodiment of the present application.

FIG. 7 illustrates a schematic diagram of a first resource block subset according to one embodiment of the present application.

FIG. 8 illustrates a schematic diagram of monitoring a given signaling in a given resource using a spatial parameter of a given reference signal according to one embodiment of the present application.

FIG. 9 illustrates a schematic diagram of determining whether a target reference signal is a first reference signal according to one embodiment of the present application.

FIG. 10 illustrates a schematic diagram of a second resource block subset according to one embodiment of the present application.

FIG. 11 illustrates a schematic diagram of a third resource block subset according to one embodiment of the present application.

FIG. 12 illustrates a schematic diagram of a first information block according to one embodiment of the present application.

FIG. 13 illustrates a schematic diagram of a fourth resource block set according to one embodiment of the present application.

FIG. 14 illustrates a schematic diagram of a measurement of a first reference signal set being used to trigger transmission of a first signal according to one embodiment of the present application.

FIG. 15 illustrates a schematic diagram of M configuration information blocks according to one embodiment of the present application.

FIG. 16 illustrates a structure block diagram of a processing device in a first node according to one embodiment of the present application.

FIG. 17 illustrates a structure block diagram of a processing device in a second node according to one embodiment of the present application.

FIG. 18 illustrates a structure block diagram of a processing device in a third node according to one embodiment of the present application.

FIG. 19 illustrates a flowchart of a first reference signal group and a first signal according to one embodiment of the present application.

FIG. 23 illustrates a schematic diagram of a relation between a third condition and a first counter according to one embodiment of the present application.

FIG. 24 illustrates a schematic diagram of M reference signals and M second-type received qualities according to one embodiment of the present application.

FIG. 25 illustrates a schematic diagram of M configuration information blocks according to one embodiment of the present application.

FIG. 26 illustrates a schematic diagram of a first information block according to one embodiment of the present application.

FIG. 27 illustrates a schematic diagram of M reference signals and M radio resource groups according to one embodiment of the present application.

FIG. 28 illustrates a schematic diagram of a radio resource occupied by a first signal according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
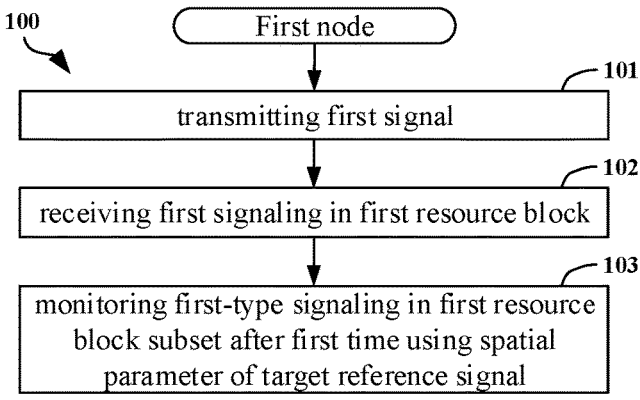
FIG. 1 illustrates a flowchart of a first signal, a first signaling and a first-type signaling according to one embodiment of the present application.

Embodiment 1 illustrates a flowchart of a first signal, a first signaling and a first-type signaling according to one embodiment of the present application, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present application transmits a first signal in step 101; receives a first signaling in a first resource block in step 102; and monitors a first-type signaling in a first resource block subset after a first time using a spatial parameter of a target reference signal in step 103; herein, the first signal indicates a first reference signal out of M reference signals, M being a positive integer greater than 1; and a transmitter of at least one reference signal among the M reference signals is a first cell, the first cell not being added by the first node; a time-domain resource occupied by the first signaling is used to determine the first time; a transmitter of the first reference signal is a target cell, and whether the target cell is added by the first node is used to determine whether the target reference signal is the first reference signal.

In one embodiment, the first signal comprises a baseband signal.

In one embodiment, the first signal comprises a radio signal.

In one embodiment, the first signal comprises a radio frequency signal.

In one embodiment, the first signal comprises a first characteristic sequence.

In one embodiment, the first characteristic sequence comprises one or more of a pseudo-random sequence, a Zadoff-Chu sequence or a low-Peak-to-Average Power Ratio (low-PAPR) sequence.

In one embodiment, the first characteristic sequence comprises Cyclic Prefix (CP).

In one embodiment, the first signal comprises a Random Access Channel (RACH) Preamble.

In one embodiment, the first signal comprises Uplink control information (UCI).

In one embodiment, the first signal comprises a Link Recovery Request (LRR).

In one embodiment, the first signal comprises a Medium Access Control layer Control Element (MAC CE).

In one embodiment, the first signal comprises a Beam Recovery Request (BRR).

In one embodiment, the first signal comprises a Beam Failure Recovery reQuest (BFRQ).

In one embodiment, a radio resource occupied by the first signal is used to determine the first reference signal.

In one embodiment, a radio resource occupied by the first signal indicates the first reference signal out of the M reference signals.

In one embodiment, a radio resource occupied by the first signal is one of M candidate radio resources; the M candidate radio resources respectively correspond to the M reference signals; the first reference signal is a reference signal corresponding to a radio resource occupied by the first signal among the M reference signals.

In one embodiment, the M candidate radio resources respectively comprise M Physical Random Access Channels (PRACHs).

In one embodiment, any of the M candidate radio resources comprises a time-frequency resource and a code-domain resource.

In one embodiment, the M candidate radio resources are configured by a higher layer signaling.

In one embodiment, relations of correspondence between the M candidate radio resources and the M reference signals are configured by a higher layer parameter.

In one embodiment, a higher layer parameter used for configuring relations of correspondence between the M candidate radio resources and the M reference signals comprises all or partial information in a candidateBeamRSList field of a BeamFailureRecoveryConfig Information Element (IE).

In one embodiment, the M configuration information blocks are respectively used to indicate the M candidate radio resources.

In one embodiment, the M configuration information blocks are respectively used to indicate relations of correspondence between the M candidate radio resources and the M reference signals.

In one embodiment, the first signal comprises a first bit field, the first bit field comprising a positive integer number of bit(s); a value of the first bit field indicates the first reference signal.

In one embodiment, a second cell is added by the first node.

In one embodiment, a radio resource occupied by the first signal is configured by the second cell.

In one embodiment, a radio resource occupied by the first signal is configured by the first cell.

In one embodiment, a third cell is a cell different from the first cell, the third cell being not added by the first node.

In one embodiment, a radio resource occupied by the first signal is configured by the third cell.

In one embodiment, the radio resource comprises a PRACH resource.

In one embodiment, the radio resource comprises a time-domain resource and a code-domain resource.

In one embodiment, the radio resource comprises a code-domain resource.

In one embodiment, the code-domain resource comprises one or more of a pseudo-random sequence, a Zadoff-Chu sequence or a low-PAPR sequence or a CP.

In one embodiment, the code-domain resource comprises one or more of a cyclic shift, an Orthogonal Cover Code (OCC), a frequency-domain orthogonal sequence or a time-domain orthogonal sequence.

In one embodiment, the M reference signals include a Channel State Information-Reference Signal (CSI-RS).

In one embodiment, the M reference signals include a Synchronisation Signal/physical broadcast channel Block (SSB).

In one embodiment, the M reference signals include a Sounding Reference Signal (SRS).

In one embodiment, any of the M reference signals comprises a CSI-RS or an SSB.

In one embodiment, the M reference signals are configured by a higher layer parameter.

In one embodiment, a higher layer parameter used for configuring the M reference signals comprises all or partial information in a candidateBeamRSList field of a BeamFailureRecoveryConfig IE.

In one embodiment, the M reference signals are configured by an IE.

In one embodiment, names of an IE used for configuring the M reference signals include BeamFailureRecovery.

In one embodiment, M is equal to 2.

In one embodiment, M is greater than 2.

In one embodiment, any of the M reference signals is a periodic reference signal.

In one embodiment, any of the M reference signals is a periodic reference signal or a semi-persistent reference signal.

In one embodiment, there is a reference signal being a semi-persistent reference signal or an aperiodic reference signal among the M reference signals.

In one embodiment, there is a reference signal among the M reference signals that belongs to a different Bandwidth Part (BWP) from the first resource block.

In one embodiment, any of the M reference signals belongs to a same BWP as the first resource block.

In one embodiment, a reference signal of the M reference signals and the first resource block belong to a same BWP.

In one embodiment, the first signaling comprises a physical-layer signaling.

In one embodiment, the first signaling comprises a dynamic signaling.

In one embodiment, the first signaling comprises a layer 1 (L1) signaling.

In one embodiment, the first signaling comprises a layer 1 (L1) control signaling.

In one embodiment, the first signaling comprises Downlink Control Information (DCI).

In one embodiment, the first signaling comprises one or more fields in a DCI.

In one embodiment, the first signaling comprises one or more fields in a piece of Sidelink Control Information (SCI).

In one embodiment, Cyclic Redundancy Check (CRC) of the first signaling is scrambled by a Cell-Radio Network Temporary Identifier (C-RNTI) or a Modulation and Coding Scheme-C-RNTI (MCS-C-RNTI).

In one subembodiment, the C-RNTI is configured by the second cell.

In one subembodiment, the MCS-C-RNTI is configured by the second cell.

In one embodiment, a transmitter of the first signaling is the second cell.

In one embodiment, a transmitter of the first signaling is the first cell.

In one embodiment, a transmitter of the first signaling is the third cell.

In one embodiment, a PhysCellId of the second cell is used for generating an RS sequence of DeModulation Reference Signals (DMRS) of the first signaling.

In one embodiment, a PhysCellId of the first cell is used for generating an RS sequence of DMRS of the first signaling.

In one embodiment, a PhysCellId of the third cell is used for generating an RS sequence of DMRS of the first signaling.

In one embodiment, the first time is later than the first signaling.

In one embodiment, a time interval between the first time and the first signaling is no smaller than a first interval, where the first interval is a positive integer, and the first interval is measured in a unit of multicarrier symbols.

In one embodiment, the time interval between the first time and the first signaling refers to a time interval between the first time and a last multicarrier symbol occupied by the first signaling.

In one embodiment, the time interval between the first time and the first signaling refers to a time interval between the first time and an end time of a time-domain resource occupied by the first signaling.

In one embodiment, the first interval is fixed.

In one embodiment, the first interval is fixed to 28 multicarrier symbols.

In one embodiment, the time interval between the first time and the first signaling is equal to the first interval.

In one embodiment, the time interval between the first time and the first signaling is larger than the first interval.

In one embodiment, the multicarrier symbol is an Orthogonal Frequency Division Multiplexing (OFDM) Symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, a Subcarrier spacing corresponding to the multicarrier symbol is equal to a subcarrier spacing (scs) corresponding to the first signaling.

In one embodiment, the spatial parameter comprises a Transmission Configuration Indicator (TCI) state.

In one embodiment, the spatial parameter comprises Quasi-Co-Located (QCL) assumption.

In one embodiment, the spatial parameter comprises a QCL parameter.

In one embodiment, the spatial parameter comprises a Spatial Relation.

In one embodiment, the spatial parameter comprises a spatial domain filter.

In one embodiment, the spatial parameter comprises a spatial domain transmission filter.

In one embodiment, the spatial parameter comprises a spatial domain receive filter.

In one embodiment, the spatial parameter comprises a Spatial Tx parameter.

In one embodiment, the spatial parameter comprises a Spatial Rx parameter.

In one embodiment, the spatial parameter comprises large-scale properties.

In one embodiment, the large-scale properties include one or more of a delay spread, a Doppler spread, a Doppler shift, or an average delay or a Spatial Rx parameter.

In one embodiment, the target reference signal is a downlink reference signal.

In one embodiment, the target reference signal comprises a CSI-RS.

In one embodiment, the target reference signal comprises an SSB.

In one embodiment, the target reference signal is used to determine a time-domain resource occupied by the first resource block subset.

In one embodiment, the target reference signal is used to determine slot(s) occupied by the first resource block subset.

In one embodiment, the target reference signal and a fourth reference signal are QCL, an index of the fourth reference signal being used to determine a time-domain resource occupied by the first resource block subset.

In one embodiment, an index of the fourth reference signal includes an SSB-Index.

In one embodiment, the fourth reference signal comprises an SSB.

In one embodiment, the fourth reference signal is the target reference signal.

In one embodiment, an index of the fourth reference signal is used to determine slot(s) occupied by the first resource block subset.

In one embodiment, an index of any slot occupied by the first resource block subset is equal to a sum of a third integer and a fourth parameter mod a fourth integer; the third integer is equal to a product of an index of the fourth reference signal and a fifth parameter being rounded down to a nearest integer, and the fourth parameter is equal to a product of a sixth parameter and a second SCS configuration power of 2, and the fourth integer is equal to a number of slots comprised per frame under the second SCS configuration; the fifth parameter is a positive real number, and the sixth parameter is a non-negative real number; the second SCS configuration is a non-negative integer.

In one embodiment, the second SCS configuration is a subcarrier spacing configuration corresponding to the first-type signaling.

In one embodiment, the second SCS configuration is a subcarrier spacing configuration corresponding to the first signaling.

In one embodiment, a second Master Information Block (MIB) is used to determine the fifth parameter and the sixth parameter.

In one embodiment, a second MIB is used to determine a frequency-domain resource occupied by the first resource block subset.

In one embodiment, a second MIB is used to determine configuration information of a CORESET associated with the first resource block subset.

In one embodiment, a second MIB is used to determine configuration information of a search space set to which the first resource block subset belongs.

In one embodiment, a transmitter of the second MIB is the second cell.

In one embodiment, the first-type signaling comprises a physical-layer signaling.

In one embodiment, the first-type signaling comprises a layer 1 (L1) signaling.

In one embodiment, the first-type signaling comprises DCI.

In one embodiment, the first-type signaling comprises one or more fields in a DCI.

In one embodiment, the first-type signaling comprises one or more fields in an SCI.

In one embodiment, a transmitter of the first-type signaling is the second cell.

In one embodiment, a transmitter of the first-type signaling is the first cell.

In one embodiment, a transmitter of the first-type signaling is the third cell.

In one embodiment, a transmitter of the first-type signaling is different from a transmitter of the first signaling.

In one embodiment, a transmitter of the first-type signaling is a transmitter of the first signaling.

In one embodiment, an RNTI used for scrambling CRC of the first-type signaling includes a C-RNTI.

In one embodiment, an RNTI used for scrambling CRC of the first-type signaling includes a System Information (SI)-RNTI.

In one embodiment, an RNTI used for scrambling CRC of the first-type signaling includes one or more of a Configured Scheduling (CS)-RNTI, or an MCS-C-RNTI, or a paging-RNTI (P-RNTI).

In one embodiment, a PhysCellId of the second cell is used for generating an RS sequence of DMRS of the first-type signaling.

In one embodiment, the first reference signal comprises a CSI-RS.

In one embodiment, the first reference signal comprises an SSB.

In one embodiment, the target cell is added by the first node.

In one embodiment, the target cell isn't added by the first node.

In one embodiment, the target cell is the first cell.

In one embodiment, the target cell is the second cell.

In one embodiment, the target cell is different from the second cell.

In one embodiment, the target cell is the third cell.

In one embodiment, the first node assumes that the spatial parameter of an antenna port of the first signaling and the spatial parameter of the first reference signal are the same.

In one embodiment, whether the target cell is added by the first node is used by the first node to determine whether the spatial parameter of an antenna port of the first signaling and the spatial parameter of the first reference signal are the same.

In one embodiment, if the target cell is added by the first node, the first node assumes that the spatial parameter of an antenna port of the first signaling and the spatial parameter of the first reference signal are the same.

In one embodiment, if the target cell is not added by the first node, the first node cannot assume that the spatial parameter of an antenna port of the first signaling and the spatial parameter of the first reference signal are the same.

In one embodiment, if the target cell is not added by the first node, the first node assumes that the spatial parameter of an antenna port of the first signaling and the spatial parameter of the second reference signal are the same.

In one embodiment, if the first node assumes that the spatial parameter of an antenna port of the first signaling and the spatial parameter of the first reference signal are the same, the first node receives the first signaling and the first reference signal using a same spatial domain filter.

In one embodiment, if the first node assumes that the spatial parameter of an antenna port of the first signaling and the spatial parameter of the first reference signal are the same, the first node assumes that the antenna port of the first signaling and the first reference signal are QCL.

In one embodiment, if the first node assumes that the spatial parameter of an antenna port of the first signaling and the spatial parameter of the first reference signal are the same, the first node assumes that the antenna port of the first signaling and the first reference signal are QCL with at least one of QCL-TypeA or QCL-T eD.

In one embodiment, the first signal indicates whether the first reference signal can be used for updating a spatial parameter of an uplink transmission of the first node.

In one embodiment, the first signal comprises a second bit field, the second bit field comprising a positive integer number of bit(s), and the second bit field indicating whether the first reference signal can be used for updating a spatial parameter of an uplink transmission of the first node.

In one embodiment, a spatial-domain resource occupied by the first signal is used to indicate whether the first reference signal can be used for updating a spatial parameter of an uplink transmission of the first node.

Embodiment 2

Figure 2:
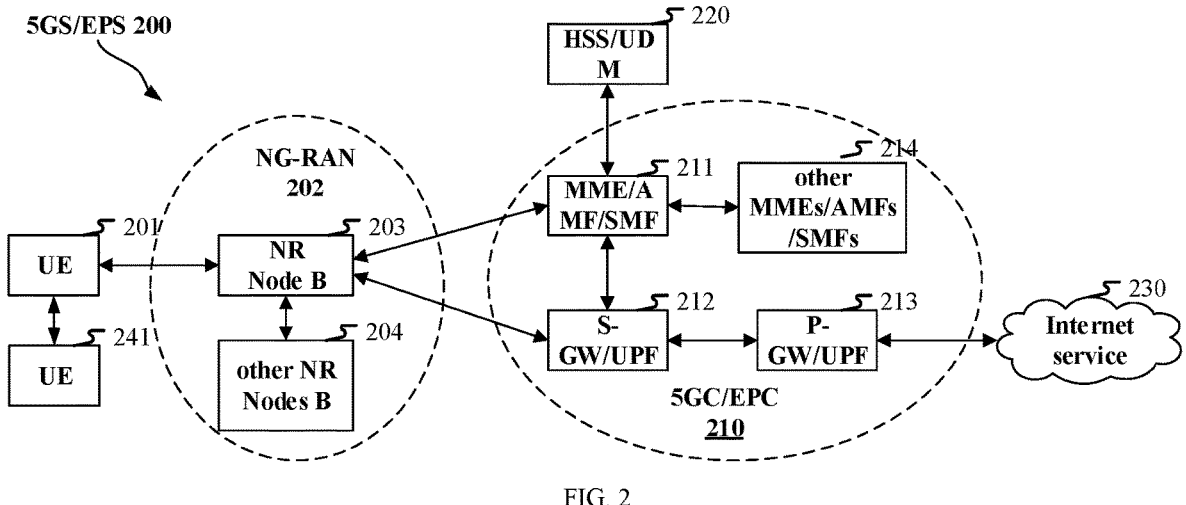
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture of Long-Term Evolution (LTE), Long-Term Evolution Advanced (LTE-A) and future 5G systems. The LTE, or LTE-A or future 5G network architecture 200 may be called an Evolved Packet System (EPS) 200. The 5G NR or LTE network 200 can be called a 5G System/Evolved Packet System (5GS/EPS)200 or other appropriate terms. The 5GS/EPS 200 may comprise one or more UEs 201, a UE 241 in sidelink communication with the UE(s) 201, an NG-RAN 202, a 5G CoreNetwork/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the first node in the present application includes the UE 241.

In one embodiment, the second node in the present application includes the gNB 203.

In one embodiment, the third node in the present application includes the gNB 204.

In one embodiment, a radio link between the UE 201 and the gNB 203 is a cellular link.

In one embodiment, a radio link between the UE 201 and the UE 241 is a sidelink.

In one embodiment, a transmitter for the first signal in the present application includes the UE 201.

In one embodiment, a receiver for the first signal in the present application includes the gNB 203.

In one embodiment, a transmitter for the first signaling in the present application includes the gNB 203.

In one embodiment, a transmitter for the first signaling in the present application includes the gNB 204.

In one embodiment, a receiver for the first signaling in the present application includes the UE 201.

In one embodiment, a transmitter for the first-type signaling in the present application includes the gNB 203.

In one embodiment, a receiver for the first-type signaling in the present application includes the UE 201.

In one embodiment, a transmitter for the first reference signal group in the present application includes the gNB 203.

In one embodiment, a receiver for the first reference signal group in the present application includes the UE 201.

In one embodiment, a receiver for the first signal in the present application includes the gNB 204.

Embodiment 3

Figure 3:
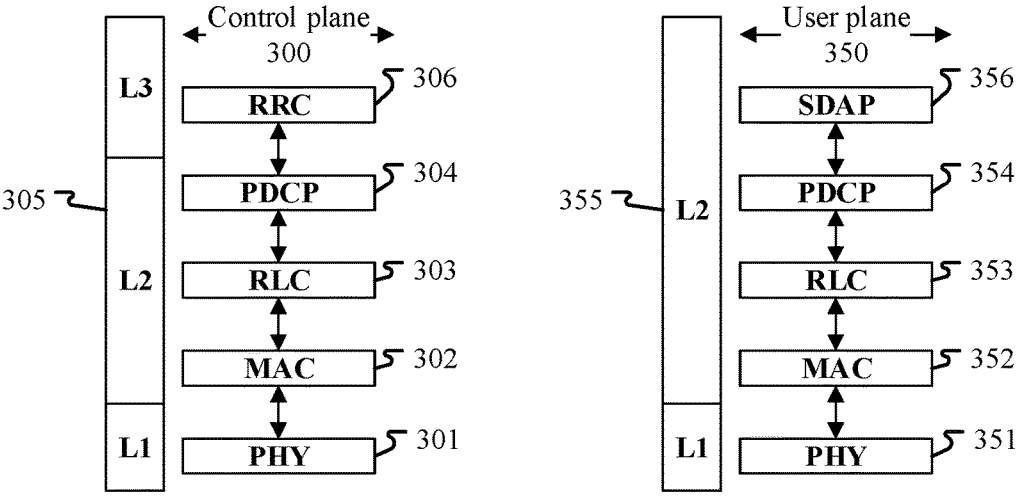
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node or between two UEs. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the first signal is generated by the PHY 301, or the PHY 351.

In one embodiment, the first signal is generated by the MAC sublayer 302, or the MAC sublayer 352.

In one embodiment, the first signaling is generated by the PHY 301, or the PHY 351.

In one embodiment, the first signaling is generated by the MAC sublayer 302, or the MAC sublayer 352.

In one embodiment, the first-type signaling is generated by the PHY 301, or the PHY 351.

In one embodiment, the first-type signaling is generated by the MAC sublayer 302, or the MAC sublayer 352.

In one embodiment, the first reference signal group is generated by the PHY 301, or the PHY 351.

Embodiment 4

Figure 4:
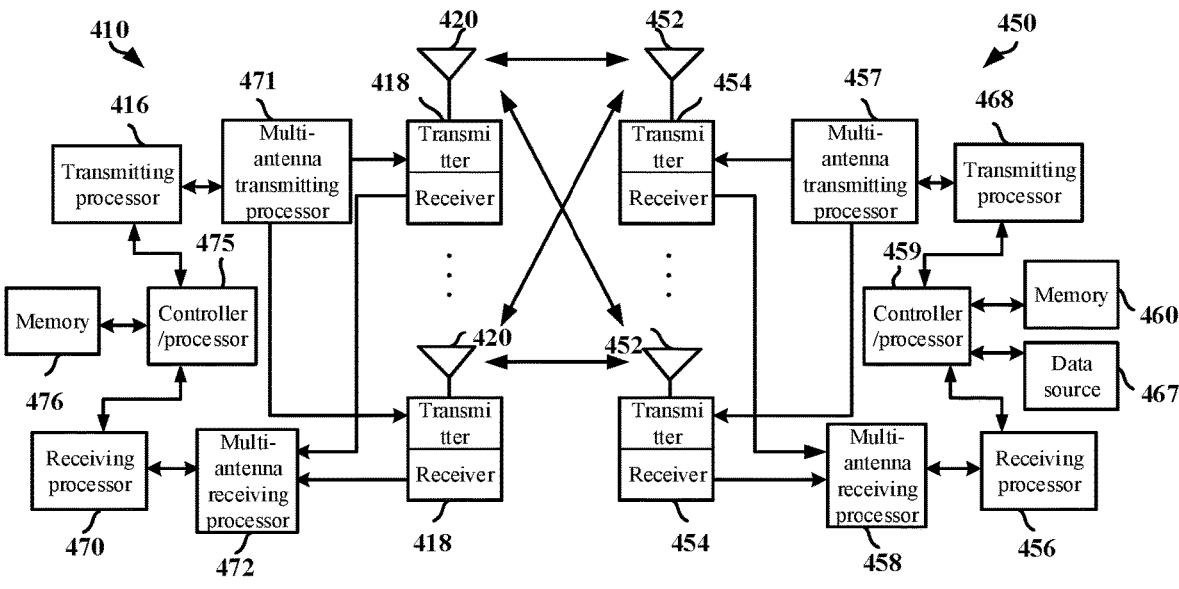
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any parallel stream targeting the second communication device 450. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor. The second communication device 450 at least: transmits the first signal; receives the first signaling in the first resource block; and monitors the first-type signaling in the first resource block subset after the first time using a spatial parameter of the target reference signal. herein, the first signal indicates a first reference signal out of M reference signals, M being a positive integer greater than 1; and a transmitter of at least one reference signal among the M reference signals is a first cell, the first cell not being added by the second communication device 450; a time-domain resource occupied by the first signaling is used to determine the first time; a transmitter of the first reference signal is a target cell, and whether the target cell is added by the second communication device 450 is used to determine whether the target reference signal is the first reference signal.

In one embodiment, the second communication device 450 comprises a memory that stores a computer readable instruction program, the computer readable instruction program generates actions when executed by at least one processor, which include: transmitting the first signal; receiving the first signaling in the first resource block; and monitoring the first-type signaling in the first resource block subset after the first time using a spatial parameter of the target reference signal. the first signal indicates a first reference signal out of M reference signals, M being a positive integer greater than 1; and a transmitter of at least one reference signal among the M reference signals is a first cell, the first cell not being added by the second communication device 450; a time-domain resource occupied by the first signaling is used to determine the first time; a transmitter of the first reference signal is a target cell, and whether the target cell is added by the second communication device 450 is used to determine whether the target reference signal is the first reference signal.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: receives the first signal, and transmits the first signaling in the first resource block; and transmits the first-type signaling in the first resource block subset after the first time using a spatial parameter of the target reference signal. herein, the first signal indicates a first reference signal out of M reference signals, M being a positive integer greater than 1; and a transmitter of at least one reference signal among the M reference signals is a first cell, the first cell not being added by a transmitter of the first signal; at least one cell maintained by the first communication device 410 is added by the transmitter of the first signal; a time-domain resource occupied by the first signaling is used to determine the first time; a transmitter of the first reference signal is a target cell, and whether the target cell is added by the transmitter of the first signal is used to determine whether the target reference signal is the first reference signal.

In one embodiment, the first communication device 410 comprises a memory that stores a computer readable instruction program, the computer readable instruction program generates actions when executed by at least one processor, which include: receiving the first signal, and transmitting the first signaling in the first resource block; and transmitting the first-type signaling in the first resource block subset after the first time using a spatial parameter of the target reference signal. herein, the first signal indicates a first reference signal out of M reference signals, M being a positive integer greater than 1; and a transmitter of at least one reference signal among the M reference signals is a first cell, the first cell not being added by a transmitter of the first signal; at least one cell maintained by the first communication device 410 is added by the transmitter of the first signal; a time-domain resource occupied by the first signaling is used to determine the first time; a transmitter of the first reference signal is a target cell, and whether the target cell is added by the transmitter of the first signal is used to determine whether the target reference signal is the first reference signal.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: receives the first signal. the first signal indicates a first reference signal out of M reference signals, M being a positive integer greater than 1; and a transmitter of at least one reference signal among the M reference signals is a first cell, the first communication device 410 being a maintenance base station for the first cell; any cell maintained by the first communication device 410 is not added by the transmitter of the first signal; the transmitter of the first signal receives a first signaling in a first resource block, a time-domain resource occupied by the first signaling being used to determine a first time, and the transmitter of the first signal monitors a first-type signaling in a first resource block subset after the first time using a spatial parameter of a target reference signal; a transmitter of the first reference signal is a target cell, and whether the target cell is added by the transmitter of the first signal is used to determine whether the target reference signal is the first reference signal.

In one embodiment, the first communication device 410 comprises a memory that stores a computer readable instruction program, the computer readable instruction program generates actions when executed by at least one processor, which include: receiving the first signal. the first signal indicates a first reference signal out of M reference signals, M being a positive integer greater than 1; and a transmitter of at least one reference signal among the M reference signals is a first cell, the first communication device 410 being a maintenance base station for the first cell; any cell maintained by the first communication device 410 is not added by the transmitter of the first signal; the transmitter of the first signal receives a first signaling in a first resource block, a time-domain resource occupied by the first signaling being used to determine a first time, and the transmitter of the first signal monitors a first-type signaling in a first resource block subset after the first time using a spatial parameter of a target reference signal; a transmitter of the first reference signal is a target cell, and whether the target cell is added by the transmitter of the first signal is used to determine whether the target reference signal is the first reference signal.

In one embodiment, the second communication device 450 comprises at least one processor and at least one memory, the at least one memory comprises computer program codes; the at least one memory and the computer program codes are configured to be used in collaboration with the at least one processor. The second communication device 450 at least: receives the first reference signal group; and transmits the first signal when one of the first condition or the second condition is satisfied. herein, whether there is a condition being satisfied between the first condition and the second condition is used to determine whether to transmit the first signal; the first signal is used to determine a first reference signal, the first reference signal being one of M reference signal, M being a positive integer greater than 1; a measurement of the first reference signal group is used to determine whether the first condition is satisfied and whether the second condition is satisfied; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, the second communication device 450 comprises a memory that stores a computer readable instruction program, the computer readable instruction program generates actions when executed by at least one processor, which include: receiving the first reference signal group; and transmitting the first signal when one of the first condition or the second condition is satisfied. herein, whether there is a condition being satisfied between the first condition and the second condition is used to determine whether to transmit the first signal; the first signal is used to determine a first reference signal, the first reference signal being one of M reference signal, M being a positive integer greater than 1; a measurement of the first reference signal group is used to determine whether the first condition is satisfied and whether the second condition is satisfied; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits the first reference signal sub-group; and monitors the first signal. Whether there is a condition being satisfied between a first condition and a second condition is used to determine whether the first signal is transmitted; the first signal is used to determine a first reference signal, the first reference signal being one of M reference signal, M being a positive integer greater than 1; a measurement of a first reference signal group is used to determine whether the first condition is satisfied and whether the second condition is satisfied, any reference signal in the first reference signal sub-group belonging to the first reference signal group; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, the first communication device 410 comprises a memory that stores a computer readable instruction program, the computer readable instruction program generates actions when executed by at least one processor, which include: transmitting the first reference signal sub-group; and monitoring the first signal. Whether there is a condition being satisfied between a first condition and a second condition is used to determine whether the first signal is transmitted; the first signal is used to determine a first reference signal, the first reference signal being one of M reference signal, M being a positive integer greater than 1; a measurement of a first reference signal group is used to determine whether the first condition is satisfied and whether the second condition is satisfied, any reference signal in the first reference signal sub-group belonging to the first reference signal group; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, the first node in the present application comprises the second communication device 450.

In one embodiment, the second node in the present application comprises the first communication device 410.

In one embodiment, the third node in the present application comprises the first communication device 410.

In one embodiment, at least one of the antenna 420, the receiver 418, the receiving processor 470, the multi-antenna receiving processor 472, the controller/processor 475 or the memory 476 is used to receive the first signal; at least one of the antenna 452, the transmitter 454, the transmitting processor 468, the multi-antenna transmitting processor 457, the controller/processor 459, or the memory 460 is used to transmit the first signal.

In one embodiment, at least one of the antenna 452, the receiver 454, the receiving processor 456, the multi-antenna receiving processor 458, the controller/processor 459, the memory 460 or the data source 467 is used to receive the first signaling in the first resource block; at least one of the antenna 420, the transmitter 418, the transmitting processor 416, the multi-antenna transmitting processor 471, the controller/processor 475 or the memory 476 is used to transmit the first signaling in the first resource block.

In one embodiment, at least one of the antenna 452, the receiver 454, the receiving processor 456, the multi-antenna receiving processor 458, the controller/processor 459, the memory 460 or the data source 467 is used to monitor the first-type signaling in the first resource block subset after the first time using a spatial parameter of the target reference signal; at least one of the antenna 420, the transmitter 418, the transmitting processor 416, the multi-antenna transmitting processor 471, the controller/processor 475 or the memory 476 is used to transmit the first-type signaling in the first resource block subset after the first time using a spatial parameter of the target reference signal.

In one embodiment, at least one of the antenna 452, the receiver 454, the receiving processor 456, the multi-antenna receiving processor 458, the controller/processor 459, the memory 460 or the data source 467 is used to monitor the first-type signaling in the second resource block subset before the first time using a spatial parameter of the second reference signal; at least one of the antenna 420, the transmitter 418, the transmitting processor 416, the multi-antenna transmitting processor 471, the controller/processor 475 or the memory 476 is used to transmit the first-type signaling in the second resource block subset before the first time using a spatial parameter of the second reference signal.

In one embodiment, at least one of the antenna 452, the receiver 454, the receiving processor 456, the multi-antenna receiving processor 458, the controller/processor 459, the memory 460 or the data source 467 is used to monitor the second-type signaling in the third resource block subset after the second time using a spatial parameter of the first reference signal; at least one of the antenna 420, the transmitter 418, the transmitting processor 416, the multi-antenna transmitting processor 471, the controller/processor 475 or the memory 476 is used to transmit the second-type signaling in the third resource block subset after the second time using a spatial parameter of the first reference signal.

In one embodiment, at least one of the antenna 452, the receiver 454, the receiving processor 456, the multi-antenna receiving processor 458, the controller/processor 459, the memory 460 or the data source 467 is used to monitor the third-type signaling in the fourth resource block set using a spatial parameter of the first reference signal; at least one of the antenna 420, the transmitter 418, the transmitting processor 416, the multi-antenna transmitting processor 471, the controller/processor 475 or the memory 476 is used to transmit the third-type signaling in the fourth resource block set using a spatial parameter of the first reference signal.

In one embodiment, at least one of the antenna 452, the receiver 454, the receiving processor 456, the multi-antenna receiving processor 458, the controller/processor 459, the memory 460 or the data source 467 is used to receive the first information block; at least one of the antenna 420, the transmitter 418, the transmitting processor 416, the multi-antenna transmitting processor 471, the controller/processor 475 or the memory 476 is used to transmit the first information block.

In one embodiment, at least one of the antenna 452, the receiver 454, the receiving processor 456, the multi-antenna receiving processor 458, the controller/processor 459, the memory 460 or the data source 467 is used to receive the second information block; at least one of the antenna 420, the transmitter 418, the transmitting processor 416, the multi-antenna transmitting processor 471, the controller/processor 475 or the memory 476 is used to transmit the second information block.

In one embodiment, at least one of the antenna 452, the receiver 454, the receiving processor 456, the multi-antenna receiving processor 458, the controller/processor 459, the memory 460 or the data source 467 is used to receive the first reference signal set; at least one of the antenna 420, the transmitter 418, the transmitting processor 416, the multi-antenna transmitting processor 471, the controller/processor 475 or the memory 476 is used to transmit the first reference signal set.

In one embodiment, at least one of the antenna 452, the receiver 454, the receiving processor 456, the multi-antenna receiving processor 458, the controller/processor 459, the memory 460 or the data source 467 is used to receive the M configuration information blocks; at least one of the antenna 420, the transmitter 418, the transmitting processor 416, the multi-antenna transmitting processor 471, the controller/processor 475 or the memory 476 is used to transmit the M configuration information blocks.

In one embodiment, at least one of the antenna 452, the receiver 454, the receiving processor 456, the multi-antenna receiving processor 458, the controller/processor 459, the memory 460 or the data source 467 is used to receive the first reference signal group; at least one of the antenna 420, the transmitter 418, the transmitting processor 416, the multi-antenna transmitting processor 471, the controller/processor 475 or the memory 476 is used to transmit the first reference signal group.

In one embodiment, at least one of the antenna 452, the receiver 454, the receiving processor 456, the multi-antenna receiving processor 458, the controller/processor 459, the memory 460 or the data source 467 is used to receive the M reference signals; at least one of the antenna 420, the transmitter 418, the transmitting processor 416, the multi-antenna transmitting processor 471, the controller/processor 475 or the memory 476 is used to transmit some or all of reference signals among the M reference signals.

Embodiment 5

Figure 5:
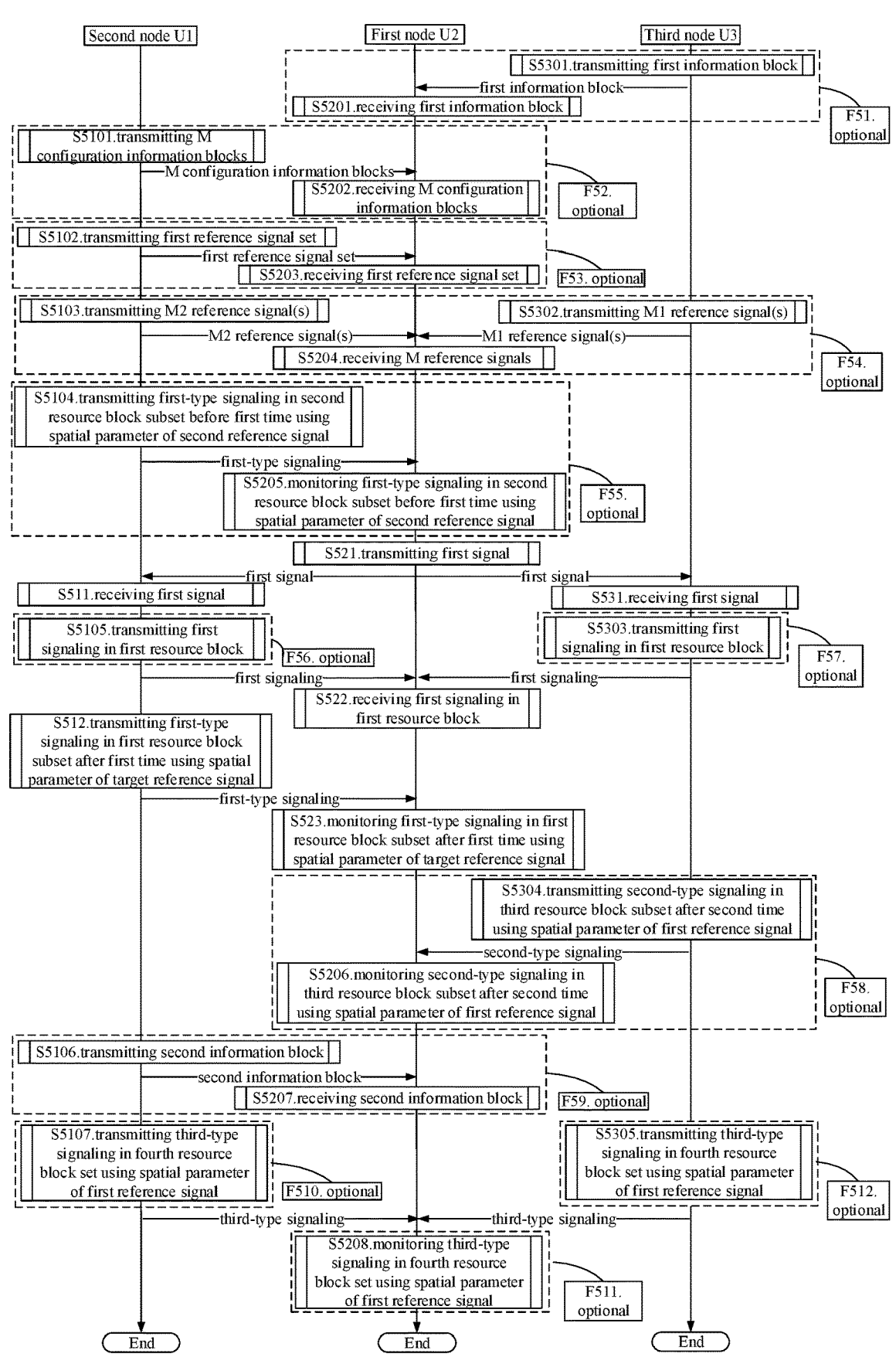
FIG. 5 illustrates a flowchart of transmission according to one embodiment of the present application.

Embodiment 5 illustrates a flowchart of wireless transmission according to one embodiment of the present application, as shown in FIG. 5. In FIG. 5, a second node U1, a first node U2 and a third node U3 are communication nodes that mutually transmit through air interfaces. In FIG. 5, steps marked by boxes F51 to F512 are optional, respectively.

The second node U1 transmits M configuration information blocks in step S5101; transmits a first reference signal set in step S5102; and transmits M2 reference signal(s) in step S5103; transmits a first-type signaling in a second resource block subset using a spatial parameter of a second reference signal before a first time in step S5104; receives a first signal in step S511; and transmits a first signaling in a first resource block in step S5105; and transmits the first-type signaling in a first resource block subset after the first time using a spatial parameter of a target reference signal in step S512; transmits a second information block in step S5106; and transmits a third-type signaling in a fourth resource block set using a spatial parameter of a first reference signal in step S5107;

The first node U2 receives a first information block in step S5201; receives M configuration information blocks in step S5202; receives a first reference signal set in step S5203; and receives M reference signals in step S5204; monitors a first-type signaling in a second resource block subset using a spatial parameter of a second reference signal before a first time in step S5205; and transmits a first signal in step S521; receives a first signaling in a first resource block in step S5222; and monitors the first-type signaling in a first resource block subset after the first time using a spatial parameter of a target reference signal in step S523; monitors a second-type signaling in a third resource block subset after a second time using a spatial parameter of a first reference signal in step S5206; and receives a second information block in step S5207; and monitors a third-type signaling in a fourth resource block set using a spatial parameter of the first reference signal in step S5208;

The third node U3 transmits a first information block in step S5301; transmits M1 reference signal(s) in step S5302; and receives a first signal in step S531; and transmits a first signaling in a first resource block in step S5303; transmits a second-type signaling in a third resource block subset after a second time using a spatial parameter of a first reference signal in step S5304; and transmits a third-type signaling in a fourth resource block set using a spatial parameter of the first reference signal in step S5305;

In Embodiment 5, the first signal indicates the first reference signal out of M reference signals, M being a positive integer greater than 1; and a transmitter of at least one reference signal among the M reference signals is a first cell, the first cell not being added by the first node U2; at least one cell maintained by the second node U1 is added by the first node U2; the third node U3 is a maintenance base station for the first cell, and any cell maintained by the third node U3 is not added by the first node U2; a time-domain resource occupied by the first signaling is used to determine the first time; a transmitter of the first reference signal is a target cell, and whether the target cell is added by the first node U2 is used to determine whether the target reference signal is the first reference signal.

In one embodiment, the first node U2 is the first node in the present application.

In one embodiment, the second node U1 is the second node in the present application.

In one embodiment, the third node U3 is the third node in the present application.

In one embodiment, an air interface between the second node U1 and the first node U2 includes a radio interface between a base station and a UE.

In one embodiment, an air interface between the third node U3 and the first node U2 includes a radio interface between a base station and a UE.

In one embodiment, the second node U1 is a maintenance base station for a serving cell of the first node U2.

In one embodiment, a time-domain resource occupied by the first signaling is used by the first node to determine the first time.

In one embodiment, a time-domain resource occupied by the first signaling is used by the second node to determine the first time.

In one embodiment, whether the target cell is added by the first node is used by the first node to determine whether the target reference signal is the first reference signal.

In one embodiment, whether the target cell is added by the first node is used by the second node to determine whether the target reference signal is the first reference signal.

In one embodiment, the monitoring refers to blind decoding, that is, to receive a signal and perform decoding operation; if the decoding is determined to be correct according to a CRC bit, it is then determined that a given signaling is detected; otherwise, it is determined that the given signaling is not detected; the given signaling is any one of the first-type signaling, the second-type signaling or the third-type signaling.

In one embodiment, the monitoring refers to reception based on coherent detection, that is, to perform coherent reception and measure energy of a signal obtained by the coherent reception; if the energy of the signal obtained by the coherent reception is larger than a first given threshold, it is determined that a given signaling is detected; otherwise, it is determined that the given signaling is not detected; the given signaling is any one of the first-type signaling, the second-type signaling or the third-type signaling.

In one embodiment, the monitoring refers to reception based on energy detection, that is, to sense energies of radio signals and average to obtain a received energy; if the received energy is larger than a second given threshold, it is determined that a given signaling is detected; otherwise, it is determined that the given signaling is not detected; the given signaling is any one of the first-type signaling, the second-type signaling or the third-type signaling.

In one embodiment, the phrase of monitoring a given signaling means: determining according to CRC whether the given signaling is to be transmitted; the given signaling is any one of the first-type signaling, the second-type signaling or the third-type signaling.

In one embodiment, the phrase of monitoring a given signaling means: being unsure of whether the given signaling is to be transmitted before it is determined whether decoding is correct according to CRC; the given signaling is any one of the first-type signaling, the second-type signaling or the third-type signaling.

In one embodiment, the phrase of monitoring a given signaling means: determining according to coherent detection whether the given signaling is to be transmitted; the given signaling is any one of the first-type signaling, the second-type signaling or the third-type signaling.

In one embodiment, the phrase of monitoring a given signaling means: being unsure of whether the given signaling is to be transmitted before coherent detection; the given signaling is any one of the first-type signaling, the second-type signaling or the third-type signaling.

In one embodiment, the phrase of monitoring a given signaling means: determining according to energy detection whether the given signaling is to be transmitted; the given signaling is any one of the first-type signaling, the second-type signaling or the third-type signaling.

In one embodiment, the phrase of monitoring a given signaling means: being unsure of whether the given signaling is to be transmitted before energy detection; the given signaling is any one of the first-type signaling, the second-type signaling or the third-type signaling.

In one embodiment, the sentence that a given cell is not added by the first node means: the first node does not perform SCell addition for the given cell; the given cell is any one of the first cell, the target cell or the third cell.

In one embodiment, the sentence that a given cell is not added by the first node means: a latest sCellToAddModList received by the first node does not comprise the given cell; the given cell is any one of the first cell, the target cell or the third cell.

In one embodiment, the sentence that a given cell is not added by the first node means: neither of a latest sCellToAddModList and a latest sCellToAddModListSCG received by the first node comprises the given cell; the given cell is any one of the first cell, the target cell or the third cell.

In one embodiment, the sentence that a given cell is not added by the first node means: the first node is not assigned with an SCellIndex for the given cell; the given cell is any one of the first cell, the target cell or the third cell.

In one embodiment, the SCellIndex is a positive integer no greater than 31.

In one embodiment, the sentence that a given cell is not added by the first node means: the first node is not assigned with a ServCellIndex for the given cell; the given cell is any one of the first cell, the target cell or the third cell.

In one embodiment, the ServCellIndex is a positive integer no greater than 31.

In one embodiment, the sentence that a given cell is not added by the first node means: the given cell is not a Primary serving Cell (PCell) of the first node; the given cell is any one of the first cell, the target cell or the third cell.

In one embodiment, the sentence that a given cell is added by the first node means: the first node performs SCell addition for the given cell; the given cell is the second cell or the target cell.

In one embodiment, the sentence that a given cell is added by the first node means: a latest sCellToAddModList received by the first node comprises the given cell; the given cell is the second cell or the target cell.

In one embodiment, the sentence that a given cell is added by the first node means: a latest sCellToAddModList or a latest sCellToAddModListSCG received by the first node comprises the given cell; the given cell is the second cell or the target cell.

In one embodiment, the sentence that a given cell is added by the first node means: the first node is assigned with an SCellIndex for the given cell; the given cell is the second cell or the target cell.

In one embodiment, the sentence that a given cell is added by the first node means: the first node is assigned with a ServCellIndex for the given cell; the given cell is the second cell or the target cell.

In one embodiment, when the target cell is added by a transmitter of the first signal, the target cell is a cell maintained by the second node.

In one embodiment, when and only when the target cell is added by a transmitter of the first signal will the second node transmit the first signaling in the first resource block.

In one embodiment, when and only when the target cell is added by a transmitter of the first signal will the second node transmit the first-type signaling in the first resource block subset after the first time using a spatial parameter of the target reference signal.

In one embodiment, no matter whether the second node transmits the first signaling in the first resource block, the second node will transmit the first-type signaling in the first resource block subset after the first time using a spatial parameter of the target reference signal.

In one embodiment, as a response to having received the first signal, the second node transmits the first signaling in the first resource block.

In one embodiment, as a response to having received the first signal, the third node transmits the first signaling in the first resource block.

In one embodiment, the first cell is not a cell maintained by the second node.

In one embodiment, the first signal is transmitted on a PRACH.

In one embodiment, the first signal is transmitted on a Physical Uplink Control Channel (PUCCH).

In one embodiment, the first signal is transmitted on a Physical Uplink Shared Channel (PUSCH).

In one embodiment, the first signaling is transmitted in a downlink physical layer control channel (i.e., a downlink channel only capable of bearing physical layer signaling).

In one embodiment, the first signaling is transmitted on a Physical Downlink Control Channel (PDCCH).

In one embodiment, the first-type signaling is transmitted in a downlink physical layer control channel (i.e., a downlink channel only capable of bearing physical layer signaling).

In one embodiment, the first-type signaling is transmitted on a PDCCH.

In one embodiment, the steps marked by the box F54 in FIG. 5 exist; any reference signal of the M1 reference signal(s) is one of the M reference signals, and any reference signal of the M2 reference signal(s) is one of the M reference signals; M1 and M2 are both positive integers less than M, and a sum of M1 and M2 is no greater than the M.

In one embodiment, there isn't any reference signal among the M reference signals belonging to both the M1 reference signal(s) and the M2 reference signal(s).

In one embodiment, a sum of M1 and M2 is equal to the M.

In one embodiment, a sum of M1 and M2 is less than the M; among the M reference signals there is a reference signal of which the transmitter is different from the second node and the third node.

In one embodiment, the steps marked by the box F52 in FIG. 5 exist; the M configuration information blocks respectively indicate the M reference signals; a transmitter of at least one reference signal among the M reference signals is a second cell, the second cell being added by the first node U2; among the M configuration information blocks each configuration information block corresponding to a reference signal transmitted by the first cell comprises a first index, the first index being used to indicate the first cell; among the M configuration information blocks each configuration information block corresponding to a reference signal transmitted by the second cell comprises a second index, the second index being used to indicate the second cell.

In one embodiment, the second cell is a PCell of the first node.

In one embodiment, the second cell is a cell maintained by the second node.

In one embodiment, the M configuration information blocks are transmitted on PDSCH(s).

In one embodiment, the M configuration information blocks are transmitted on a same PDSCH.

In one embodiment, the M configuration information blocks are respectively transmitted on M different PDSCHs.

In one embodiment, there are two configuration information blocks among the M configuration information blocks being respectively transmitted on two different PDSCHs.

In one embodiment, the steps marked by the box F53 in FIG. 5 exist; a measurement of the first reference signal set is used by the first node to trigger transmission of the first signal.

In one embodiment, the steps marked by the box F55 in FIG. 5 exist; the first resource block subset and the second resource block subset are associated with a same control resource set.

In one embodiment, when the target cell is not added by the transmitter of the first signal, the second node transmits the first-type signaling constantly using a spatial parameter of the second reference signal in a search space set to which the first resource block subset belongs after the first time.

In one embodiment, the step marked by the box F56 in FIG. 5 exists, while the step marked by the box F57 in FIG. 5 does not exist.

In one embodiment, the step marked by the box F57 in FIG. 5 exists, while the step marked by the box F56 in FIG. 5 does not exist.

In one embodiment, the steps marked by the box F56 and the box F57 in FIG. 5 cannot exist simultaneously.

In one embodiment, when and only when the target cell is a cell maintained by the third node will the third node transmit the first signaling in the first resource block.

In one embodiment, the steps marked by the box F58 in FIG. 5 exist, and the first reference signal is used to determine the third resource block subset.

In one embodiment, there is a reference signal among the M reference signals being transmitted before the second time.

In one embodiment, there is a reference signal among the M reference signals being transmitted after the second time.

In one embodiment, if the target cell is not added by the first node, the first node monitors the second-type signaling in the third resource block subset after the second time using a spatial parameter of the first reference signal.

In one embodiment, if the target cell is added by the first node, the first node does not monitor the second-type signaling in the third resource block subset.

In one embodiment, if the target cell is added by the first node, the first node determines by itself whether to monitor the second-type signaling in the third resource block subset.

In one embodiment, before the second time, the first node does not monitor the second-type signaling in a search space set to which the third resource block subset belongs.

In one embodiment, before the second time, the first node determines by itself whether to monitor the second-type signaling in a search space set to which the third resource block subset belongs.

In one embodiment, the second-type signaling comprises a physical-layer signaling.

In one embodiment, the second-type signaling comprises a dynamic signaling.

In one embodiment, the second-type signaling comprises a layer 1 (L1) signaling.

In one embodiment, the second-type signaling comprises DCI.

In one embodiment, the second-type signaling comprises one or more fields in a DCI.

In one embodiment, a transmitter of the second-type signaling is the target cell.

In one embodiment, a transmitter of the second-type signaling is different from a transmitter of the first-type signaling.

In one embodiment, an RNTI used for scrambling CRC of the second-type signaling includes a C-RNTI.

In one embodiment, an RNTI used for scrambling CRC of the second-type signaling includes a SI-RNTI.

In one embodiment, a PhysCellId of the target cell is used for generating an RS sequence of DMRS of the second-type signaling.

In one embodiment, the second time is the first time.

In one embodiment, the second time is later than the first time.

In one embodiment, the second time is earlier than the first time.

In one embodiment, the second time is later than the first signaling.

In one embodiment, the second time is earlier than the first signaling.

In one embodiment, a time interval between the second time and the first signaling is equal to a second interval, the second interval being a positive integer, and the second interval being measured in a unit of multicarrier symbols.

In one embodiment, the second interval is fixed.

In one embodiment, the second interval is fixed to 28 multicarrier symbols.

In one embodiment, the second-type signaling is transmitted on a PDCCH.

In one embodiment, steps marked by the box F51 and the box F58 in FIG. 5 exist; the first information block is used by the first node to determine configuration information of the third resource block subset.

In one embodiment, there is a reference signal among the M reference signals being transmitted before the first information block.

In one embodiment, there is a reference signal among the M reference signals being transmitted after the first information block.

In one embodiment, the first information block is transmitted in a Physical Broadcast CHannel (PBCH).

In one embodiment, the first information block is transmitted in a Physical Downlink Shared CHannel (PDSCH).

In one embodiment, the steps marked by the box F510 and the box F511 in FIG. 5 both exist while the step marked by the box F512 in FIG. 5 does not exist.

In one embodiment, the steps marked by the box F512 and the box F511 in FIG. 5 both exist while the step marked by the box F510 in FIG. 5 does not exist.

In one embodiment, the steps marked by the box F510 and the box F512 in FIG. 5 cannot exist simultaneously.

In one embodiment, an occurrence of the first resource block subset in time domain is earlier than an occurrence of the fourth resource block set in time domain.

In one embodiment, an occurrence of the first resource block subset in time domain is later than an occurrence of the fourth resource block set in time domain.

In one embodiment, the third-type signaling comprises a physical-layer signaling.

In one embodiment, the third-type signaling comprises a layer 1 (L1) signaling.

In one embodiment, the third-type signaling comprises DCI.

In one embodiment, a transmitter of the third-type signaling is the target cell.

In one embodiment, an RNTI used for scrambling CRC of the third-type signaling includes one or more of a C-RNTI, or a CS-RNTI, or an MCS-C-RNTI.

In one embodiment, a PhysCellId of the second cell is used for generating an RS sequence of DMRS of the third-type signaling.

In one embodiment, the steps marked by the box F59 in FIG. 5 exist; the second information block comprises configuration information of the fourth resource block set.

In one embodiment, transmission of the first signal is earlier than reception of the second information block.

In one embodiment, transmission of the first signal is later than reception of the second information block.

In one embodiment, transmission of the first signaling is earlier than reception of the second information block.

In one embodiment, transmission of the first signaling is later than reception of the second information block.

In one embodiment, an occurrence of the first resource block subset in time domain is earlier than the second information block.

In one embodiment, an occurrence of the first resource block subset in time domain is later than the second information block.

In one embodiment, the second information block is carried by an RRC signaling.

In one embodiment, the second information block is carried by a MAC CE signaling.

In one embodiment, the second information block comprises information in all or partial fields in an IE.

In one embodiment, the second information block is carried by an RRC signaling and a MAC CE signaling together.

In one embodiment, the second information block indicates that a TCI state of a CORESET associated with the fourth resource block set is a first TCI state, the first TCI state indicating the first reference signal.

In one embodiment, a transmitter of the second information block is the second cell.

In one embodiment, the second information block is transmitted in a downlink physical layer data channel (i.e., a downlink channel capable of bearing physical layer data).

In one embodiment, the second information block is transmitted on a PDSCH.

In one embodiment, the second information block is comprised of two parts, and the two parts are respectively transmitted on two PDSCHs.

In one embodiment, the third-type signaling is transmitted on a PDCCH.

Embodiment 6

Embodiment 6 illustrates a schematic diagram of a first resource block according to one embodiment of the present application; as shown in FIG. 6. In Embodiment 6, the first resource block occupies more than one Resource Element (RE) in time-frequency domain.

In one embodiment, an RE occupies a multicarrier symbol in time domain, and a subcarrier in frequency domain.

In one embodiment, the first resource block occupies a positive integer number of multicarrier symbol(s) in time domain.

In one embodiment, the first resource block occupies a positive integer number of Physical Resource Block(s) (PRB(s)) in frequency domain.

In one embodiment, the first resource block comprises a CORESET.

In one embodiment, the first resource block comprises a search space set.

In one embodiment, the first resource block comprises a part of a search space set that occurs in a monitoring occasion.

In one embodiment, the first resource block comprises a PDCCH candidate.

In one embodiment, the first resource block comprises all or partial PDCCH candidates in a search space set.

In one embodiment, the first resource block is a PDCCH candidate.

In one embodiment, an index of a CORESET associated with the first resource block is equal to 0.

In one embodiment, an index of a CORESET associated with the first resource block is unequal to 0.

In one embodiment, a search space set to which the first resource block belongs is identified by a recoverySearchSpaceId.

In one embodiment, an index of a search space set to which the first resource block belongs is configured by a higher-layer parameter.

In one embodiment, a higher-layer parameter used for configuring an index of a search space set to which the first resource block belongs comprises information in a recoverySearchSpaceId field in a BeamFailureRecoveryConfig IE.

In one embodiment, an index of a search space set to which the first resource block belongs is a SearchSpaceId.

In one embodiment, a search space set to which the first resource block belongs is configured by the second cell.

In one embodiment, a search space set to which the first resource block belongs is configured by the first cell.

In one embodiment, a CORESET to which the first resource block belongs is configured by the second cell.

In one embodiment, a CORESET to which the first resource block belongs is configured by the first cell.

Embodiment 7

Embodiment 7 illustrates a schematic diagram of a first resource block subset according to one embodiment of the present application; as shown in FIG. 7. In Embodiment 7, the first resource block subset occupies more than one RE in time-frequency domain.

In one embodiment, the first resource block subset occupies a positive integer number of multicarrier symbol(s) in time domain.

In one embodiment, the first resource block subset occupies a positive integer number of PRB(s) in frequency domain.

In one embodiment, the first resource block subset comprises a CORESET.

In one embodiment, the first resource block subset comprises a search space set.

In one embodiment, the first resource block subset comprises more than one PDCCH candidate.

In one embodiment, the first resource block subset comprises all or partial PDCCH candidates in a search space set.

In one embodiment, an index of a CORESET associated with the first resource block subset is equal to 0.

In one embodiment, an index of a CORESET associated with the first resource block subset is unequal to 0.

In one embodiment, an index of a search space set to which the first resource block subset belongs is equal to 0.

In one embodiment, the first resource block subset comprises all or partial PDCCH candidates in a Type0-PDCCH Common Search Space (CSS) set.

In one embodiment, the first resource block subset comprises all or partial PDCCH candidates no earlier than the first time in a Type0-PDCCH CSS set.

In one embodiment, the first resource block subset comprises a Type0-PDCCH CSS set and all or partial PDCCH candidates in a monitoring occasion corresponding to the fourth reference signal.

In one embodiment, a search space set to which the first resource block subset belongs includes a CSS set.

In one embodiment, a search space set to which the first resource block subset belongs includes a UE-specific search space (USS) set.

In one embodiment, a start time of the first resource block subset is no earlier than the first time.

In one embodiment, a CORESET associated with the first resource block subset is configured by the second cell.

In one embodiment, a CORESET associated with the first resource block subset is configured by a MIB of the second cell.

In one embodiment, a CORESET associated with the first resource block subset is configured by the first cell.

In one embodiment, a search space set to which the first resource block subset belongs is configured by the second cell.

In one embodiment, a search space set to which the first resource block subset belongs is configured by a MIB of the second cell.

In one embodiment, a search space set to which the first resource block subset belongs is configured by the first cell.

In one embodiment, the first resource block subset occurs multiple times in time domain.

In one embodiment, the first resource block subset occurs periodically in time domain.

In one embodiment, the first resource block subset occurs only once in time domain.

In one embodiment, the first resource block and the first resource block subset belong to different search space sets.

In one embodiment, the first resource block and the first resource block subset belong to a same search space set.

In one embodiment, the first resource block and the first resource block subset are associated with different CORE-SETs.

In one embodiment, the first resource block and the first resource block subset are associated with a same CORESET.

In one embodiment, a CORESET associated with the given resource refers to a CORESET associated with a search space set to which the given resource belongs; the given resource is any one of the first resource block, the first resource block subset, the second resource block subset, the third resource block subset or the fourth resource block set.

In one subembodiment of the above embodiment, the sentence that a given search space set is associated with a given CORESET includes a meaning that: a configuration parameter of the given CORESET is applied in the given search space set, the configuration parameter of the CORE-SET comprising: some or all of a frequency-domain resource, a TCI state, a duration, a type of mapping from Control Channel Element (CCE) to Resource-Element Group (REG), precoding granularity or an initial value of a scrambling sequence of DMRS of a PDCCH; the given search space set is a search space set to which the given resource belongs.

In one subembodiment of the above embodiment, for the meaning of the sentence that a given search space set is associated with a given CORESET, refer to 3GPP TS38.213, Section 10.1; the given search space set is a search space set to which the given resource belongs.

Embodiment 8

Embodiment 8 illustrates a schematic diagram of monitoring a given signaling in a given resource using a spatial parameter of a given reference signal according to one embodiment of the present application; as shown in FIG. 8. In Embodiment 8, the given reference signal is one of the target reference signal, the first reference signal or the second reference signal; the given resource is one of the first resource block subset, the second resource block subset, the third resource block subset or the fourth resource block set; the given signaling is one of the first-type signaling, the second-type signaling or the third-type signaling.

In one embodiment, the given reference signal is the target reference signal, the given resource is the first resource block subset, and the given signaling is the first-type signaling.

In one embodiment, the given reference signal is the second reference signal, the given resource is the second resource block subset, and the given signaling is the first-type signaling.

In one embodiment, the given reference signal is the first reference signal, the given resource is the third resource block subset, and the given signaling is the second-type signaling.

In one embodiment, the given reference signal is the first reference signal, the given resource is the fourth resource block set, and the given signaling is the third-type signaling.

In one embodiment, the sentence of monitoring a given signaling in a given resource using a spatial parameter of a given reference signal means that it is assumed that a TCI state of the given signaling being transmitted in the given resource indicates the given reference signal.

In one embodiment, the sentence of monitoring a given signaling in a given resource using a spatial parameter of a given reference signal means that it is assumed that an antenna port of the given signaling being transmitted in the given resource is QCL with the given reference signal.

In one embodiment, the sentence of monitoring a given signaling in a given resource using a spatial parameter of a given reference signal means that it is assumed that an antenna port of the given signaling being transmitted in the given resource is QCL with the given reference signal, corresponding to QCL-TypeD.

In one embodiment, the sentence of monitoring a given signaling in a given resource using a spatial parameter of a given reference signal means that it is assumed that a DMRS of the given signaling being transmitted in the given resource is QCL with the given reference signal.

In one embodiment, the sentence of monitoring a given signaling in a given resource using a spatial parameter of a given reference signal means that it is assumed that a DMRS of the given signaling being transmitted in the given resource is QCL with the given reference signal, corresponding to QCL-TypeD.

In one embodiment, the sentence of monitoring a given signaling in a given resource using a spatial parameter of a given reference signal means that a same spatial domain filter is used to receive the given reference signal and to monitor the given signaling in the given resource.

In one embodiment, the sentence of monitoring a given signaling in a given resource using a spatial parameter of a given reference signal means that a same spatial domain filter is used to transmit the given reference signal and to monitor the given signaling in the given resource.

In one embodiment, the sentence of monitoring a given signaling in a given resource using a spatial parameter of a given reference signal means that large-scale properties of a channel through which the given signaling being transmitted in the given resource is conveyed can be inferred from large-scale properties of a channel through which the given reference signal is conveyed.

Embodiment 9

Embodiment 9 illustrates a schematic diagram of determining whether a target reference signal is a first reference signal according to one embodiment of the present application; as shown in FIG. 9. In Embodiment 9, if the target cell is added by the first node, the target reference signal is the first reference signal.

In one embodiment, if the target cell is not added by the first node, the target reference signal is not the first reference signal.

In one embodiment, if the target cell is not added by the first node, the target reference signal and the first reference signal are not QCL.

In one embodiment, the target reference signal is the first reference signal or the second reference signal.

In one embodiment, whether the target cell is added by the first node is used to determine the target reference signal from the first reference signal and the second reference signal.

In one embodiment, if the target cell is not added by the first node, the target reference signal is the second reference signal.

In one embodiment, if the target cell is not added by the first node, the first node itself determines the target reference signal from the first reference signal and the second reference signal.

In one embodiment, if the target cell is not added by the first node, spatial parameters of the target reference signal comprise a spatial parameter of the first reference signal and a spatial parameter of the second reference signal.

In one embodiment, if the target cell is not added by the first node, the first node monitors the first-type signaling in the first resource block subset after the first time using both a spatial parameter of the first reference signal and a spatial parameter of the second reference signal.

In one embodiment, the second reference signal comprises a CSI-RS.

In one embodiment, the second reference signal comprises an SSB.

In one embodiment, the second reference signal is a periodic reference signal.

In one embodiment, the second reference signal is a semi-persistent reference signal or an aperiodic reference signal.

In one embodiment, the second reference signal and the first reference signal cannot be assumed to be QCL.

In one embodiment, the second reference signal and the first reference signal cannot be assumed to be QCL with QCL-TypeD.

In one embodiment, a transmitter of the second reference signal is the second cell.

In one embodiment, a transmitter of the second reference signal is a cell added by the first node.

In one embodiment, the second reference signal and the first reference signal are transmitted by a same cell.

In one embodiment, the second reference signal and the first reference signal are transmitted by different cells.

In one embodiment, the first resource block subset and the second resource block subset are both associated with a first CORESET; if the target cell is added by the first node, the first node monitors a PDCCH in the first CORESET after the first time using a spatial parameter of the first reference signal; if the target cell is not added by the first node, the first node monitors a PDCCH in the first CORESET after the first time still using a spatial parameter of the second reference signal.

Embodiment 10

Embodiment 10 illustrates a schematic diagram of a second resource block subset according to one embodiment of the present application; as shown in FIG. 10. In Embodiment 10, the second resource block subset occupies more than one RE in time-frequency domain.

In one embodiment, the second resource block subset occupies a positive integer number of multicarrier symbol(s) in time domain.

In one embodiment, the second resource block subset occupies a positive integer number of PRB(s) in frequency domain.

In one embodiment, the second resource block subset comprises more than one PDCCH candidate.

In one embodiment, the second resource block subset comprises all or partial PDCCH candidates in a search space set.

In one embodiment, an index of a CORESET associated with the second resource block subset is equal to 0.

In one embodiment, an index of a CORESET associated with the second resource block subset is unequal to 0.

In one embodiment, an index of a search space set to which the second resource block subset belongs is equal to 0.

In one embodiment, an index of a search space set to which the second resource block subset belongs is unequal to 0.

In one embodiment, the second resource block subset comprises all or partial PDCCH candidates in a Type0-PDCCH CSS set.

In one embodiment, the second resource block subset comprises all or partial PDCCH candidates no later than the first time in a Type0-PDCCH CSS set.

In one embodiment, the first resource block subset and the second resource block subset belong to a same search space set.

In one embodiment, the first resource block subset and the second resource block subset belong to different search space sets.

In one embodiment, an index of a search space set to which the first resource block subset belongs and an index of a search space set to which the second resource block subset belongs are the same.

In one embodiment, an index of a search space set to which the first resource block subset belongs and an index of a search space set to which the second resource block subset belongs are both equal to 0.

In one embodiment, the control resource set comprises a COntrol REsource SET (CORESET).

In one embodiment, the first resource block subset and the second resource block subset are both associated with a CORESET indexed by 0.

In one embodiment, the second resource block subset occurs multiple times in time domain.

In one embodiment, the second resource block subset occurs periodically in time domain.

In one embodiment, the second resource block subset occurs only once in time domain.

In one embodiment, the second reference signal is used to determine a time-domain resource occupied by the second resource block subset.

In one embodiment, the second reference signal is used to determine slot(s) occupied by the second resource block subset.

In one embodiment, the second reference signal and a fifth reference signal are QCL, where an index of the fifth reference signal is used to determine a time-domain resource occupied by the second resource block subset.

In one embodiment, an index of the fifth reference signal is an SSB-Index.

In one embodiment, the fifth reference signal comprises an SSB.

In one embodiment, the fifth reference signal is the second reference signal.

In one embodiment, an index of the fifth reference signal is used to determine slot(s) occupied by the second resource block subset.

In one embodiment, the second resource block subset comprises a Type0-PDCCH CSS set and all or partial PDCCH candidates in a monitoring occasion corresponding to the fifth reference signal.

Embodiment 11

Embodiment 11 illustrates a schematic diagram of a third resource block subset according to one embodiment of the present application; as shown in FIG. 11. In Embodiment 11, the third resource block subset occupies more than one RE in time-frequency domain.

In one embodiment, the third resource block subset occupies a positive integer number of multicarrier symbol(s) in time domain.

In one embodiment, the third resource block subset occupies a positive integer number of PRB(s) in frequency domain.

In one embodiment, the third resource block subset comprises a CORESET.

In one embodiment, the third resource block subset comprises a search space set.

In one embodiment, the third resource block subset comprises more than one PDCCH candidate.

In one embodiment, the third resource block subset comprises all or partial PDCCH candidates in a search space set.

In one embodiment, an index of a CORESET associated with the third resource block subset is equal to 0.

In one embodiment, an index of a CORESET associated with the third resource block subset is unequal to 0.

In one embodiment, an index of a search space set to which the third resource block subset belongs is equal to 0.

In one embodiment, an index of a search space set to which the third resource block subset belongs is unequal to 0.

In one embodiment, the third resource block subset comprises all or partial PDCCH candidates in a Type0-PDCCH CSS set.

In one embodiment, the third resource block subset comprises all or partial PDCCH candidates no earlier than the second time in a Type0-PDCCH CSS set.

In one embodiment, a search space set to which the third resource block subset belongs includes a CSS set.

In one embodiment, a search space set to which the third resource block subset belongs includes a USS set.

In one embodiment, a search space set to which the third resource block subset belongs is configured by the target cell.

In one embodiment, a CORESET associated with the third resource block subset is configured by the target cell.

In one embodiment, a search space set to which the third resource block subset belongs and a search space set to which the first resource block subset belongs are configured by different cells.

In one embodiment, a CORESET associated with the third resource block subset and a CORESET associated with the first resource block subset are configured by different cells.

In one embodiment, a start time of the third resource block subset is no earlier than the second time.

In one embodiment, a start time of the third resource block subset is earlier than a start time of the first resource block subset.

In one embodiment, a start time of the third resource block subset is later than a start time of the first resource block subset.

In one embodiment, the third resource block subset occurs multiple times in time domain.

In one embodiment, the third resource block subset occurs periodically in time domain.

In one embodiment, the third resource block subset occurs only once in time domain.

In one embodiment, the first reference signal is used to determine a time-domain resource occupied by the third resource block subset.

In one embodiment, the first reference signal and a third reference signal are QCL, where a transmitter of the third reference signal is the target cell, and an index of the third reference signal is used to determine a time-domain resource occupied by the third resource block subset.

In one embodiment, an index of the third reference signal is an SSB-Index.

In one embodiment, the third reference signal comprises an SSB.

In one embodiment, the third reference signal is the first reference signal.

In one embodiment, an index of the third reference signal is used to determine slot(s) occupied by the third resource block subset.

In one embodiment, an index of any slot occupied by the third resource block subset is equal to a sum of a first integer and a first parameter mod a second integer; the first integer is equal to a product of an index of the third reference signal and a second parameter being rounded down to a nearest integer, and the first parameter is equal to a product of a third parameter and 2 to the first scs configuration-th power, and the second integer is equal to a number of slots comprised per frame under the first scs configuration; the second parameter is a positive real number, and the third parameter is a non-negative real number; the first scs configuration is a non-negative integer.

In one embodiment, the first scs configuration is a sub-carrier spacing configuration corresponding to the second-type signaling.

In one embodiment, the first scs configuration is a sub-carrier spacing configuration corresponding to the first signaling.

In one embodiment, the first scs configuration is a sub-carrier spacing configuration corresponding to the first-type signaling.

In one embodiment, a first MIB is used to determine the second parameter and the third parameter.

In one embodiment, a first MIB is used to determine a frequency-domain resource occupied by the third resource block subset.

In one embodiment, a first MIB is used to determine configuration information of a CORESET associated with the third resource block subset.

In one embodiment, a first MIB is used to determine configuration information of a search space set to which the third resource block subset belongs.

In one embodiment, a transmitter of the first MIB is the target cell.

In one embodiment, the third resource block subset comprises a Type0-PDCCH CSS set and all or partial PDCCH candidates in a monitoring occasion corresponding to the third reference signal.

In one embodiment, the first resource block subset and the third resource block subset are orthogonal in time domain.

In one embodiment, a number of PDCCH candidates comprised in the first resource block subset is related to a number of PDCCH candidates comprised in the third resource block subset.

In one embodiment, a sum of a number of PDCCH candidates comprised in the first resource block subset and a number of PDCCH candidates comprised in the third resource block subset is a fixed value within a time unit.

In one embodiment, the first resource block subset belongs to a first search space set, and a first monitoring occasion set comprises a monitoring occasion of the first search space set later than the first time, the first node monitoring the first-type signaling in the first search space set only in a first monitoring occasion subset in the first monitoring occasion set; the first monitoring occasion subset only comprises partial monitoring occasions comprised in the first monitoring occasion set.

In one embodiment, the third resource block subset belongs to a third search space set, and a third monitoring occasion set comprises a monitoring occasion of the third search space set later than the second time, the first node monitoring the second-type signaling in the third search space set only in a third monitoring occasion subset in the third monitoring occasion set; the third monitoring occasion subset only comprises partial monitoring occasions comprised in the third monitoring occasion set.

In one embodiment, the first monitoring occasion subset and the third monitoring occasion subset are orthogonal in time domain.

In one embodiment, the first monitoring occasion subset and the third monitoring occasion subset are interleaved/alternately appearing in time domain.

In one embodiment, the first monitoring occasion subset and the third monitoring occasion subset are overlapping in time domain.

In one embodiment, the first monitoring occasion subset and the third monitoring occasion subset are interleaved/alternately appearing in time domain, with a ratio of X1 to X2; the X1 and X2 are two positive integers that are unequal.

In one embodiment, a number of monitoring occasions comprised in the first monitoring occasion subset is related to a number of monitoring occasions comprised in the third monitoring occasion subset.

In one embodiment, a sum of a number of monitoring occasions comprised in the first monitoring occasion subset and a number of monitoring occasions comprised in the third monitoring occasion subset is a fixed value.

In one embodiment, a first time unit belongs to both the first monitoring occasion set and the third monitoring occasion set, the first node monitoring a PDCCH only in a target search space set between the first search space set and the third search space set; the target search space set is either the first search space set or the third search space set, the first node itself determining the target search space set from the first search space set and the third search space set.

In one embodiment, a second time unit belongs to both the first monitoring occasion set and the third monitoring occasion set; the first node monitors a PDCCH in the first search space set and a PDCCH in the third search space set in the second time unit; the first node determines by itself a number of PDCCH candidates on which blind decoding is performed in the first search space set and a number of PDCCH candidates on which blind decoding is performed in the third search space set in the second time unit.

In one subembodiment, the first node determines by itself that a sum of a number of PDCCH candidates on which blind decoding is performed in the first search space set and a number of PDCCH candidates on which blind decoding is performed in the third search space set in the second time unit is a fixed value.

In one embodiment, a said time unit is a slot.

In one embodiment, a said time unit comprises a positive integer number of consecutive slots.

In one embodiment, a said time unit is a sub-slot.

In one embodiment, a said time unit comprises a positive integer number of consecutive multicarrier symbols.

In one embodiment, the first resource block subset comprises all or partial PDCCH candidates that occur in the first monitoring occasion in the first search space set.

In one embodiment, the third resource block subset comprises all or partial PDCCH candidates that occur in the third monitoring occasion in the third search space set.

Embodiment 12

Embodiment 12 illustrates a schematic diagram of a first information block according to one embodiment of the present application; as shown in FIG. 12. In Embodiment 12, the first information block is used to determine configuration information of the third resource block subset.

In one embodiment, the first information block is carried by a layer 1 (L1) signaling.

In one embodiment, the first information block is carried by an RRC signaling.

In one embodiment, the first information block is carried by a MAC CE signaling.

In one embodiment, the first information block comprises a MIB.

In one embodiment, the first information block comprises a System Information Block (SIB).

In one embodiment, the configuration information of the third resource block subset comprises one or more of time-domain resources being occupied, frequency-domain resources being occupied, an index of the third resource block subset, an initial value of a scrambling sequence of DMRS, a CCE-to-REG mapping parameter or a TCI state.

In one embodiment, the first information block comprises a third index and a fourth index, the third index and the fourth index being used jointly to determine the third resource block subset; the third index is used to determine configuration information of a CORESET associated with the third resource block subset; the fourth index is used to determine configuration information of a search space set to which the third resource block subset belongs; the third index and the fourth index are non-negative integers, respectively.

In one embodiment, the first information block and the first reference signal belong to a same SSB.

In one embodiment, the first information block and the first reference signal correspond to a same SSB-Index.

In one embodiment, a transmission antenna port of the first information block and the first reference signal are QCL.

In one embodiment, a transmitter of the first information block is the target cell.

Embodiment 13

Embodiment 13 illustrates a schematic diagram of a fourth resource block set according to one embodiment of the present application; as shown in FIG. 13. In Embodiment 13, the fourth resource block set occupies a positive integer number of RE(s) in time-frequency domain.

In one embodiment, the fourth resource block set occupies a positive integer number of multicarrier symbol(s) in time domain.

In one embodiment, the fourth resource block set occupies a positive integer number of PRB(s) in frequency domain.

In one embodiment, the fourth resource block set comprises a CORESET.

In one embodiment, the fourth resource block set comprises a search space set.

In one embodiment, the fourth resource block set comprises more than one PDCCH candidate.

In one embodiment, the fourth resource block set comprises all or partial PDCCH candidates in a search space set.

In one embodiment, a search space set to which the fourth resource block set belongs includes a CSS set.

In one embodiment, a search space set to which the fourth resource block set belongs includes a USS set.

In one embodiment, the first resource block and the fourth resource block set belong to different search space sets.

In one embodiment, the first resource block and the fourth resource block set belong to a same search space set.

In one embodiment, the first resource block and the fourth resource block set are associated with different CORESETs.

In one embodiment, the first resource block and the fourth resource block set are associated with a same CORESET.

In one embodiment, the first resource block subset and the fourth resource block set belong to different search space sets.

In one embodiment, the first resource block subset and the fourth resource block set are associated with different CORESETs.

In one embodiment, the first resource block subset and the fourth resource block set are associated with a same CORESET.

In one embodiment, the fourth resource block set occurs multiple times in time domain.

In one embodiment, the fourth resource block set occurs periodically in time domain.

In one embodiment, the fourth resource block set occurs only once in time domain.

In one embodiment, the configuration information of the fourth resource block set comprises one or more of time-domain resources being occupied, frequency-domain resources being occupied, an index of the fourth resource block set, an initial value of a scrambling sequence of DMRS, a CCE-to-REG mapping parameter or a TCI state.

Embodiment 14

Embodiment 14 illustrates a schematic diagram of a measurement of a first reference signal set being used to trigger transmission of a first signal according to one embodiment of the present application; as shown in FIG. 14.

In one embodiment, the first reference signal set only comprises one reference signal.

In one embodiment, the first reference signal set comprises more than one reference signal.

In one embodiment, the first reference signal set comprises a CSI-RS.

In one embodiment, the first reference signal set comprises an SSB.

In one embodiment, any reference signal in the first reference signal set includes a CSI-RS or an SSB.

In one embodiment, any reference signal in the first reference signal set is a periodic reference signal.

In one embodiment, a reference signal in the first reference signal set is a semi-persistent or aperiodic reference signal.

In one embodiment, all reference signals comprised in the first reference signal set belong to a same BWP in frequency domain.

In one embodiment, all reference signals comprised in the first reference signal set belong to a same Carrier in frequency domain.

In one embodiment, any two reference signals in the first reference signal set are non-QCL.

In one embodiment, any two reference signals in the first reference signal set are not QCL with QCL-T eD.

In one embodiment, the first reference signal set is configured by a higher layer parameter.

In one embodiment, a higher layer parameter for configuring the first reference signal set comprises all or partial information in a failureDetectionResourcesToAddModList field in a RadioLinkMonitoringConfig IE.

In one embodiment, a higher layer parameter for configuring the first reference signal set comprises all or partial information in a tci-StatesPDCCH-ToAddList field in a ControlResourceSet IE.

In one embodiment, a measurement of the first reference signal set is used to determine a first received quality set, the first received quality set comprising at least one received quality; if each received quality in the first received quality set is poorer than a first threshold, a transmission of the first signal is triggered; if there is one received quality not being poorer than the first threshold in the first received quality set, the transmission of the first signal is not triggered.

In one embodiment, the first threshold is configured by a first higher layer parameter.

In one embodiment, the first higher layer parameter comprises information in a rlmInSyncOutOfSyncThreshold parameter.

In one embodiment, the first threshold is configured by the second cell.

In one embodiment, the first threshold is configured by a cell added by the first node.

In one embodiment, the sentence that a given received quality is poorer than the first threshold means that: the given received quality is one of a Reference Signal Received Power (RSRP), a Signal-to-noise and interference ratio (SINR), a Reference Signal Received Quality (RSRQ), or a Signal-to-noise ratio (SNR), the given received quality being smaller than the first threshold.

In one embodiment, the sentence that a given received quality is poorer than the first threshold means that: the given received quality is a BLock Error Rate (BLER), the given received quality being larger than the first threshold.

In one embodiment, the given received quality is any received quality in the first received quality set.

In oner embodiment, a number of received qualities comprised in the first received quality set is equal to a number of reference signals comprised in the first reference signal set.

In one embodiment, the first reference signal set only comprises one reference signal, and the first received quality set only comprises one received quality, a measurement of the reference signal being used to determine the received quality.

In one embodiment, the first reference signal set comprises S reference signals, and the first received quality set comprises S received qualities, S being a positive integer greater than 1; measurements on the S reference signals are respectively used to determine the S received qualities.

In one embodiment, for any given reference signal in the first reference signal set, an RSRP of the given reference signal is used to determine a received quality in the first received quality set that corresponds to the given reference signal.

In one embodiment, for any given reference signal in the first reference signal set, a received quality in the first received quality set that corresponds to the given reference signal is equal to an RSRP of the given reference signal.

In one embodiment, for any given reference signal in the first reference signal set, a SINR of the given reference signal is used to determine a received quality in the first received quality set that corresponds to the given reference signal.

In one embodiment, for any given reference signal in the first reference signal set, a received quality in the first received quality set that corresponds to the given reference signal is equal to a SINR of the given reference signal.

In one embodiment, any received quality in the first received quality set is obtained by looking up in table of an RSRP or SINR of a corresponding reference signal.

In one embodiment, any received quality in the first received quality set is obtained based on hypothetical PDCCH transmission parameters.

In one embodiment, the specific definition of the hypothetical PDCCH transmission parameters can be found in 3GPP TS38.133.

In one embodiment, any received quality in the first received quality set is an RSRP.

In one embodiment, any received quality in the first received quality set is a L1-RSRP.

In one embodiment, any received quality in the first received quality set is a SINR.

In one embodiment, any received quality in the first received quality set is a L1-SINR.

In one embodiment, any received quality in the first received quality set is an RSRQ.

In one embodiment, any received quality in the first received quality set is a BLER.

In one embodiment, the first threshold is a real number.

In one embodiment, the first threshold is a non-negative real number.

In one embodiment, the first threshold is a non-negative real number no greater than 1.

In one embodiment, the first threshold is one of $Q_{out\_L}$, $Q_{out\_LR\_SSB}$ or $Q_{out\_LR\_CSI-RS}$.

In one embodiment, for definitions of the $Q_{out\_LR}$, $Q_{out\_LR\_SSB}$ and $Q_{out\_LR\_CSI-RS}$, refer to 3GPP TS38.133.

Embodiment 15

Embodiment 15 illustrates a schematic diagram of M configuration information blocks according to one embodiment of the present application; as shown in FIG. 15. In Embodiment 15, the M configuration information blocks respectively indicate the M reference signals; a transmitter of at least one reference signal among the M reference signals is the second cell; among the M configuration information blocks each configuration information block corresponding to a reference signal transmitted by the first cell comprises the first index; among the M configuration information blocks each configuration information block corresponding to a reference signal transmitted by the second cell comprises the second index. In FIG. 15, indexes of the M configuration information blocks and the M reference signals are #0, . . . and #(M−1), respectively.

In one embodiment, any configuration information block among the M configuration information blocks is carried by an RRC signaling.

In one embodiment, any configuration information block among the M configuration information blocks is carried by a MAC CE signaling.

In one embodiment, any configuration information block among the M configuration information blocks comprises information in all or partial fields in an IE.

In one embodiment, any configuration information block among the M configuration information blocks comprises partial or all information in a candidateBeamRSList field in a BeamFailureRecoveryConfig IE.

In one embodiment, any configuration information block corresponding to a reference signal transmitted by the first cell among the M configuration information blocks comprises partial or all information in a candidateBeamRSList field in a BeamFailureRecoveryConfig IE.

In one embodiment, the first index is a non-negative integer.

In one embodiment, the first index is a CellIdentity corresponding to the first cell.

In one embodiment, the first index is a PhysCellId corresponding to the first cell.

In one embodiment, the second index is a non-negative integer.

In one embodiment, the second index is a SCellIndex corresponding to the second cell.

In one embodiment, the second index is a ServCellIndex corresponding to the second cell.

In one embodiment, the second index is a PhysCellId corresponding to the second cell.

In one embodiment, any configuration information block among the M configuration information blocks comprises a first-type index, and the first-type index comprised in any given configuration information block among the M configuration information blocks is used for identifying a reference signal corresponding to the given configuration information block among the M reference signals; the first-type index is a non-negative integer.

In one embodiment, the first-type index comprised in any given configuration information block among the M configuration information blocks is an index of a reference signal corresponding to the given configuration information block among the M reference signals.

In one embodiment, the first-type index comprises an SSB-Index.

In one embodiment, the first-type index comprises an SSB Resource indicator (SSBRI).

In one embodiment, the first-type index comprises a NZP-CSI-RS-ResourceId.

In one embodiment, the first-type index comprises a CSI-RS Resource indicator (CRI).

In one embodiment, any configuration information block among the M configuration information blocks comprises a second-type index, and the second-type index comprised in any given configuration information block among the M configuration information blocks indicates a candidate radio resource among the M candidate radio resources corresponding to a reference signal that corresponds to the given configuration information block; the second-type index is a non-negative integer.

In one embodiment, the second-type index comprises a ra-PreambleIndex.

In one embodiment, a configuration information block corresponding to the first reference signal among the M configuration information blocks indicates a radio resource occupied by the first signal.

In one embodiment, the first index and the second index are respectively comprised of Q1 bits and Q2 bits, where Q1 and Q2 are two positive integers different from each other; Q1 is greater than Q2.

In one embodiment, Q1 is 10.

In one embodiment, Q1 is 28.

In one embodiment, Q1 is 9.

In one embodiment, Q2 is 5.

In one embodiment, Q2 is 3.

Embodiment 16

Embodiment 16 illustrates a structure block diagram of a processing device used in a first node according to one embodiment of the present application; as shown in FIG. 16. In FIG. 16, a processing device 1600 in a first node comprises a first transmitter 1601 and a first receiver 1602.

In Embodiment 16, the first transmitter 1601 transmits a first signal; the first receiver 1602 receives a first signaling in a first resource block, and monitors a first-type signaling in a first resource block subset after a first time using a spatial parameter of a target reference signal.

In Embodiment 16, the first signal indicates a first reference signal out of M reference signals, M being a positive integer greater than 1; and a transmitter of at least one reference signal among the M reference signals is a first cell, the first cell not being added by the first node; a time-domain resource occupied by the first signaling is used to determine the first time; a transmitter of the first reference signal is a target cell, and whether the target cell is added by the first node is used to determine whether the target reference signal is the first reference signal.

In one embodiment, the first receiver 1602 monitors the first-type signaling in a second resource block subset using a spatial parameter of a second reference signal before the first time; herein, the first resource block subset and the second resource block subset are associated with a same control resource set.

In one embodiment, when the target cell is not added by the first node, the first receiver 1602 monitors a second-type signaling in a third resource block subset after a second time using a spatial parameter of the first reference signal; herein, the first reference signal is used to determine the third resource block subset, a transmitter of the second-type signaling including the target cell.

In one embodiment, the first receiver 1602 receives a first information block; herein, a transmitter of the first information block includes the target cell, the first information block being used to determine configuration information of the third resource block subset.

In one embodiment, the first receiver 1602 receives a second information block, and monitors a third-type signaling in a fourth resource block set using a spatial parameter of the first reference signal; herein, the second information block comprises configuration information of the fourth resource block set, and a transmitter of the second information block includes a second cell, the second cell being added by the first node; a transmitter of the third-type signaling includes the target cell.

In one embodiment, the first receiver 1602 receives a first reference signal set, the first reference signal set comprising a positive integer number of reference signal(s); herein, a measurement of the first reference signal set is used to trigger transmission of the first signal.

In one embodiment, the first receiver 1602 receives M configuration information blocks; herein, the M configuration information blocks respectively indicate the M reference signals; a transmitter of at least one reference signal among the M reference signals is a second cell, the second cell being added by the first node; among the M configuration information blocks each configuration information block corresponding to a reference signal transmitted by the first cell comprises a first index, the first index being used to indicate the first cell; among the M configuration information blocks each configuration information block corresponding to a reference signal transmitted by the second cell comprises a second index, the second index being used to indicate the second cell.

In one embodiment, the first node is a UE.

In one embodiment, the first node is a relay node.

In one embodiment, the first transmitter 1601 comprises at least one of the antenna 452, the transmitter 454, the transmitting processor 468, the multi-antenna transmitting processor 457, the controller/processor 459, the memory 460 or the data source 467 in Embodiment 4.

In one embodiment, the first receiver 1602 comprises at least one of the antenna 452, the receiver 454, the receiving processor 456, the multi-antenna receiving processor 458, the controller/processor 459, the memory 460 or the data source 467 in Embodiment 4.

Embodiment 17

Embodiment 17 illustrates a structure block diagram of a processing device used in a second node according to one embodiment of the present application; as shown in FIG. 17. In FIG. 17, a processing device 1700 in a second node comprises a second receiver 1701 and a second transmitter 1702.

In Embodiment 17, the second receiver 1701 receives a first signal; a second transmitter 1702 transmits a first signaling in a first resource block, and transmits a first-type signaling in a first resource block subset after a first time using a spatial parameter of a target reference signal.

In Embodiment 17, the first signal indicates a first reference signal out of M reference signals, M being a positive integer greater than 1; and a transmitter of at least one reference signal among the M reference signals is a first cell, the first cell not being added by a transmitter of the first signal; at least one cell maintained by the second node is added by the transmitter of the first signal; a time-domain resource occupied by the first signaling is used to determine the first time; a transmitter of the first reference signal is a target cell, and whether the target cell is added by the transmitter of the first signal is used to determine whether the target reference signal is the first reference signal.

In one embodiment, the second transmitter 1702 transmits the first-type signaling in a second resource block subset using a spatial parameter of a second reference signal before the first time; herein, the first resource block subset and the second resource block subset are associated with a same control resource set.

In one embodiment, the second transmitter 1702 transmits a second information block; herein, the second information block comprises configuration information of a fourth resource block set, the transmitter of the first signal monitoring a third-type signaling in the fourth resource block set using a spatial parameter of the first reference signal; a transmitter of the third-type signaling includes the target cell.

In one embodiment, the second transmitter 1702 transmits a first reference signal set, the first reference signal set comprising a positive integer number of reference signal(s); herein, a measurement of the first reference signal set is used to trigger transmission of the first signal.

In one embodiment, the second transmitter 1702 transmits M configuration information blocks; herein, the M configuration information blocks respectively indicate the M reference signals; a transmitter of at least one reference signal among the M reference signals is a second cell, the second cell being added by the transmitter of the first signal; among the M configuration information blocks each configuration information block corresponding to a reference signal transmitted by the first cell comprises a first index, the first index being used to indicate the first cell; among the M configuration information blocks each configuration information block corresponding to a reference signal transmitted by the second cell comprises a second index, the second index being used to indicate the second cell.

In one embodiment, the second node is a base station.

In one embodiment, the second node is a UE.

In one embodiment, the second node is a relay node.

In one embodiment, the second receiver 1701 comprises at least one of the antenna 420, the receiver 418, the receiving processor 470, the multi-antenna receiving processor 472, the controller/processor 475 or the memory 476 in Embodiment 4.

In one embodiment, the second transmitter 1702 comprises at least one of the antenna 420, the transmitter 418, the transmitting processor 416, the multi-antenna transmitting processor 471, the controller/processor 475 or the memory 476 in Embodiment 4.

Embodiment 18

Embodiment 18 illustrates a structure block diagram of a processing device used in a third node according to one embodiment of the present application; as shown in FIG. 18. In FIG. 18, a processing device 1800 in a third node comprises a first processor 1801.

In Embodiment 18, the first processor 1801 receives a first signal.

In Embodiment 18, the first signal indicates a first reference signal out of M reference signals, M being a positive integer greater than 1; and a transmitter of at least one reference signal among the M reference signals is a first cell, the third node being a maintenance base station for the first cell; any cell maintained by the third node is not added by the transmitter of the first signal; the transmitter of the first signal receives a first signaling in a first resource block, a time-domain resource occupied by the first signaling being used to determine a first time, and the transmitter of the first signal monitors a first-type signaling in a first resource block subset after the first time using a spatial parameter of a target reference signal; a transmitter of the first reference signal is a target cell, and whether the target cell is added by the transmitter of the first signal is used to determine whether the target reference signal is the first reference signal.

In one embodiment, the first processor 1801 transmits the first signaling in the first resource block.

In one embodiment, the first processor 1801 transmits a second-type signaling in a third resource block subset after a second time using a spatial parameter of the first reference signal; herein, the target cell is a cell maintained by the third node, the first reference signal being used to determine the third resource block subset.

In one embodiment, the first processor 1801 transmits a first information block; herein, the first information block is used to determine configuration information of the third resource block subset.

In one embodiment, the first processor 1801 transmits a third-type signaling in a fourth resource block set using a spatial parameter of the first reference signal; herein, the target cell is a cell maintained by the third node; a transmitter of configuration information of the fourth resource block set is a cell added by the transmitter of the first signal.

In one embodiment, the third node is a base station.

In one embodiment, the third node is a UE.

In one embodiment, the third node is a relay node.

In one embodiment, the first processor 1801 comprises at least one of the antenna 420, the transmitter/receiver 418, the transmitting processor 416, the receiving processor 470, the multi-antenna transmitting processor 471, the multi-antenna receiving processor 472, the controller/processor 475 or the memory 476 in Embodiment 4.

Embodiment 19

Embodiment 19 illustrates a flowchart of a first reference signal group and a first signal according to one embodiment of the present application, as shown in FIG. 19. In 1900 illustrated by FIG. 19, each box represents a step. Particularly, the sequential step arrangement in each box herein does not imply a chronological order of steps marked respectively by these boxes.

In Embodiment 19, the first node in the present application receives a first reference signal group in step 1901; and transmits a first signal when one of a first condition or a second condition is satisfied in step 1902; herein, whether there is a condition being satisfied between the first condition and the second condition is used to determine whether to transmit the first signal; the first signal is used to determine a first reference signal, the first reference signal being one of M reference signal, M being a positive integer greater than 1; a measurement of the first reference signal group is used to determine whether the first condition is satisfied and whether the second condition is satisfied; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, as a response to one of the first condition or the second condition being satisfied, the first node transmits the first signal.

In one embodiment, the first reference signal group comprises a positive integer number of reference signal(s).

In one embodiment, the first reference signal group only comprises one reference signal.

In one embodiment, the first reference signal group comprises more than one reference signal.

In one embodiment, the first reference signal group comprises a Channel State Information-Reference Signal (CSI-RS).

In one embodiment, the first reference signal group comprises a Synchronisation Signal/physical broadcast channel Block (SSB).

In one embodiment, the first reference signal group comprises a Sounding Reference Signal (SRS).

In one embodiment, any reference signal in the first reference signal group includes a CSI-RS or an SSB.

In one embodiment, any reference signal in the first reference signal group is a periodic reference signal.

In one embodiment, any reference signal in the first reference signal group is a periodic reference signal or a semi-persistent reference signal.

In one embodiment, there is a reference signal in the first reference signal group being a semi-persistent reference signal or an aperiodic reference signal.

In one embodiment, all reference signals in the first reference signal group belong to a same Bandwidth Part (BWP) in frequency domain.

In one embodiment, there are two reference signals in the first reference signal group belonging to different BWPs in frequency domain.

In one embodiment, transmitters of all reference signals in the first reference signal group are a same cell.

In one embodiment, there are two reference signals in the first reference signal group of which transmitters are different cells.

In one embodiment, a transmitter of any reference signal in the first reference signal group is a serving cell of the first node.

In one embodiment, there is a reference signal in the first reference signal group of which a transmitter is a non-serving cell of the first node.

In one embodiment, the non-serving cell in the present application can be used for transmitting data.

In one embodiment, the non-serving cell in the present application refers to a cell available as a candidate for receiving and transmitting data.

In one embodiment, any two reference signals in the first reference signal group are not Quasi-Co-Located (QCL).

In one embodiment, any two reference signals in the first reference signal group are not QCL with QCL-TypeD.

In one embodiment, the first reference signal group is configured by an Information Element (IE).

In one embodiment, names of an IE for configuring the first reference signal group include RadioLinkMonitoring-Config.

In one embodiment, the first reference signal group is configured by a higher layer parameter.

In one embodiment, a higher layer parameter for configuring the first reference signal group comprises all or partial information in a failureDetectionResourcesToAddModList field in a RadioLinkMonitoringConfig IE.

In one embodiment, a higher layer parameter for configuring the first reference signal group comprises all or partial information in a tci-StatesPDCCH-ToAddList field in a ControlResourceSet IE.

In one embodiment, when both the first condition and the second condition are not satisfied, the first signal is not transmitted.

In one embodiment, if both the first condition and the second condition are not satisfied, the first signal is not transmitted.

In one embodiment, when any of the first condition or the second condition is satisfied, the first signal is transmitted.

In one embodiment, if any of the first condition or the second condition is satisfied, the first signal is transmitted.

In one embodiment, the first condition and the second condition are not satisfied simultaneously.

In one embodiment, when a value of the first counter is no smaller than the first threshold and smaller than the second threshold, the first condition is satisfied.

In one embodiment, when and only when a value of the first counter is no smaller than the first threshold and smaller than the second threshold, the first condition is satisfied.

In one embodiment, when a value of the first counter is no smaller than the second threshold, the second condition is satisfied.

In one embodiment, when and only when a value of the first counter is no smaller than the second threshold, the second condition is satisfied.

In one embodiment, when the first condition is satisfied, the first reference signal is a reference signal in the first reference signal subset; when the second condition is satisfied, the first reference signal is a reference signal in the second reference signal subset.

In one embodiment, the first signal comprises a baseband signal.

In one embodiment, the first signal comprises a radio signal.

In one embodiment, the first signal comprises a radio frequency signal.

In one embodiment, the first signal comprises a first characteristic sequence.

In one embodiment, the first characteristic sequence comprises one or more of a pseudo-random sequence, a Zadoff-Chu sequence or a low-Peak-to-Average Power Ratio (low-PAPR) sequence.

In one embodiment, the first characteristic sequence comprises Cyclic Prefix (CP).

In one embodiment, the first signal comprises a Random Access Channel (RACH) Preamble.

In one embodiment, the first signal comprises Uplink control information (UCI).

In one embodiment, the first signal comprises a Link Recovery Request (LRR).

In one embodiment, the first signal comprises a Medium Access Control layer Control Element (MAC CE).

In one embodiment, the first signal comprises a Beam Failure Recovery (BFR) MAC CE or a Truncated BFR MAC CE.

In one embodiment, a radio resource occupied by the first signal is used to determine the first reference signal.

In one embodiment, a radio resource occupied by the first signal indicates the first reference signal out of the M reference signals.

In one embodiment, a radio resource occupied by the first signal is one of M candidate radio resources; the M candidate radio resources respectively correspond to the M reference signals; the first reference signal is a reference signal corresponding to a radio resource occupied by the first signal among the M reference signals.

In one embodiment, the M candidate radio resources respectively comprise M Physical Random Access Channels (PRACHs).

In one embodiment, any of the M candidate radio resources comprises a time-frequency resource.

In one embodiment, any of the M candidate radio resources comprises a time-frequency resource and a code-domain resource.

In one embodiment, the M candidate radio resources are configured by a higher layer parameter.

In one embodiment, a higher layer parameter for configuring the M candidate radio resources comprises all or partial information in a candidateBeamRSList field of a BeamFailureRecoveryConfig IE.

In one embodiment, relations of correspondence between the M candidate radio resources and the M reference signals are configured by a higher layer parameter.

In one embodiment, a higher layer parameter for configuring relations of correspondence between the M candidate radio resources and the M reference signals comprises all or partial information in a candidateBeamRSList field of a BeamFailureRecoveryConfig IE.

In one embodiment, the M configuration information blocks are respectively used to indicate the M candidate radio resources.

In one embodiment, the M configuration information blocks are respectively used to indicate relations of correspondence between the M candidate radio resources and the M reference signals.

In one embodiment, the first signal comprises a first bit field, the first bit field comprising a positive integer number of bit(s); a value of the first bit field indicates the first reference signal.

In one embodiment, the M reference signals comprise a CSI-RS.

In one embodiment, the M reference signals comprise an SSB.

In one embodiment, the M reference signals comprise an SRS.

In one embodiment, any of the M reference signals comprises a CSI-RS or an SSB.

In one embodiment, the M reference signals are configured by a higher layer parameter.

In one embodiment, a higher layer parameter for configuring the M reference signals comprises all or partial information in a candidateBeamRSList field of a BeamFailureRecoveryConfig IE.

In one embodiment, the M reference signals are configured by an IE.

In one embodiment, names of an IE used for configuring the M reference signals include BeamFailureRecovery.

In one embodiment, M is equal to 2.

In one embodiment, M is greater than 2.

In one embodiment, any of the M reference signals is a periodic reference signal.

In one embodiment, any of the M reference signals is a periodic reference signal or a semi-persistent reference signal.

In one embodiment, there is a reference signal being a semi-persistent reference signal or an aperiodic reference signal among the M reference signals.

In one embodiment, any two reference signals among the M reference signals belong to a same BWP in frequency domain.

In one embodiment, there are two reference signals among the M reference signals belonging to different BWPs in frequency domain.

In one embodiment, the sentence that a measurement of the first reference signal group is used to determine whether the first condition is satisfied and whether the second condition is satisfied means that: a measurement of the first reference signal group is used to determine whether a value of the first counter is incremented by 1.

In one embodiment, the sentence that a measurement of the first reference signal group is used to determine whether the first condition is satisfied and whether the second condition is satisfied means that: a measurement of the first reference signal group is used to determine whether the third condition is being satisfied.

In one embodiment, the first counter is a BFI_ COUNTER.

In one embodiment, an initial value of the first counter is 0.

In one embodiment, an initial value of the first counter is a positive integer.

In one embodiment, a value of the first counter is a non-negative integer.

In one embodiment, the first threshold is configured by an IE.

In one embodiment, the first threshold is configured by a higher layer parameter.

In one embodiment, a higher layer parameter for configuring the first threshold comprises all or partial information in a beamFailureInstanceMaxCount field in a RadioLinkMonitoringConfig IE.

In one embodiment, the second threshold is configured by an IE.

In one embodiment, the second threshold is configured by a higher layer parameter.

In one embodiment, a higher layer parameter for configuring the second threshold comprises all or partial information in a beamFailureInstanceMaxCount field in a RadioLinkMonitoringConfig IE.

In one embodiment, the first reference signal subset comprises a positive integer number of reference signal(s) among the M reference signals.

In one embodiment, the first reference signal subset only comprises one reference signal among the M reference signals.

In one embodiment, the first reference signal subset comprises multiple reference signals among the M reference signals.

In one embodiment, any reference signal in the first reference signal subset is one of the M reference signals.

In one embodiment, there is one reference signal among the M reference signals that does not belong to the first reference signal subset.

In one embodiment, the first reference signal subset comprises the M reference signals.

In one embodiment, the second reference signal subset comprises a positive integer number of reference signal(s) among the M reference signals.

In one embodiment, the second reference signal subset only comprises one reference signal among the M reference signals.

In one embodiment, the second reference signal subset comprises multiple reference signals among the M reference signals.

In one embodiment, any reference signal in the second reference signal subset is one of the M reference signals.

In one embodiment, there is one reference signal among the M reference signals that does not belong to the second reference signal subset.

In one embodiment, the second reference signal subset comprises the M reference signals.

In one embodiment, the second reference signal subset comprises all reference signals among the M reference signals.

In one embodiment, any reference signal in the first reference signal subset does not belong to the second reference signal subset.

In one embodiment, any reference signal in the second reference signal subset does not belong to the first reference signal subset.

In one embodiment, there is a reference signal in the first reference signal subset belonging to the second reference signal subset.

In one embodiment, there is a reference signal in the second reference signal subset belonging to the first reference signal subset.

In one embodiment, there is a reference signal in the second reference signal subset not belonging to the first reference signal subset.

In one embodiment, there is a reference signal in the first reference signal subset not belonging to the second reference signal subset.

In one embodiment, the second reference signal subset comprises the first reference signal subset.

In one embodiment, the M reference signals consist of the first reference signal subset and the second reference signal subset.

In one embodiment, any reference signal among the M reference signals belongs to at least one of the first reference signal subset or the second reference signal subset.

Embodiment 20

Figure 20:
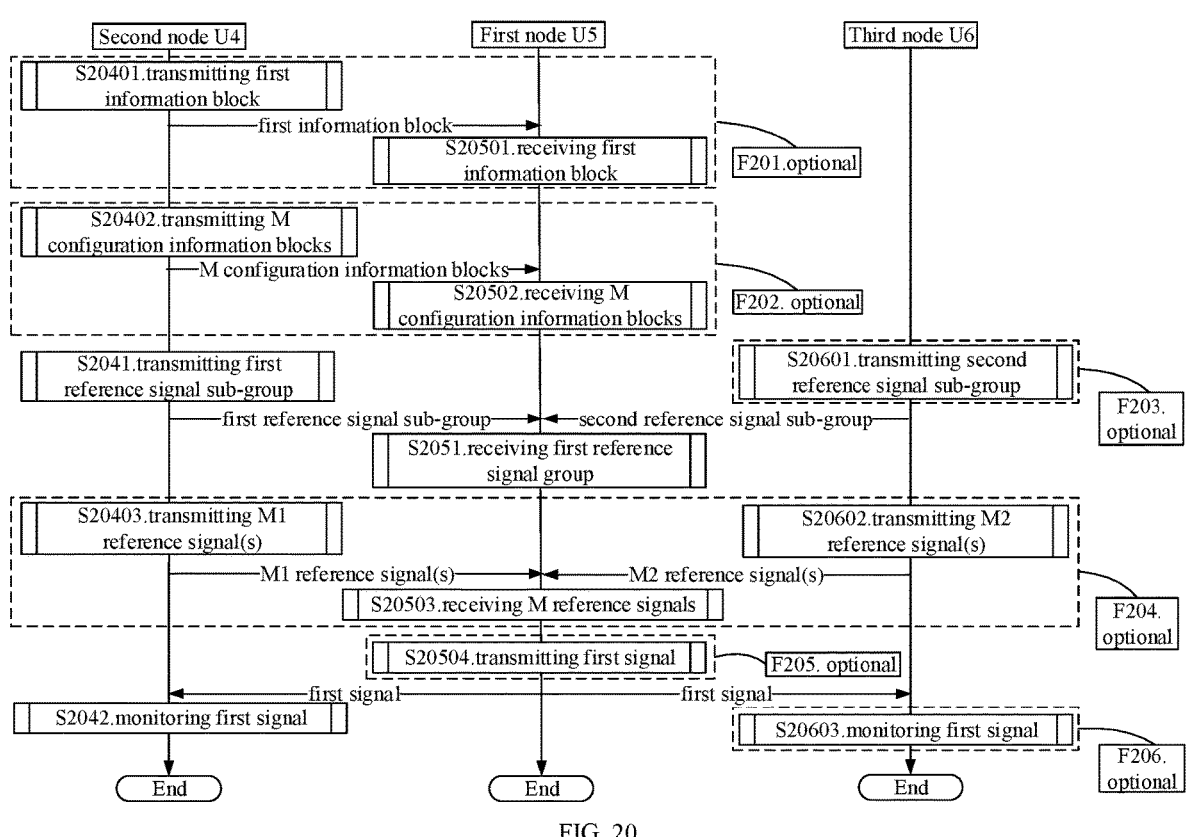
FIG. 20 illustrates a flowchart of transmission according to one embodiment of the present application.

Embodiment 20 illustrates a flowchart of wireless transmission according to one embodiment of the present application, as shown in FIG. 20. In FIG. 20, a second node U4, a first node U5 and a third node U6 are communication nodes that mutually transmit through air interfaces. In FIG. 20, steps marked by boxes F201 to F206 are optional, respectively.

The second node U4 transmits a first information block in step S20401; transmits M configuration information blocks in step S20402; and transmits a first reference signal subgroup in step S2041; transmits M1 reference signal(s) in step S20403; and monitors a first signal in step S2042.

The first node U5 receives a first information block in step S20501; receives M configuration information blocks in step S20502; and receives a first reference signal group in step S2051; receives M reference signals in step S20503; and transmits a first signal in step S20504.

The third node U6 transmits a second reference signal sub-group in step S20601; and transmits M2 reference signal(s) in step S20602; and monitors a first signal in step S20603.

In Embodiment 20, whether a condition between the first condition and the second condition is being satisfied is used by the first node U5 to determine whether to transmit the first signal; the first signal is used to determine a first reference signal, the first reference signal being one of M reference signal, M being a positive integer greater than 1; a measurement of the first reference signal group is used by the first node U5 to determine whether the first condition is satisfied and whether the second condition is satisfied; any reference signal in the first reference signal sub-group belongs to the first reference signal group; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, the first node U5 is the first node in the present application.

In one embodiment, the second node U4 is the second node in the present application.

In one embodiment, the third node U6 is the third node in the present application.

In one embodiment, an air interface between the second node U4 and the first node U5 includes a radio interface between a base station and a UE.

In one embodiment, an air interface between the third node U6 and the first node U5 includes a radio interface between a base station and a UE.

In one embodiment, the second node U4 is a maintenance base station for a serving cell of the first node U5.

In one embodiment, the first signal is used by the second node to determine the first reference signal.

In one embodiment, the first signal is used by the third node to determine the first reference signal.

In one embodiment, the monitoring refers to blind decoding, that is, to receive a signal and perform decoding operation; if the decoding is determined as correct according to a Cyclic Redundancy Check (CRC) bit, it is determined that the first signal is detected; otherwise, it is determined that the first signal is not detected.

In one embodiment, the monitoring refers to coherent detection, that is, to perform coherent reception and measure energy of a signal obtained by the coherent reception; if the energy of the signal obtained by the coherent reception is larger than a first given threshold, it is determined that the first signal is detected; otherwise, it is determined that the first signal is not detected.

In one embodiment, the monitoring refers to energy detection, that is, to sense energies of radio signals and average to obtain a received energy; if the received energy is larger than a second given threshold, it is determined that the first signal is detected; otherwise, it is determined that the first signal is not detected.

In one embodiment, the phrase of monitoring a first signal means: determining according to CRC whether the first signal is to be transmitted.

In one embodiment, the phrase of monitoring a first signal means: being unsure of whether the first signal is to be transmitted before it is determined whether decoding is correct according to CRC.

In one embodiment, the phrase of monitoring a first signal means: determining according to coherent detection whether the first signal is to be transmitted.

In one embodiment, the phrase of monitoring a first signal means: being unsure of whether the first signal is to be transmitted before coherent detection.

In one embodiment, the phrase of monitoring a first signal means: determining according to energy detection whether the first signal is to be transmitted.

In one embodiment, the phrase of monitoring a first signal means: being unsure of whether the first signal is to be transmitted before energy detection.

In one embodiment, there is one reference signal in the first reference signal group that does not belong to the first reference signal sub-group.

In one embodiment, the first reference signal sub-group is the first reference signal group.

In one embodiment, the first reference signal sub-group comprises all reference signals in the first reference signal group.

In one embodiment, the step marked by the box F205 in FIG. 20 exists.

In one embodiment, the first node transmits the first signal; herein, one of the first condition or the second condition is satisfied.

In one embodiment, the step marked by the box F205 in FIG. 20 does not exist.

In one embodiment, the first node does not transmit the first signal; herein, neither of the first condition or the second condition is satisfied.

In one embodiment, the first signal is transmitted on a PRACH.

In one embodiment, the first signal is transmitted on a Physical Uplink Control Channel (PUCCH).

In one embodiment, the first signal is transmitted on a Physical Uplink Shared Channel (PUSCH).

In one embodiment, the steps marked by the box F201 in FIG. 20 exist; the first information block is used by the first node U5 to determine the first reference signal group.

In one embodiment, the first information block is used by the first node U5 to determine only the first reference signal sub-group in the first reference signal group.

In one embodiment, the first information block is transmitted on a PDSCH.

In one embodiment, the first information block is comprised of two parts, and the two parts are respectively transmitted on two different PDSCHs.

In one embodiment, the steps marked by the box F202 in FIG. 20 exist; the M configuration information blocks respectively indicate the M reference signals; among the M configuration information blocks each configuration information block corresponding to a reference signal transmitted by the first cell comprises a first index, the first index being used to indicate the first cell; among the M configuration information blocks each configuration information block corresponding to a reference signal transmitted by the second cell comprises a second index, the second index being used to indicate the second cell.

In one embodiment, there is a reference signal in the first reference signal group that is earlier than one of the M configuration information blocks in time domain.

In one embodiment, there is a reference signal in the first reference signal group that is later than one of the M configuration information blocks in time domain.

In one embodiment, the M configuration information blocks are transmitted on PDSCH(s).

In one embodiment, any of the M configuration information blocks is transmitted on a PDSCH.

In one embodiment, the M configuration information blocks are transmitted on a same PDSCH.

In one embodiment, there are two configuration information blocks among the M configuration information blocks being respectively transmitted on two different PDSCHs.

In one embodiment, the step marked by the box F203 in FIG. 20 exists; any reference signal in the second reference signal sub-group belongs to the first reference signal group.

In one embodiment, there is a reference signal in the second reference signal sub-group that is earlier than a reference signal in the first reference signal sub-group in time domain.

In one embodiment, there is a reference signal in the second reference signal sub-group that is later than a reference signal in the first reference signal sub-group in time domain.

In one embodiment, there is one reference signal in the first reference signal group that does not belong to the second reference signal sub-group.

In one embodiment, there isn't any reference signal in the first reference signal group that belongs to both the first reference signal sub-group and the second reference signal sub-group.

In one embodiment, the first reference signal group consists of the first reference signal sub-group and the second reference signal sub-group.

In one embodiment, there is a reference signal in the first reference signal group that belongs to neither the first reference signal sub-group nor the second reference signal sub-group.

In one embodiment, the step marked by the box F203 in FIG. 20 does not exist.

In one embodiment, the steps marked by the box F204 in FIG. 20 exist; measurements on the M reference signals are respectively used by the first node U5 to determine M second-type received qualities; a second-type received quality corresponding to the first reference signal among the M second-type received qualities is no poorer than a fourth threshold; any reference signal of the M1 reference signal(s) is one of the M reference signals, M1 being a positive integer less than M; any reference signal of the M2 reference signal(s) is one of the M reference signals, M2 being a positive integer less than M.

In one embodiment, M1 is equal to 1.

In one embodiment, M1 is greater than 1.

In one embodiment, M2 is equal to 1.

In one embodiment, M2 is greater than 1.

In one embodiment, there isn't any reference signal among the M reference signals belonging to both the M1 reference signal(s) and the M2 reference signal(s).

In one embodiment, a sum of M1 and M2 is less than the M.

In one embodiment, a sum of M1 and M2 is equal to the M.

In one embodiment, there is a reference signal among the M reference signals belonging to neither the M1 reference signal(s) nor the M2 reference signal(s).

In one embodiment, the M reference signals consist of the M1 reference signal(s) and the M2 reference signal(s).

In one embodiment, there is a reference signal among the M reference signals that is earlier than a reference signal in the first reference signal group in time domain.

In one embodiment, there is a reference signal among the M reference signals that is later than a reference signal in the first reference signal group in time domain.

In one embodiment, when the third condition is satisfied, a physical layer of the first node transmits a first indication information block to a higher layer of the first node; herein, the first indication information block indicates a beam failure instance.

In one embodiment, when one of the first condition or the second condition is satisfied, a physical layer of the first node receives a second indication information block from a higher layer of the first node; herein, the second indication information block triggers transmission of the first signal.

In one embodiment, the second indication information block indicates the first reference signal.

In one embodiment, a higher layer of the first node initializes the first counter to 0.

In one embodiment, upon reception of an indication of a beam failure instance from a physical layer of the first node, a higher layer of the first node starts or restarts a first timer, and increments the first counter by 1.

In one embodiment, if the first timer expires, the first counter is cleared to zero.

In one embodiment, an initial value of the first timer is a positive integer.

In one embodiment, an initial value of the first timer is a positive real number.

In one embodiment, a unit of measuring an initial value of the first timer is a $Q_{out,LR}$ reporting periodicity of a beam failure detection RS.

In one embodiment, an initial value of the first timer is configured by a higher-layer parameter beamFailureDetectionTimer.

In one embodiment, an initial value of the first timer is configured by an IE.

In one embodiment, names of an IE for configuring an initial value of the first timer include RadioLinkMonitoring.

In one embodiment, when the first timer expires, the first counter is cleared to zero.

In one embodiment, when a random access procedure corresponding to the first signal is successfully completed, the first counter is cleared to zero.

In one embodiment, when the first node receives a first PDCCH, the first counter is cleared to zero; where the first signal comprises a BFR MAC CE or a Truncated BFR MAC CE, and a Hybrid Automatic Repeat reQuest (HARQ) process number is a first HARQ process number; the first PDCCH indicates a new UL grant transmission corresponding to the first HARQ process number, with CRC of the first PDCCH being scrambled by a Cell-Radio Network Temporary Identifier (C-RNTI).

In one embodiment, upon reception of a higher-layer request, a physical layer of the first node transmits a second information block to a higher layer of the first node; herein, the second information block indicates M0 reference signal (s) and M0 second-type received quality/qualities, any one of the M0 reference signal(s) being one of the M reference signals, M0 being a positive integer no greater than the M, and measurement(s) on the M0 reference signal(s) is/are respectively used to determine the M0 second-type received quality/qualities; any of the M0 second-type received quality/qualities is no poorer than the fourth threshold.

In one embodiment, M0 is equal to 1.

In one embodiment, M0 is greater than 1.

In one embodiment, the M0 reference signal(s) includes (include) the first reference signal.

In one embodiment, a physical layer of the first node receives a third information block from a higher layer of the first node; herein, the third information block indicates the first reference signal.

In one embodiment, a higher layer of the first node selects the first reference signal from the M0 reference signal(s).

In one embodiment, after transmitting the first signal, the first node blind detects a first-type signaling in a first resource block set.

In one embodiment, as a response to transmitting the first signal, the first node blind detects the first-type signaling in the first resource block set.

In one embodiment, the first-type signaling comprises a physical-layer signaling.

In one embodiment, the first-type signaling comprises a layer 1 (L1) signaling.

In one embodiment, the first-type signaling comprises Downlink Control Information (DCI).

In one embodiment, CRC of the first-type signaling is scrambled by a C-RNTI or a Modulation and Coding Scheme (MCS)-C-RNTI.

In one embodiment, CRC of the first-type signaling is scrambled by a Random Access (RA)-RNTI.

In one embodiment, the blind detection refers to blind decoding, that is, to receive a signal and perform decoding operation; if the decoding is determined to be correct according to a CRC bit, it is then determined that a said first-type signaling is detected; otherwise, it is determined that the first-type signaling is not detected.

In one embodiment, the blind detection refers to coherent detection, that is, to perform coherent reception and measure energy of a signal obtained by the coherent reception; if the energy of the signal obtained by the coherent reception is larger than a first given threshold, it is determined that a said first-type signaling is detected; otherwise, it is determined that the first-type signaling is not detected.

In one embodiment, the phrase of blind detecting a first-type signaling means: determining according to CRC whether the first-type signaling is to be transmitted.

In one embodiment, the phrase of blind detecting a first-type signaling means: being unsure of whether the first-type signaling is to be transmitted before it is determined whether decoding is correct according to CRC.

In one embodiment, the phrase of blind detecting a first-type signaling means: determining according to coherent detection whether the first-type signaling is to be transmitted.

In one embodiment, the phrase of blind detecting a first-type signaling means: being unsure of whether the first-type signaling is to be transmitted before coherent detection.

In one embodiment, the first resource block set comprises a search space set.

In one embodiment, the first resource block set is a search space set

In one embodiment, the first resource block set comprises one or more Physical Downlink Control Channel (PDCCH) candidates.

In one embodiment, the first resource block set comprises all or partial PDCCH candidates in a search space set.

In one embodiment, the first resource block set comprises a COntrol REsource SET (CORESET).

In one embodiment, a search space set to which the first resource block set belongs is identified by a recoverySearchSpaceId.

In one embodiment, an index of a search space set to which the first resource block set belongs is equal to 0.

In one embodiment, a search space set to which the first resource block set belongs includes a Type1-PDCCH Common search space (CSS) set.

In one embodiment, the first node receives the first reference signal and blind detects the first-type signaling in the first resource block set using a same spatial domain filter.

In one embodiment, the first node assumes that an antenna port of the first-type signaling being transmitted in the first resource block set is QCL with the first reference signal.

In one embodiment, the first node assumes that a DeModulation Reference Signal (DMRS) port of the first-type signaling being transmitted in the first resource block set is QCL with the first reference signal.

In one embodiment, the first resource block set is configured by a transmitter of the first reference signal.

In one embodiment, the first resource block set is configured by the second cell.

In one embodiment, the first resource block set is one of M3 candidate resource block sets, M3 being a positive integer greater than 1; any of the M reference signals corresponds to a candidate resource block set among the M3 candidate resource block sets; the first resource block set is a resource block set corresponding to the first reference signal among the M3 candidate resource block sets.

In one embodiment, any one of the M3 candidate resource block sets comprises a search space set.

In one embodiment, any one of the M3 candidate resource block sets is a search space set.

In one embodiment, any one of the M3 candidate resource block sets comprises one or more PDCCH candidates.

In one embodiment, any one of the M3 candidate resource block sets comprises a CORESET.

In one embodiment, with M3 being equal to M, the M3 candidate resource block sets respectively correspond to the M reference signals.

In one embodiment, with M3 being less than M, there is one candidate resource block set among the M3 candidate resource block sets that corresponds to multiple reference signals among the M reference signals.

In one embodiment, with M3 being no less than 2, the M3 candidate resource block sets include a first candidate resource block set and a second candidate resource block set; any reference signal among the M reference signal being associated with the first cell corresponds to the first candidate resource block set, and any reference signal among the M reference signals being associated with the second cell corresponds to the second candidate resource block set.

In one embodiment, the first-type signaling is transmitted on a PDCCH.

In one embodiment, the first node determines whether the first condition is satisfied and whether the second condition is satisfied.

In one embodiment, the first node determines whether the third condition is satisfied.

Embodiment 21

Figure 21:
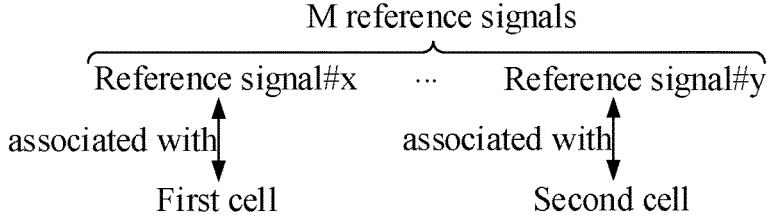
FIG. 21 illustrates a schematic diagram of M reference signals according to one embodiment of the present application.

Embodiment 21 illustrates a schematic diagram of M reference signals according to one embodiment of the present application; as shown in FIG. 21. In Embodiment 21, there are two reference signals among the M reference signals being respectively associated with the first cell and the second cell. In FIG. 21, a reference signal #x and a reference signal #y are respectively two reference signals of the M reference signals, where x and y are non-negative integers less than M, respectively, and x is unequal to y.

In one embodiment, the sentence that a reference signal is associated with a given cell means that: a Physical Cell Identity (PCI) of the given cell is used for generating the reference signal; the given cell is the first cell or the second cell.

In one embodiment, the sentence that a reference signal is associated with a given cell means that: the reference signal is QCL with an SSB of the given cell; the given cell is the first cell or the second cell.

In one embodiment, the sentence that a reference signal is associated with a given cell means that: the reference signal is transmitted by the given cell; the given cell is the first cell or the second cell.

In one embodiment, the sentence that a reference signal is associated with a given cell means that: a radio resource occupied by the reference signal is indicated by a configuration signaling, and a Radio Link Control (RLC) Bearer through which the configuration signaling is conveyed is configured via a CellGroupConfig IE, where a Special cell (Spcell) configured by the CellGroupConfig IE includes the given cell; the given cell is the first cell or the second cell.

In one embodiment, the configuration signaling comprises an RRC signaling.

In one embodiment, the radio resource comprises a time-frequency resource.

In one embodiment, the radio resource comprises an RS sequence.

In one embodiment, the radio resource comprises a code-domain resource.

In one embodiment, the code-domain resource comprises one or more of a pseudo-random sequence, a low-PAPR sequence, a cyclic shift, an Orthogonal Cover Code (OCC), an orthogonal sequence, a frequency-domain orthogonal sequence or a time-domain orthogonal sequence.

In one embodiment, any reference signal in the first reference signal subset is associated with the second cell.

In one embodiment, there is a reference signal in the first reference signal subset being associated with the first cell.

In one embodiment, there is a reference signal in the first reference signal subset being associated with a cell different from the second cell.

In one embodiment, any reference signal in the first reference signal subset is associated with a serving cell of the first node.

In one embodiment, any reference signal in the second reference signal subset is associated with the first cell.

In one embodiment, there is a reference signal in the second reference signal subset being associated with the second cell.

In one embodiment, any reference signal in the second reference signal subset is associated with one of the first cell and the second cell.

In one embodiment, there is a reference signal in the second reference signal subset being associated with a cell different from the first cell and the second cell.

In one embodiment, there is a reference signal in the second reference signal subset being associated with a non-serving cell of the first node.

In one embodiment, any reference signal in the second reference signal subset is associated with a non-serving cell of the first node.

In one embodiment, there is a reference signal in the second reference signal subset being associated with a serving cell of the first node.

In one embodiment, the first cell is different from the second cell.

In one embodiment, the first cell corresponds to a different PCI from the second cell.

In one embodiment, the first cell corresponds to a different CellIdentity from the second cell.

In one embodiment, the first cell corresponds to a different SCellIndex from the second cell.

In one embodiment, the first cell corresponds to a different ServCellIndex from the second cell.

In one embodiment, a maintenance base station for the first cell is different from a maintenance base station for the second cell.

In one embodiment, a maintenance base station for the first cell is the same as a maintenance base station for the second cell.

In one embodiment, the second cell and the first cell are respectively a Primary Cell (Pcell) and a Primary Secondary Cell (PScell) Group Cell of the first node.

In one embodiment, the second cell and the first cell respectively belong to a Master Cell Group (MCG) and a Secondary Cell Group (SCG) of the first node.

In one embodiment, the first cell and the second cell respectively belong to two different Cell Groups (CGs) of the first node.

In one embodiment, the first cell and the second cell belong to a same CG of the first node.

In one embodiment, a frequency-domain resource occupied by the first cell and a frequency-domain resource occupied by the second cell are overlapping.

In one embodiment, the first cell is a non-serving cell of the first node.

In one embodiment, the second cell is a serving cell of the first node.

In one embodiment, a transmitter of any reference signal among the M reference signals is one of the first cell or the second cell.

In one embodiment, there is a reference signal among the M reference signals of which a transmitter is a third cell, the third cell being different from the first cell and the second cell.

In one embodiment, the third cell is a non-serving cell of the first node.

In one embodiment, the third cell is a serving cell of the first node.

In one embodiment, a transmitter of the first reference signal is the first cell.

In one embodiment, a transmitter of the first reference signal is the second cell.

In one embodiment, a transmitter of the first reference signal is the third cell.

In one embodiment, a transmitter of any reference signal in the first reference signal group is a serving cell of the first node.

In one embodiment, there is a reference signal in the first reference signal group of which a transmitter is a serving cell of the first node.

In one embodiment, there is a reference signal in the first reference signal group of which a transmitter is a non-serving cell of the first node.

In one embodiment, a transmitter of any reference signal in the first reference signal group is the second cell.

In one embodiment, there is a reference signal in the first reference signal group of which a transmitter is the second cell.

In one embodiment, there is a reference signal in the first reference signal group of which a transmitter is the first cell.

In one embodiment, the sentence that the first cell is a non-serving cell of the first node means that: the first node does not perform SCell addition for the first cell.

In one embodiment, the sentence that the first cell is a non-serving cell of the first node means that: a latest sCellToAddModList received by the first node does not comprise the first cell.

In one embodiment, the sentence that the first cell is a non-serving cell of the first node means that: neither of a latest sCellToAddModList and a latest sCellToAddModList-SCG received by the first node comprises the first cell.

In one embodiment, the sentence that the first cell is a non-serving cell of the first node means that: the first node is not assigned with an SCellIndex for the first cell.

In one embodiment, the SCellIndex is a positive integer no greater than 31.

In one embodiment, the sentence that the first cell is a non-serving cell of the first node means that: the first node is not assigned with a ServCellIndex for the first cell.

In one embodiment, the ServCellIndex is a positive integer no greater than 31.

In one embodiment, the sentence that the first cell is a non-serving cell of the first node means that: the first cell is not a Primary serving Cell (PCell) of the first node.

In one embodiment, the sentence that the first cell is a non-serving cell of the first node means that: no RRC connection is established between the first node and the first cell.

In one embodiment, the sentence that the first cell is a non-serving cell of the first node means that: the C-RNTI of the first node is not assigned by the first cell.

In one embodiment, the sentence that the second cell is a serving cell of the first node means that: the first node performs SCell addition for the second cell.

In one embodiment, the sentence that the second cell is a serving cell of the first node means that: a latest sCellToAddModList received by the first node does not comprise the second cell.

In one embodiment, the sentence that the second cell is a serving cell of the first node means that: a latest sCellToAddModList or a latest sCellToAddModListSCG received by the first node comprises the second cell.

In one embodiment, the sentence that the second cell is a serving cell of the first node means that: the first node is assigned with an SCellIndex for the second cell.

In one embodiment, the sentence that the second cell is a serving cell of the first node means that: the first node is assigned with a ServCellIndex for the second cell.

In one embodiment, the sentence that the second cell is a serving cell of the first node means that: an RRC connection has been established between the first node and the second cell.

In one embodiment, the sentence that the second cell is a serving cell of the first node means that: the C-RNTI of the first node is assigned by the second cell.

In one embodiment, a transmitter of any reference signal in the first reference signal subset is a serving cell of the first node.

In one embodiment, the first reference signal subset comprises each reference signal transmitted by a serving cell of the first node among the M reference signals.

In one embodiment, the first node performs SCell addition for a transmitter of any reference signal in the first reference signal subset.

In one embodiment, a latest sCellToAddModList received by the first node comprises a transmitter of any reference signal in the first reference signal subset.

In one embodiment, the first node is assigned with an SCellIndex and/or a ServCellIndex for a transmitter of any reference signal in the first reference signal subset.

In one embodiment, the first node has established an RRC connection with a transmitter of any reference signal in the first reference signal subset.

In one embodiment, a transmitter of any reference signal in the first reference signal subset is the second cell.

In one embodiment, a transmitter of a reference signal in the first reference signal subset is not the second cell.

In one embodiment, a transmitter of any reference signal in the second reference signal subset is a non-serving cell of the first node.

In one embodiment, the second reference signal subset comprises each reference signal transmitted by a serving cell of the first node among the M reference signals.

In one embodiment, the first node does not perform SCell addition for a transmitter of any reference signal in the second reference signal subset.

In one embodiment, a latest sCellToAddModList received by the first node comprises a transmitter of any reference signal in the second reference signal subset.

In one embodiment, the first node is not assigned with an SCellIndex and/or a ServCellIndex for a transmitter of any reference signal in the second reference signal subset.

In one embodiment, a transmitter of any reference signal in the second reference signal subset is not a PCell of the first node.

In one embodiment, the first node establishes no RRC connection with a transmitter of any reference signal in the second reference signal subset.

In one embodiment, there are two reference signals in the second reference signal subset of which transmitters are respectively a non-serving cell of the first node and a serving cell of the first node.

In one embodiment, a transmitter of any reference signal in the second reference signal subset is the first cell.

In one embodiment, a transmitter of a reference signal in the second reference signal subset is not the first cell.

In one embodiment, there are two reference signals in the second reference signal subset of which transmitters are respectively the first cell and the second cell.

In one embodiment, the second node is not a maintenance base station for the first cell.

In one embodiment, the second node is a maintenance base station for the first cell.

Embodiment 22

Figure 22:
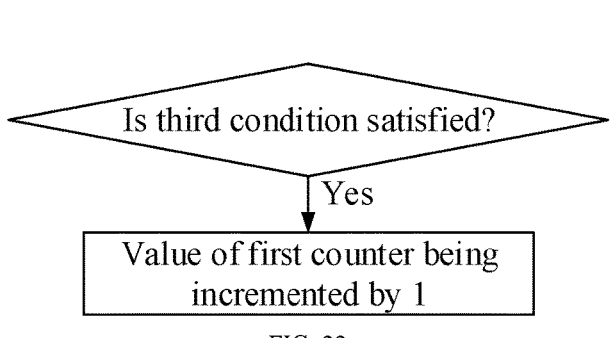
FIG. 22 illustrates a schematic diagram of a relation between a third condition and a first counter according to one embodiment of the present application.

Embodiment 22 illustrates a schematic diagram of a relation between a third condition and a first counter according to one embodiment of the present application; as shown in FIG. 22. In Embodiment 22, when the third condition is satisfied, a value of the first counter is incremented by 1; the third condition comprises: each first-type received quality in the first-type received quality group being poorer than the third threshold; a measurement of the first reference signal group being used by the first node to determine the first-type received quality group.

In one embodiment, whether the third condition is satisfied is used by the first node to determine whether a value of the first counter is incremented by 1.

In one embodiment, a number of reference signal(s) comprised in the first reference signal group is equal to a number of first-type received quality/qualities comprised in the first-type received quality group.

In one embodiment, the first reference signal group only comprises one reference signal, and the first-type received quality group only comprises one first-type received quality, a measurement of the reference signal being used to determine the first-type received quality.

In one embodiment, the first reference signal group comprises S reference signals, and the first-type received quality group comprises S first-type received qualities, S being a positive integer greater than 1; measurements on the S reference signals are respectively used to determine the S first-type received qualities.

In one embodiment, for any given reference signal in the first reference signal group, a measurement of the given reference signal within a first time interval is used to determine a first-type received quality corresponding to the given reference signal.

In one embodiment, for any given reference signal in the first reference signal group, the first node obtains a measurement used for computing a first-type received quality corresponding to the given reference signal only according to the given reference signal received within a first time interval.

In one embodiment, the measurement includes a channel measurement.

In one embodiment, the measurement includes an interference measurement.

In one embodiment, the first time interval is a consecutive duration.

In one embodiment, a length of the first time interval is $T_{Evaluate\_BFD\_SSB}$ ms or $T_{Evaluate\_BFD\_CSI-RS}$ ms.

In one embodiment, the definitions of $T_{Evaluate\_BFD\_SSB}$ and $T_{Evaluate\_BFD\_CSI-RS}$ can be found in 3 GPP TS38.133.

In one embodiment, any first-type received quality in the first-type received quality group is a Reference Signal Received Power (RSRP).

In one embodiment, any first-type received quality in the first-type received quality group is a L1-RSRP.

In one embodiment, any first-type received quality in the first-type received quality group is a Signal-to-noise and interference ratio (SINR).

In one embodiment, any first-type received quality in the first-type received quality group is a L1-SINR.

In one embodiment, any first-type received quality in the first-type received quality group is a BLock Error Rate (BLER).

In one embodiment, the sentence that a given received quality is poorer than the third threshold means that: the given received quality is one of an RSRP, a L1-RSRP, a SINR or a L1-SINR, the given received quality being smaller than the third threshold; the given received quality is any first-type received quality in the first-type received quality group.

In one embodiment, the sentence that a given received quality is poorer than the third threshold means that: the given received quality is a BLER, the given received quality being larger than the third threshold; the given received quality is any first-type received quality in the first-type received quality group.

In one embodiment, for any given reference signal in the first reference signal group, an RSRP of the given reference signal is used to determine a first-type received quality in the first-type received quality group that corresponds to the given reference signal.

In one embodiment, for any given reference signal in the first reference signal group, a first-type received quality in the first-type received quality group that corresponds to the given reference signal is equal to an RSRP of the given reference signal.

In one embodiment, for any given reference signal in the first reference signal group, a L1-RSRP of the given reference signal is used to determine a first-type received quality in the first-type received quality group that corresponds to the given reference signal.

In one embodiment, for any given reference signal in the first reference signal group, a first-type received quality in the first-type received quality group that corresponds to the given reference signal is equal to a L1-RSRP of the given reference signal.

In one embodiment, for any given reference signal in the first reference signal group, a SINR of the given reference signal is used to determine a first-type received quality in the first-type received quality group that corresponds to the given reference signal.

In one embodiment, for any given reference signal in the first reference signal group, a first-type received quality in the first-type received quality group that corresponds to the given reference signal is equal to a SINR of the given reference signal.

In one embodiment, any first-type received quality in the first-type received quality group is obtained by looking up in tables of an RSRP, a L1-RSRP, a SINR or a L1-SINR of a corresponding reference signal.

In one embodiment, any first-type received quality in the first-type received quality group is obtained according to hypothetical PDCCH transmission parameters.

In one embodiment, the specific definition of the hypothetical PDCCH transmission parameters can be found in 3GPP TS38.133.

In one embodiment, the third threshold is a real number.

In one embodiment, the third threshold is a non-negative real number.

In one embodiment, the third threshold is a non-negative real number no greater than 1.

In one embodiment, the third threshold is one of $Q_{out\_L}$, $Q_{out\_LR\_SSB}$ or $Q_{out\_LR\_CSI\text{-}RS}$.

In one embodiment, for definitions of the $Q_{out\_LR}$, $Q_{out\_LR\_SSB}$ and $Q_{out\_LR\_CSI\text{-}RS}$, refer to 3GPP TS38.133.

In one embodiment, the third threshold is determined by a higher layer parameter rlmInSyncOutOfSyncThreshold.

In one embodiment, when each first-type received quality in the first-type received quality group is poorer than the third threshold, the third condition is satisfied.

In one embodiment, if each first-type received quality in the first-type received quality group is poorer than the third threshold, the third condition is satisfied.

In one embodiment, when the third condition is satisfied, a value of the first counter is incremented by 1.

In one embodiment, when the third condition is satisfied, a physical layer of the first node transmits an indication of a beam failure instance to a higher layer of the first node.

Embodiment 23

Embodiment 23 illustrates a schematic diagram of a relation between a third condition and a first counter according to one embodiment of the present application; as shown in FIG. 23. In Embodiment 23, whether a third condition is satisfied is used to determine whether a value of the first counter is incremented by 1; when the third condition is satisfied, a value of the first counter is incremented by 1; the third condition comprises: each first-type received quality in a first-type received quality group is poorer than a third threshold; when a value of the first counter is less than the first threshold, a measurement of a second reference signal group is used to determine the first-type received quality group; when a value of the first counter is no less than the first threshold, a measurement of the first reference signal group is used to determine the first-type received quality group; the second reference signal group is a subset of the first reference signal group; there is a reference signal in the first reference signal group not belonging to the second reference signal group.

In one embodiment, a transmitter of any reference signal in the second reference signal group is the first cell.

In one embodiment, a transmitter of any reference signal in the second reference signal group is the second cell.

In one embodiment, a transmitter of any reference signal in the second reference signal group is a serving cell of the first node.

In one embodiment, a transmitter of any reference signal in the second reference signal group is a non-serving cell of the first node.

In one embodiment, when a value of the first counter is less than the first threshold, a measurement of only the second reference signal group in the first reference signal group is used to determine the first-type received quality group.

In one embodiment, when a value of the first counter is less than the first threshold, a number of first-type received qualities comprised in the first-type received quality group is equal to a number of reference signals comprised in the second reference signal group.

Embodiment 24

Embodiment 24 illustrates a schematic diagram of M reference signals and M second-type received qualities according to one embodiment of the present application; as shown in FIG. 24. In Embodiment 24, measurements on the M reference signals are respectively used to determine the M second-type received qualities; a second-type received quality corresponding to the first reference signal among the M second-type received qualities is no poorer than the fourth threshold. In FIG. 24, indexes of the M reference signals and the M second-type received qualities are respectively #0 . . . , and #(M−1).

In one embodiment, for any given reference signal among the M reference signals, a measurement of the given reference signal within a second time interval is used to determine a second-type received quality corresponding to the given reference signal.

In one embodiment, for any given reference signal among the M reference signals, the first node obtains a measurement used for computing a second-type received quality corresponding to the given reference signal only according to the given reference signal received within a second time interval.

In one embodiment, the second time interval is a consecutive duration.

In one embodiment, a length of the second time interval is $T_{Evaluate\_CBD\_SSB}$ ms or $T_{Evaluate\_CBD\_CSI\text{-}RS}$ ms.

In one embodiment, the definitions of $T_{Evaluate\_CBD\_SSB}$ or $T_{Evaluate\_CBD\_CSI\text{-}RS}$ can be found in 3GPP TS38.133.

In one embodiment, any second-type received quality among the M second-type received qualities is an RSRP.

In one embodiment, any second-type received quality among the M second-type received qualities is a L1-RSRP.

In one embodiment, any second-type received quality among the M second-type received qualities is a SINR.

In one embodiment, any second-type received quality among the M second-type received qualities is a L1-SINR.

In one embodiment, any second-type received quality among the M second-type received qualities is a BLER.

In one embodiment, the sentence that a given received quality is no poorer than the fourth threshold means that: the given received quality is one of an RSRP, a L1-RSRP, a SINR or a L1-SINR, the given received quality being larger than or equal to the fourth threshold; the given received quality is any second-type received quality among the M second-type received qualities.

In one embodiment, the sentence that a given received quality is no poorer than the fourth threshold means that: the given received quality is a BLER, the given received quality being smaller than or equal to the fourth threshold; the given received quality is any second-type received quality among the M second-type received qualities.

In one embodiment, for any given reference signal among the M reference signals, an RSRP of the given reference signal is used to determine a second-type received quality among the M second-type received qualities that corresponds to the given reference signal.

In one embodiment, for any given reference signal among the M reference signals, a second-type received quality among the M second-type received qualities that corresponds to the given reference signal is equal to an RSRP of the given reference signal.

In one embodiment, for any given reference signal among the M reference signals, a L1-RSRP of the given reference signal is used to determine a second-type received quality among the M second-type received qualities that corresponds to the given reference signal.

In one embodiment, for any given reference signal among the M reference signals, a second-type received quality among the M second-type received qualities that corresponds to the given reference signal is equal to a L1-RSRP of the given reference signal.

In one embodiment, for any given reference signal among the M reference signals, a second-type received quality among the M second-type received qualities that corresponds to the given reference signal is equal to a L1-RSRP of the given reference signal after a receiving power being scaled according to a value indicated by a higher-layer parameter powerControlOffsetSS.

In one embodiment, for any given reference signal among the M reference signals, a SINR of the given reference signal is used to determine a second-type received quality among the M second-type received qualities that corresponds to the given reference signal.

In one embodiment, for any given reference signal among the M reference signals, a second-type received quality among the M second-type received qualities that corresponds to the given reference signal is equal to a SINR of the given reference signal.

In one embodiment, any second-type received quality among the M second-type received qualities is obtained by looking up in tables of an RSRP, a L1-RSRP, a SINR or a L1-SINR of a corresponding reference signal.

In one embodiment, the fourth threshold is a real number.

In one embodiment, the fourth threshold is a non-negative real number.

In one embodiment, the fourth threshold is a non-negative real number no greater than 1.

In one embodiment, the fourth threshold is $Q_{in\_LR}$.

In one embodiment, the definition of the $Q_{in\_LR}$ can be found in 3GPP TS38.133.

In one embodiment, the fourth threshold is configured by a higher layer parameter rsrp-ThresholdSSB.

In one embodiment, for each reference signal in the first reference signal subset and each reference signal in the second reference signal subset, the value of the fourth threshold varies.

In one embodiment, when the first reference signal belongs to the first reference signal subset, the fourth threshold is equal to a first value; when the first reference signal belongs to the second reference signal subset, the fourth threshold is equal to a second value; the first value and the second value are respectively real numbers, the first value being unequal to the second value.

In one embodiment, the first condition comprises: there is a reference signal in the first reference signal subset corresponding to a second-type received quality no poorer than the fourth threshold.

In one embodiment, when a value of the first counter is no less than the first threshold and less than the second threshold, and there is a reference signal in the first reference signal subset corresponding to a second-type received quality no poorer than the fourth threshold, the first condition is satisfied.

In one embodiment, when a second-type received quality corresponding to any reference signal in the first reference signal subset is poorer than the fourth threshold, the first condition is not satisfied.

In one embodiment, the second condition comprises: there is a reference signal in the second reference signal subset corresponding to a second-type received quality no poorer than the fourth threshold.

In one embodiment, when a value of the first counter is no less than the second threshold and there is a reference signal in the second reference signal subset corresponding to a second-type received quality no poorer than the fourth threshold, the second condition is satisfied.

In one embodiment, when a second-type received quality corresponding to any reference signal in the second reference signal subset is poorer than the fourth threshold, the second condition is not satisfied.

In one embodiment, when a given reference signal belongs to the first reference signal subset, the fourth threshold is equal to a first value; when the given reference signal belongs to the second reference signal subset, the fourth threshold is equal to a second value; the first value and the second value are respectively real numbers, the first value being unequal to the second value; the given reference signal is any one of the M reference signals.

Embodiment 25

Embodiment 25 illustrates a schematic diagram of M configuration information blocks according to one embodiment of the present application; as shown in FIG. 25. In Embodiment 25, the M configuration information blocks respectively indicate the M reference signals; among the M configuration information blocks each configuration information block corresponding to a reference signal transmitted by the first cell comprises the first index, the first index being used to indicate the first cell; among the M configuration information blocks each configuration information block corresponding to a reference signal transmitted by the second cell comprises the second index, the second index being used to indicate the second cell. In FIG. 25, indexes of the M configuration information blocks and the M reference signals are #0, . . . and #(M−1), respectively.

In one embodiment, any configuration information block among the M configuration information blocks is carried by an RRC signaling.

In one embodiment, any configuration information block among the M configuration information blocks is carried by a MAC CE signaling.

In one embodiment, there is a configuration information block among the M configuration information blocks being carried by an RRC signaling and a MAC CE signaling together.

In one embodiment, any configuration information block among the M configuration information blocks comprises information in all or partial fields in an IE.

In one embodiment, any configuration information block among the M configuration information blocks comprises partial or all information in a candidateBeamRSList field in a BeamFailureRecoveryConfig IE.

In one embodiment, any configuration information block corresponding to a reference signal transmitted by the second cell among the M configuration information blocks comprises partial or all information in a candidate-BeamRSList field in a BeamFailureRecoveryConfig IE.

In one embodiment, the first index is a non-negative integer.

In one embodiment, the first index is a CellIdentity corresponding to the first cell.

In one embodiment, the first index is a PhysCellId corresponding to the first cell.

In one embodiment, the second index is a non-negative integer.

In one embodiment, the second index is a SCellIndex corresponding to the second cell.

In one embodiment, the second index is a ServCellIndex corresponding to the second cell.

In one embodiment, the second index is a PhysCellId corresponding to the second cell.

In one embodiment, any configuration information block among the M configuration information blocks comprises a first-type index, and the first-type index comprised in any given configuration information block among the M configuration information blocks is used for identifying a reference signal corresponding to the given configuration information block among the M reference signals.

In one embodiment, the first-type index comprised in the given configuration information block is an index of a reference signal corresponding to the given configuration information block among the M reference signals.

In one embodiment, the first-type index is a non-negative integer.

In one embodiment, the first-type index comprises an SSB-Index.

In one embodiment, the first-type index comprises an SSB Resource indicator (SSBRI).

In one embodiment, the first-type index comprises an NZP-CSI-RS-ResourceId.

In one embodiment, the first-type index comprises a CSI-RS Resource indicator (CRI).

In one embodiment, any configuration information block among the M configuration information blocks comprises a second-type index, and the second-type index comprised in any given configuration information block among the M configuration information blocks indicates a candidate radio resource among the M candidate radio resources corresponding to a reference signal that corresponds to the given configuration information block.

In one embodiment, the second-type index is a non-negative integer.

In one embodiment, the second-type index comprises a ra-PreambleIndex.

In one embodiment, a configuration information block corresponding to the first reference signal among the M configuration information blocks indicates a radio resource occupied by the first signal.

In one embodiment, the first index and the second index are respectively comprised of Q1 bits and Q2 bits, where Q1 and Q2 are two positive integers different from each other; Q1 is greater than Q2.

In one embodiment, Q1 is 10.

In one embodiment, Q1 is 28.

In one embodiment, Q1 is 9.

In one embodiment, Q2 is 5.

In one embodiment, Q2 is 3.

In one embodiment, transmitters of the M configuration information blocks are the second cell.

In one embodiment, among the M configuration information blocks there is a configuration information block of which the transmitter is the second cell.

In one embodiment, a transmitter of any configuration information block among the M configuration information blocks is a serving cell of the first node.

In one embodiment, there is a configuration information block among the M configuration information blocks of which a transmitter is a serving cell of the first node.

In one embodiment, there is a configuration information block among the M configuration information blocks of which a transmitter is the first cell.

In one embodiment, there is a configuration information block among the M configuration information blocks of which a transmitter is a non-serving cell of the first node.

In one embodiment, a maintenance base station for the first cell is different from a maintenance base station for the second cell.

In one embodiment, a maintenance base station for the first cell is the same as a maintenance base station for the second cell.

In one embodiment, a maintenance base station for the first cell is the same as a maintenance base station for the third cell.

In one embodiment, a maintenance base station for the first cell is different from a maintenance base station for the third cell.

In one embodiment, a maintenance base station for the second cell is the same as a maintenance base station for the third cell.

In one embodiment, a maintenance base station for the second cell is different from a maintenance base station for the third cell.

Embodiment 26

Embodiment 26 illustrates a schematic diagram of a first information block according to one embodiment of the present application; as shown in FIG. 26. In Embodiment 26, the first information block is used to determine the first reference signal group.

In one embodiment, the first information block is carried by an RRC signaling.

In one embodiment, the first information block is carried by a MAC CE signaling.

In one embodiment, the first information block is carried by an RRC signaling and a MAC CE signaling together.

In one embodiment, the first information block comprises information in all or partial fields in an IE.

In one embodiment, the first information block comprises information in all or partial fields in a RadioLinkMonitoringConfig IE.

In one embodiment, the first information block comprises all or partial information in a failureDetectionResourcesToAddModList field in a RadioLinkMonitoringConfig IE.

In one embodiment, the first information block comprises all or partial information in a tci-StatesPDCCH-ToAddList field in a ControlResourceSet IE.

In one embodiment, the first information block indicates an index of each reference signal in the first reference signal group.

In one embodiment, indexes of reference signals in the first reference signal group include an SSB-Index.

In one embodiment, indexes of reference signals in the first reference signal group include an NZP-CSI-RS-ResourceId.

In one embodiment, the first information block indicates that a purpose of each reference signal in the first reference signal group includes beamFailure.

In one embodiment, a transmitter of the first information block is the second cell.

In one embodiment, a transmitter of the first information block is a serving cell of the first node.

In one embodiment, a transmitter of the first information block is the first cell.

In one embodiment, a transmitter of the first information block is a non-serving cell of the first node.

In one embodiment, the first information block is comprised of two parts, and the two parts are respectively transmitted by two different cells.

In one embodiment, the transmitters of the two parts are the first cell and the second cell respectively.

In one embodiment, the transmitters of the two parts are a serving cell and a non-serving cell of the first node.

Embodiment 27

Embodiment 27 illustrates a schematic diagram of M reference signals and M radio resource groups according to one embodiment of the present application; as shown in FIG. 27. In Embodiment 27, there are two reference signals among the M reference signals of which transmitters are respectively a non-serving cell of the first node and a serving cell of the first node; the M reference signals respectively correspond to the M radio resource groups; each radio resource group corresponding to a reference signal transmitted by a serving cell of the first node among the M radio resource groups comprises one radio resource; each radio resource group corresponding to a reference signal transmitted by a non-serving cell of the first node among the M radio resource groups comprises two radio resources.

In one embodiment, any radio resource in the M radio resource groups comprises a PRACH resource.

In one embodiment, any radio resource in the M radio resource groups comprises a time-frequency resource.

In one embodiment, any radio resource in the M radio resource groups comprises a time-frequency resource and a code-domain resource.

In one embodiment, the M radio resource groups are configured by a higher layer parameter.

In one embodiment, relations of correspondence between the M radio resource groups and the M reference signals are configured by a higher layer parameter.

In one embodiment, a higher layer parameter for configuring the M radio resource groups comprises all or partial information in a candidateBeamRSList field of a BeamFailureRecoveryConfig IE.

In one embodiment, a higher layer parameter for configuring relations of correspondence between the M radio resource groups and the M reference signals comprises all or partial information in a candidateBeamRSList field of a BeamFailureRecoveryConfig IE.

In one embodiment, the M configuration information blocks are respectively used to indicate the M radio resource groups.

In one embodiment, each configuration information block among the M configuration information blocks that corresponds to a reference signal transmitted by a non-serving cell of the first node comprises two second-type indexes, the two second-type indexes respectively indicating two radio resources comprised in a corresponding radio resource group.

In one embodiment, each configuration information block among the M configuration information blocks that corresponds to a reference signal transmitted by a non-serving cell of the first node comprises one second-type index, the second-type index indicating a radio resource of two radio resources comprised in a corresponding radio resource group; the other of the two radio resources is unrelated to the M configuration information blocks.

In one embodiment, each configuration information block among the M configuration information blocks that corresponds to a reference signal transmitted by a serving cell of the first node comprises one second-type index, the second-type index indicating a radio resource comprised in a corresponding radio resource group.

In one embodiment, each radio resource group corresponding to a reference signal transmitted by a serving cell of the first node among the M radio resource groups is comprised of one radio resource.

In one embodiment, each radio resource group corresponding to a reference signal transmitted by a serving cell of the first node among the M radio resource groups is comprised of two radio resources.

In one embodiment, a radio resource group among the M radio resource groups corresponding to any reference signal in the first reference signal subset comprises a radio resource.

In one embodiment, a radio resource group among the M radio resource groups corresponding to any reference signal in the second reference signal subset comprises two radio resources.

In one embodiment, any two radio resources in the M radio resource groups occupy mutually orthogonal time-frequency resources or different PRACH Preambles.

In one embodiment, a given radio resource group is any one of the M radio resource groups, if the given radio resource group comprises two radio resources, the two radio resources correspond to different spatial relations.

In one embodiment, a given radio resource group is any one of the M radio resource groups, if the given radio resource group comprises two radio resources, the first node transmits signals in the two radio resources respectively using different QCL assumptions.

Embodiment 28

Embodiment 28 illustrates a schematic diagram of a radio resource occupied by a first signal according to one embodiment of the present application; as shown in FIG. 28. In Embodiment 28, a first radio resource group is a radio resource group corresponding to the first reference signal among the M radio resource groups; when a transmitter of the first reference signal is a non-serving cell of the first node, the first radio resource group comprises a first radio resource and a second radio resource; a radio resource occupied by the first signal is one of the first radio resource and the second radio resource.

In one embodiment, when a radio resource occupied by the first signal is the first radio resource, the first node transmits the first signal and receives a third reference signal using a same spatial domain filter; when a radio resource occupied by the first signal is the second radio resource, the first node transmits the first signal and receives the first reference signal using a same spatial domain filter; the first reference signal is different from the third reference signal, the third reference signal comprising a CSI-RS or an SSB.

In one embodiment, the first reference signal and the third reference signal cannot be assumed to be QCL.

In one embodiment, the third reference signal is a reference signal in the first reference signal subset.

In one embodiment, the first node itself selects the third reference signal from the first reference signal subset.

In one embodiment, the first node randomly selects the third reference signal from the first reference signal subset.

In one embodiment, a value of the first counter is used to determine a radio resource occupied by the first signal from the first radio resource and the second radio resource.

In one embodiment, when a value of the first counter is no less than the second threshold and less than a fifth threshold, a radio resource occupied by the first signal is the first radio resource; when a value of the first counter is no less than the fifth threshold, a radio resource occupied by the first signal is the second radio resource; the fifth threshold is a positive integer greater than the second threshold.

In one embodiment, the first signal belongs to a first signal set, and any signal in the first signal set carries the same information as the first signal; any two signals in the first signal set are orthogonal in time domain; signals in the first signal set are sequentially indexed according to time, where an index of the first signal in the first signal set is used to determine a radio resource occupied by the first signal from the first radio resource and the second radio resource.

In one embodiment, when an index of the first signal in the first signal set is less than a sixth threshold, the first signal occupies the first radio resource; when an index of the first signal in the first signal set is no less than the sixth threshold, the first signal occupies the second radio resource; the sixth threshold is a positive integer.

In one embodiment, the first node transmits the first signal respectively in the first radio resource and the second radio resource.

In one embodiment, the second cell monitors the first signal in the first radio resource.

In one embodiment, the second cell monitors the first signal in only the first radio resource of the first radio resource and the second radio resource.

In one embodiment, the first cell monitors the first signal in the second radio resource.

In one embodiment, the first cell monitors the first signal in only the second radio resource of the first radio resource and the second radio resource.

In one embodiment, the second node monitors the first signal in the first radio resource.

In one embodiment, the second node monitors the first signal in only the first radio resource of the first radio resource and the second radio resource.

In one embodiment, the third node monitors the first signal in the second radio resource.

In one embodiment, the third node monitors the first signal in only the second radio resource of the first radio resource and the second radio resource.

Embodiment 29

Figure 29:
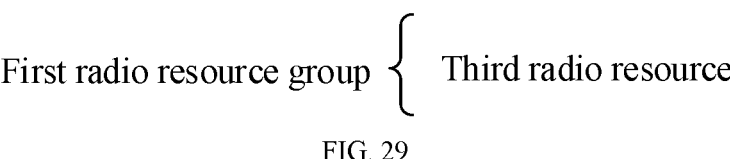
FIG. 29 illustrates a schematic diagram of a radio resource occupied by a first signal according to one embodiment of the present application.

Embodiment 29 illustrates a schematic diagram of a radio resource occupied by a first signal according to one embodiment of the present application; as shown in FIG. 29. In Embodiment 29, a first radio resource group is a radio resource group corresponding to the first reference signal among the M radio resource groups; when a transmitter of the first reference signal is a serving cell of the first node, the first radio resource group comprises a third radio resource; a radio resource occupied by the first signal is the third radio resource.

In one embodiment, the first node receives the first reference signal and transmits the first signal in the third radio resource using a same spatial domain filter.

In one embodiment, the second cell monitors the first signal in the third radio resource.

In one embodiment, the first cell monitors the first signal in the third radio resource.

In one embodiment, only the second cell of the second cell and the first cell monitors the first signal in the third radio resource.

In one embodiment, the second node monitors the first signal in the third radio resource.

In one embodiment, the third node monitors the first signal in the third radio resource.

In one embodiment, only the second node of the second node and the third node monitors the first signal in the third radio resource.

Embodiment 30

Figure 30:
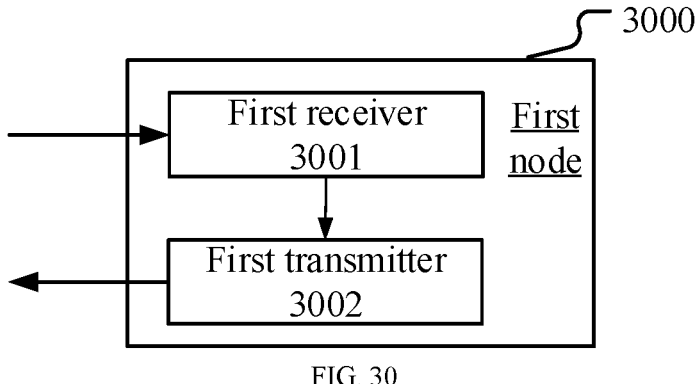
FIG. 30 illustrates a structure block diagram of a processing device in a first node according to one embodiment of the present application.

Embodiment 30 illustrates a structure block diagram of a processing device used in a first node according to one embodiment of the present application; as shown in FIG. 30. In FIG. 30, a processing device 3000 in the first node comprises a first receiver 3001 and a first transmitter 3002.

In Embodiment 30, the first receiver 3000 receives a first reference signal group; the first transmitter 3002 transmits a first signal when one of a first condition or a second condition is satisfied.

In Embodiment 30, whether there is a condition being satisfied between the first condition and the second condition is used to determine whether to transmit the first signal; the first signal is used to determine a first reference signal, the first reference signal being one of M reference signal, M being a positive integer greater than 1; a measurement of the first reference signal group is used to determine whether the first condition is satisfied and whether the second condition is satisfied; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, there are two reference signals among the M reference signals being respectively associated with a first cell and a second cell.

In one embodiment, whether a third condition is satisfied is used to determine whether a value of the first counter is incremented by 1; the third condition comprises: each first-type received quality in a first-type received quality group is poorer than a third threshold; a measurement of the first reference signal group is used to determine the first-type received quality group.

In one embodiment, the first receiver 3001 receives the M reference signals; herein, measurements on the M reference signals are respectively used to determine M second-type received qualities; a second-type received quality corresponding to the first reference signal among the M second-type received qualities is no poorer than a fourth threshold.

In one embodiment, the first receiver 3001 receives M configuration information blocks; herein, the M configuration information blocks respectively indicate the M reference signals; among the M configuration information blocks each configuration information block corresponding to a reference signal transmitted by the first cell comprises a first index, the first index being used to indicate the first cell; among the M configuration information blocks each configuration information block corresponding to a reference signal transmitted by the second cell comprises a second index, the second index being used to indicate the second cell.

In one embodiment, the first receiver 3001 receives a first information block; herein, the first information block is used to determine the first reference signal group.

In one embodiment, there are two reference signals among the M reference signals of which transmitters are respectively a non-serving cell of the first node and a serving cell of the first node; the M reference signals respectively correspond to M radio resource groups; each radio resource group corresponding to a reference signal transmitted by a serving cell of the first node among the M radio resource groups comprises one radio resource; each radio resource group corresponding to a reference signal transmitted by a non-serving cell of the first node among the M radio resource groups comprises two radio resources; a radio resource occupied by the first signal belongs to a radio resource group corresponding to the first reference signal among the M radio resource groups.

In one embodiment, the first node is a UE.

In one embodiment, the first node is a relay node.

In one embodiment, the first receiver 3001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 3002 comprises at least one of the antenna 452, the transmitter 454, the transmitting processor 468, the multi-antenna transmitting processor 457, the controller/processor 459, the memory 460 or the data source 467 in Embodiment 4.

Embodiment 31

Figure 31:
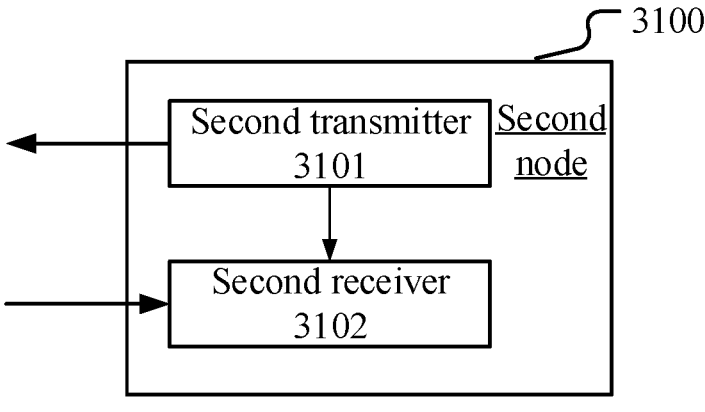
FIG. 31 illustrates a structure block diagram of a processing device used in a second node according to one embodiment of the present application.

Embodiment 31 illustrates a structure block diagram of a processing device used in a second node according to one embodiment of the present application; as shown in FIG. 31. In FIG. 31, a processing device 3100 in the second node comprises a second transmitter 3101 and a second receiver 3102.

In Embodiment 31, the second transmitter 3101 transmits a first reference signal sub-group; the second receiver 3102 monitors a first signal.

In Embodiment 31, whether there is a condition being satisfied between a first condition and a second condition is used to determine whether the first signal is transmitted; the first signal is used to determine a first reference signal, the first reference signal being one of M reference signal, M being a positive integer greater than 1; a measurement of a first reference signal group is used to determine whether the first condition is satisfied and whether the second condition is satisfied, any reference signal in the first reference signal sub-group belonging to the first reference signal group; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, there are two reference signals among the M reference signals being respectively associated with a first cell and a second cell, where the second node is a maintenance base station for the second cell.

In one embodiment, whether a third condition is satisfied is used to determine whether a value of the first counter is incremented by 1; the third condition comprises: each first-type received quality in a first-type received quality group is poorer than a third threshold; a measurement of the first reference signal group is used to determine the first-type received quality group.

In one embodiment, the second transmitter 3101 transmits M1 reference signal(s); herein, any reference signal of the M1 reference signal(s) is one of the M reference signals, M1 being a positive integer less than M; measurements on the M reference signals are respectively used to determine M second-type received qualities; a second-type received quality corresponding to the first reference signal among the M second-type received qualities is no poorer than a fourth threshold.

In one embodiment, the second transmitter 3101 transmits M configuration information blocks; herein, the M configuration information blocks respectively indicate the M reference signals; among the M configuration information blocks each configuration information block corresponding to a reference signal transmitted by the first cell comprises a first index, the first index being used to indicate the first cell; among the M configuration information blocks each configuration information block corresponding to a reference signal transmitted by the second cell comprises a second index, the second index being used to indicate the second cell.

In one embodiment, the second transmitter 3101 transmits a first information block; herein, the first information block is used to determine the first reference signal group.

In one embodiment, there are two reference signals among the M reference signals of which transmitters are respectively a non-serving cell of the transmitter of the first signal and a serving cell of the transmitter of the first signal; the M reference signals respectively correspond to M radio resource groups; each radio resource group corresponding to a reference signal transmitted by a serving cell of the transmitter of the first signal among the M radio resource groups comprises one radio resource; each radio resource group corresponding to a reference signal transmitted by a non-serving cell of the transmitter of the first signal among the M radio resource groups comprises two radio resources; a radio resource occupied by the first signal belongs to a radio resource group corresponding to the first reference signal among the M radio resource groups.

In one embodiment, the second node is a base station.

In one embodiment, the second node is a UE.

In one embodiment, the second node is a relay node.

In one embodiment, the second transmitter 3101 comprises at least one of the antenna 420, the transmitter 418, the transmitting processor 416, the multi-antenna transmitting processor 471, the controller/processor 475 or the memory 476 in Embodiment 4.

In one embodiment, the second receiver 3102 comprises at least one of the antenna 420, the receiver 418, the receiving processor 470, the multi-antenna receiving processor 472, the controller/processor 475 or the memory 476 in Embodiment 4.

Embodiment 32

Figure 32:
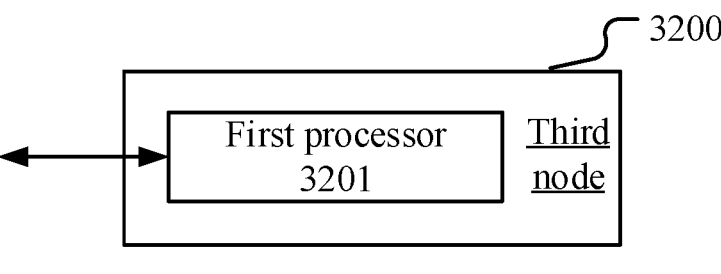
FIG. 32 illustrates a structure block diagram of a processing device used in a third node according to one embodiment of the present application.

Embodiment 32 illustrates a structure block diagram of a processing device used in a third node according to one embodiment of the present application; as shown in FIG. 32. In FIG. 32, a processing device 3200 in the third node comprises a first processor 3201.

In Embodiment 32, the first processor 3201 monitors a first signal.

In Embodiment 32, whether there is a condition being satisfied between a first condition and a second condition is used to determine whether the first signal is transmitted; the first signal is used to determine a first reference signal, the first reference signal being one of M reference signal, M being a positive integer greater than 1; a measurement of a first reference signal group is used to determine whether the first condition is satisfied and whether the second condition is satisfied; the first condition comprises that a value of a first counter is no less than a first threshold and less than a second threshold, while the second condition comprises that a value of the first counter is no less than the second threshold; the first threshold and the second threshold are respectively positive integers, and the first threshold is less than the second threshold; the first reference signal is related to which one of the first condition and the second condition is satisfied; when the first condition is satisfied, the first reference signal belongs to a first reference signal subset; when the second condition is satisfied, the first reference signal belongs to a second reference signal subset; the first reference signal subset and the second reference signal subset are respectively subsets of the M reference signals.

In one embodiment, there are two reference signals among the M reference signals being respectively associated with a first cell and a second cell; the third node is a maintenance base station for the first cell; any cell maintained by the third node is a non-serving cell of the transmitter of the first signal.

In one embodiment, the first processor 3201 transmits a second reference signal sub-group; herein, any reference signal in the second reference signal sub-group belongs to the first reference signal group.

In one embodiment, whether a third condition is satisfied is used to determine whether a value of the first counter is incremented by 1; the third condition comprises: each first-type received quality in a first-type received quality group is poorer than a third threshold; a measurement of the first reference signal group is used to determine the first-type received quality group.

In one embodiment, the first processor 3201 transmits M2 reference signal(s); herein, any reference signal of the M2 reference signal(s) is one of the M reference signals, M2 being a positive integer less than M; measurements on the M reference signals are respectively used to determine M second-type received qualities; a second-type received quality corresponding to the first reference signal among the M second-type received qualities is no poorer than a fourth threshold.

In one embodiment, there are two reference signals among the M reference signals of which transmitters are respectively a non-serving cell of the transmitter of the first signal and a serving cell of the transmitter of the first signal; the M reference signals respectively correspond to M radio resource groups; each radio resource group corresponding to a reference signal transmitted by a serving cell of the transmitter of the first signal among the M radio resource groups comprises one radio resource; each radio resource group corresponding to a reference signal transmitted by a non-serving cell of the transmitter of the first signal among the M radio resource groups comprises two radio resources; a radio resource occupied by the first signal belongs to a radio resource group corresponding to the first reference signal among the M radio resource groups.

In one embodiment, the third node is a base station.

In one embodiment, the third node is a UE.

In one embodiment, the third node is a relay node.

In one embodiment, the first processor 3201 comprises at least one of the antenna 420, the transmitter/receiver 418, the transmitting processor 416, the receiving processor 470, the multi-antenna transmitting processor 471, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:

a first transmitter, transmitting a first signal, the first signal indicating a first reference signal out of a plurality of reference signals;

a first receiver, operatively coupled to the first transmitter, receiving a first signaling in a first resource block, a processor, operatively coupled to the first transmitter and the first receiver, determining a first time based on a time-domain resource occupied by the first signaling;

the first receiver and the processor monitoring a first-type signaling in a first resource block subset after the first time using a spatial parameter of a target reference signal;

the first receiver receiving at least one second reference signal among the plurality of reference signals from a first cell, wherein the first cell is a serving cell;

the first receiver receiving the first reference signal from a target cell the first receiver and the processor adding the target cell on a condition that the target reference signal is the first reference signal; and the first transmitter transmitting an uplink transmission to the target cell.

2. The first node according to claim 1, wherein before the first time the first receiver and the processor monitor the first-type signaling in a second resource block subset using a spatial parameter of the at least one second reference signal; and wherein the first resource block subset and the second resource block subset are associated with a same control resource set.

3. The first node according to claim 1, wherein when the target cell is not added by the first node, the first receiver and the processor monitor a second-type signaling in a third resource block subset after a second time using a spatial parameter of the first reference signal; wherein the first reference signal is used to determine the third resource block subset; and wherein the second-type signaling is received from the target cell.

4. The first node according to claim 3, wherein the first receiver receives a first information block; and wherein the first information block is received from the target cell, the first information block being used to determine configuration information of the third resource block subset.

5. The first node according to claim 1, wherein the first receiver receives a second information block; wherein the first receiver and the processor monitor a third-type signaling in a fourth resource block set using a spatial parameter of the first reference signal; wherein the second information block includes configuration information of the fourth resource block set, and the second information block is received from a second cell, the second cell being added by the first node; and wherein the third-type signaling is received from the target cell.

6. The first node according to claim 1, wherein the first receiver receives a first reference signal set, and the first reference signal set includes at least one reference signal; and wherein a measurement of the first reference signal set is used to trigger transmission of the first signal.

7. The first node according to claim 1, wherein the first receiver receives a plurality of configuration information blocks; wherein the plurality of configuration information blocks respectively indicate the plurality of reference signals; at least one reference signal among the plurality of reference signals is received from a second cell, the second cell being added by the first node; wherein among the plurality of configuration information blocks each configuration information block corresponding to a reference signal transmitted by the first cell includes a first index, the first index being used to indicate the first cell; and wherein among the plurality of configuration information blocks each configuration information block corresponding to a reference signal transmitted by the second cell includes a second index, the second index being used to indicate the second cell.

8. The first node according to claim 2, wherein on a condition the target cell is added by the first node, the target reference signal is the first reference signal; and wherein on a condition the target cell is not added by the first node, the target reference signal is the at least one second reference signal.

9. A second node for wireless communications, comprising:

a second receiver, receiving a first signal from a first node, the first signal indicating a first reference signal out of a plurality of reference signals;

a second transmitter, transmitting a first signaling in a first resource block to the first node, and transmitting a first-type signaling in a first resource block subset to the first node after a first time using a spatial parameter of a target reference signal;

wherein at least one second reference signal among the plurality of reference signals is for a first cell, wherein the first cell is a serving cell;

wherein the second node is a target cell; and receiving an uplink transmission from the first node.

10. The second node according to claim 9, wherein before the first time the second transmitter transmits the first-type signaling in a second resource block subset using a spatial parameter of the at least one second reference signal; and wherein the first resource block subset and the second resource block subset are associated with a same control resource set.

11. The second node according to claim 9, wherein the second transmitter transmits a second information block; wherein the second information block includes configuration information of a fourth resource block set; and wherein the second transmitter transmits a third-type signaling in the fourth resource block set using a spatial parameter of the first reference signal.

12. The second node according to claim 9, wherein the second transmitter transmits a first reference signal set, the first reference signal set includes at least one reference signal; and wherein a measurement of the first reference signal set is for triggering transmission of the first signal.

13. The second node according to claim 9, wherein the second transmitter transmits a plurality of configuration information blocks;

wherein the plurality of configuration information blocks respectively indicate the plurality of reference signals; wherein the second transmitter transmits at least one reference signal among the plurality of reference signals and the second node is a second cell; wherein among the plurality of configuration information blocks each configuration information block corresponding to a reference signal transmitted by the first cell includes a first index, the first index being used to indicate the first cell; and wherein among the plurality of configuration information blocks each configuration information block corresponding to a reference signal transmitted by the second cell includes a second index, the second index being used to indicate the second cell.

14. A method in a first node for wireless communications, comprising:

transmitting a first signal, the first signal indicating a first reference signal out of a plurality of reference signals;

receiving a first signaling in a first resource block;

determining a first time based on a time-domain resource occupied by the first signaling;

monitoring a first-type signaling in a first resource block subset after the first time using a spatial parameter of a target reference signal;

receiving wherein a transmitter of at least one second reference signal among the plurality of reference signals from a first cell, wherein the first cell is a serving cell receiving the first reference signal from a target cell adding the target cell on a condition that the target reference signal is the first reference signal; and transmitting an uplink transmission to the target cell.

15. The method according to claim 14, further comprising:

monitoring the first-type signaling in a second resource block subset using a spatial parameter of the at least one second reference signal before the first time;

wherein the first resource block subset and the second resource block subset are associated with a same control resource set.

16. The method according to claim 14, further comprising:

when the target cell is not added by the first node, monitoring a second-type signaling in a third resource block subset after a second time using a spatial parameter of the first reference signal;

wherein the first reference signal is used to determine the third resource block subset; and wherein the second-type signaling is received from the target cell.

17. The method according to claim 16, further comprising:

receiving a first information block;

wherein of the first information block is received from the target cell, the first information block being used to determine configuration information of the third resource block subset.

18. The method according to claim 14, further comprising:

receiving a second information block; and monitoring a third-type signaling in a fourth resource block set using a spatial parameter of the first reference signal;

wherein the second information block includes configuration information of the fourth resource block set, and the second information block is received from a second cell, the second cell being added by the first node; and wherein the third-type signaling is received from the target cell.

19. The method according to claim 14, further comprising:

receiving a first reference signal set, the first reference signal set including at least one reference signal;

wherein a measurement of the first reference signal set is used to trigger transmission of the first signal.

20. The method according to claim 14, further comprising:

receiving a plurality of configuration information blocks;

wherein the plurality of configuration information blocks respectively indicate the plurality of reference signals; at least one reference signal among the plurality of reference signals is received from a second cell, the second cell being added by the first node; wherein among the plurality of configuration information blocks each configuration information block corresponding to a reference signal transmitted by the first cell includes a first index, the first index being used to indicate the first cell; and wherein among the plurality of configuration information blocks each configuration information block corresponding to a reference signal transmitted by the second cell includes a second index, the second index being used to indicate the second cell.

* * * * *